(12) United States Patent
Nilsson et al.

(10) Patent No.: US 6,445,494 B1
(45) Date of Patent: *Sep. 3, 2002

(54) OPTICAL AMPLIFIER AND LIGHT SOURCE

(75) Inventors: Lars Johan Albinsson Nilsson, Southampton (GB); David Colin Hanna, Southampton (GB); John Douglas Minelly, Corning, NY (US); Ruediger Eberhard Paschotta, Zurich (CH)

(73) Assignee: Southampton Photonics Limited, Southampton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/925,663

(22) Filed: Aug. 7, 2001

Related U.S. Application Data

(63) Continuation of application No. 09/326,752, filed on Jun. 4, 1999, now Pat. No. 6,288,835, which is a continuation-in-part of application No. PCT/GB97/03353, filed on Dec. 4, 1997.

(30) Foreign Application Priority Data

Dec. 4, 1996 (GB) ................................................ 962531

(51) Int. Cl.[7] ................................................ H01S 3/00
(52) U.S. Cl. .................................. 359/341.1; 359/341.3
(58) Field of Search .......................... 359/341.1, 341.3, 359/341.4

(56) References Cited

U.S. PATENT DOCUMENTS

| | | | | |
|---|---|---|---|---|
| 4,938,561 A | * | 7/1990 | Grasso et al. | ............. 350/96.33 |
| 5,469,292 A | * | 11/1995 | Bjarklev et al. | ............. 359/341 |
| 6,175,445 B1 | * | 1/2001 | Desthieux et al. | ........... 359/341 |
| 6,288,835 B1 | * | 9/2001 | Nilsson et al. | ........... 359/341.3 |

* cited by examiner

*Primary Examiner*—Mark Hellner
(74) *Attorney, Agent, or Firm*—John S. Reid; Reidlaw, L.L.C.

(57) ABSTRACT

Single- or few-moded waveguiding cladding-pumped lasers, superfluorescent sources, and amplifiers, as well as lasers, including those for high-energy pulses, are disclosed, in which the interaction between the waveguided light and a gain medium is substantially reduced. This leads to decreased losses of guided desired light as well as to decreased losses through emission of undesired light, compared to devices of the prior art. Furthermore, cross-talk and inter-symbol interference in semiconductor amplifiers can be reduced. We also disclose devices with a predetermined saturation power.

As a preferred embodiment of the invention, we disclose a single (transverse) mode optical fiber laser or amplifier in which the active medium (providing gain or saturable absorption) is shaped as a ring, situated in a region of the fiber's cross-section where the intensity of the signal light is substantially reduced compared to its peak value. The fiber can be cladding-pumped.

51 Claims, 33 Drawing Sheets

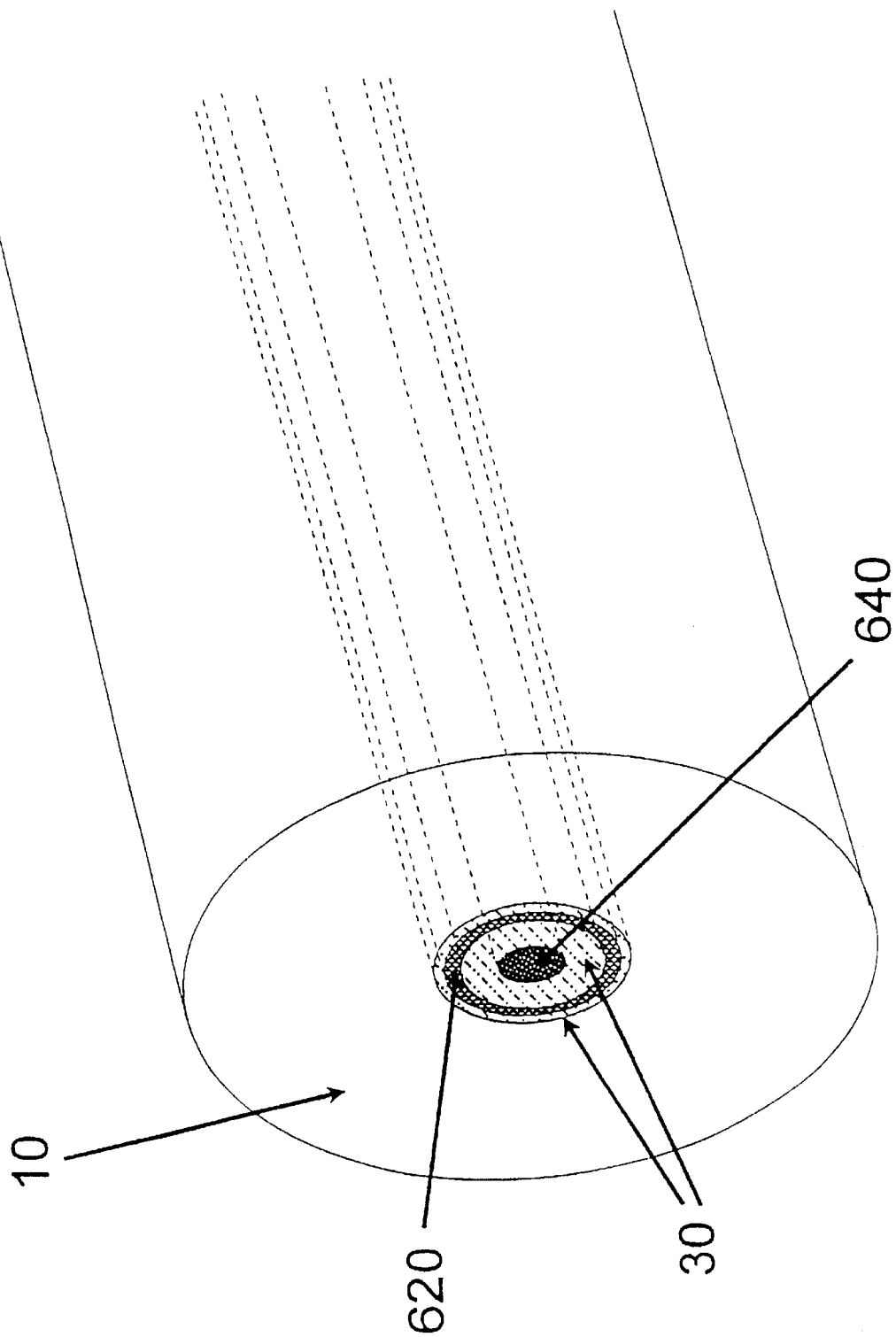

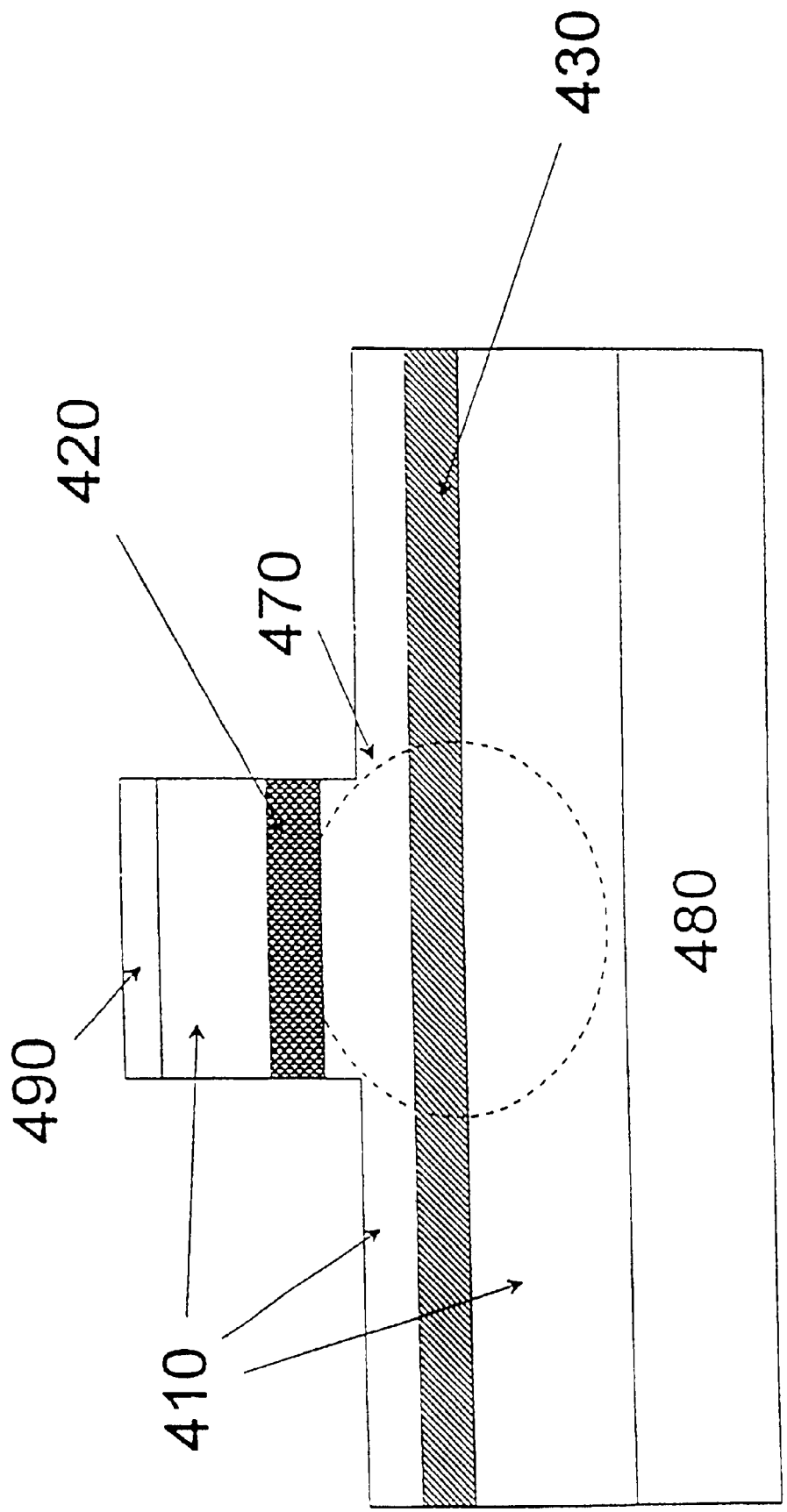

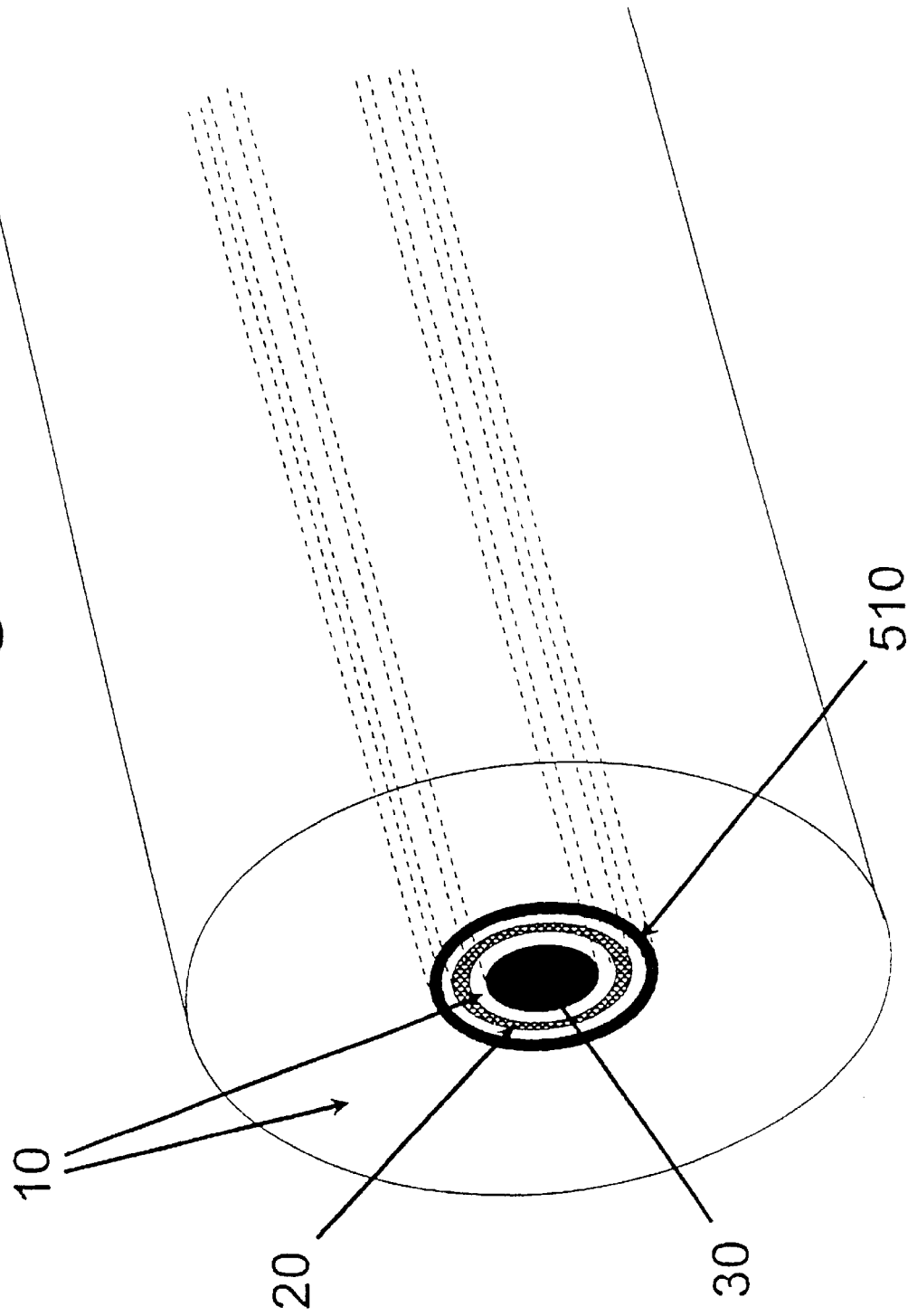

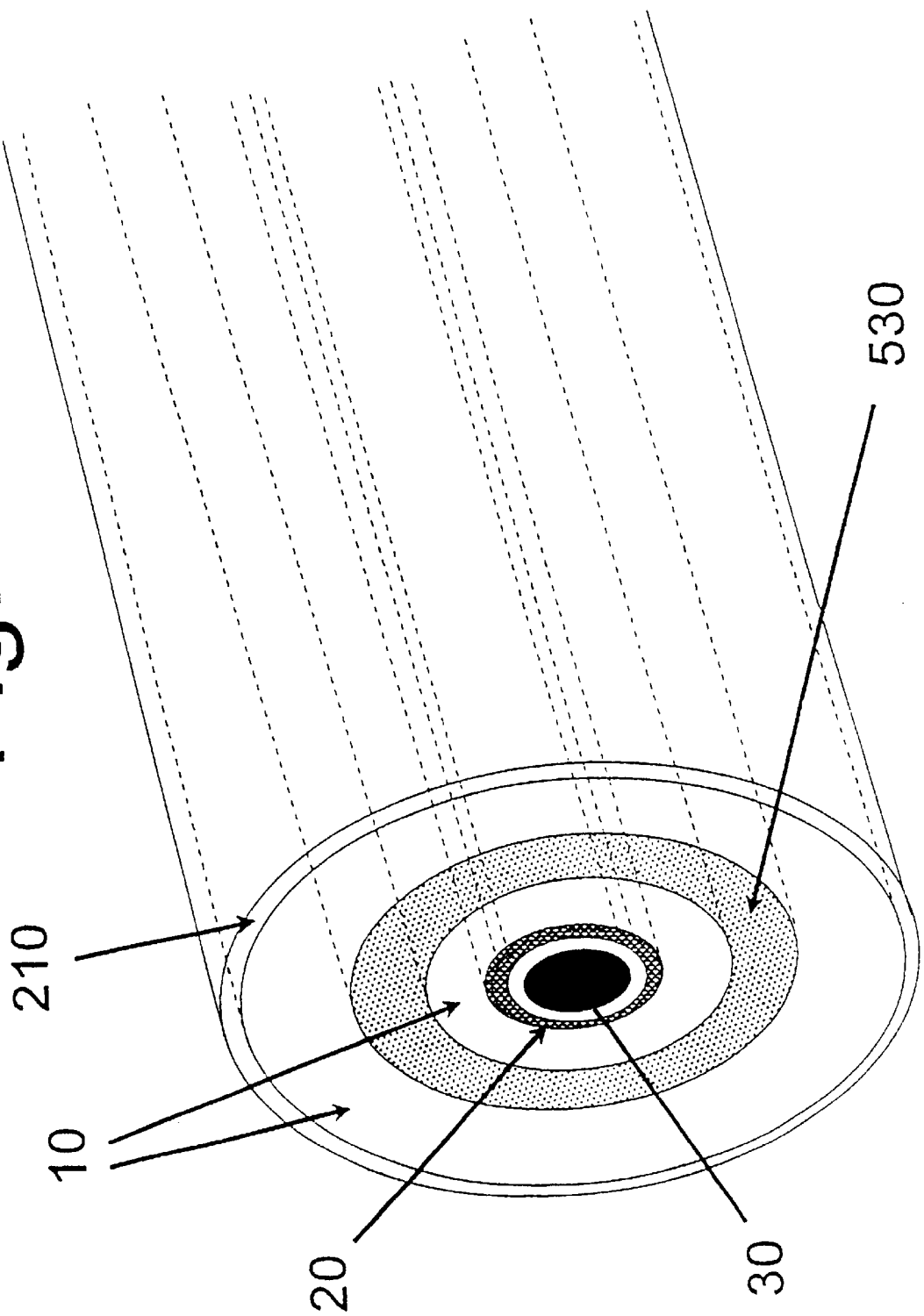

OPTICAL AMPLIFIER AND LIGHT SOURCE

CROSS REFERENCE TO RELATED APPLICATIONS

This application is a continuation of U.S. patent application Ser. No. 09/326,752 filed Jun. 4, 1999, now U.S. Pat. No. 6,288,835, which is in turn a Continuation-in-part of PCT Patent Application No. PCT/GB97/03353, filed Dec. 4, 1997, which in turn claims priority to Great Britain patent application Ser. No. GB962531.7, filed Dec. 4, 1996, now abandoned.

FIELD OF THE INVENTION

The invention relates to optical amplifiers and light sources. By way of example, though not exclusively, the invention relates to single- or few-moded waveguiding lasers, superfluorescent sources, optical amplifiers, high pulse-energy devices, energy-storage devices, cladding-pumped devices, semiconductor signal amplifiers, and waveguiding saturable absorbers.

BACKGROUND OF THE INVENTION

The tightly confined modal fields of single- or few-moded waveguiding lasers, superfluorescent sources, and amplifiers lead to a very strong interaction between any waveguided light and the active medium in the waveguiding core. Therefore, a comparatively small amount of gain medium is sufficient for providing the gain in these devices. Specifically, the gain for a given stored energy, as well as for a given absorbed pump power, is high. This is often beneficial, since it means that the pump power requirements for a given desired laser output power or amplifier gain can be low.

However, for several devices, this efficient interaction between mode and gain medium can be detrimental. The following example refers to certain types of amplifiers and lasers, but of course the skilled man will realise that the same or similar problems can occur in, for example, superfluorescent sources.

In a laser or amplifier, the achievable single-pass gain is limited to, say, 50 dB. The reason is that at this gain, a significant fraction of the pump power is converted to amplified spontaneous emission (ASE). A 10 dB higher gain results in approximately 10 dB more ASE, so at these gains, the extra pump power required to increase the gain further will be prohibitively high. Since the ASE limits the gain of the device, it also limits the energy stored in the gain media. This in turn obviously limits the amount of energy that a pulse can extract from the device. Consequently, the pulse energy that can be obtained from waveguiding lasers and amplifiers is limited. Instead, bulk (i.e., not waveguiding) lasers and amplifiers for which the extractable energy for a given gain can be several orders of magnitude lower are often employed to provide much higher pulse energies. However, the robustness and stability of bulk lasers is often inferior to waveguiding ones.

Moreover, the gain limit can also be problematic for lasers and amplifiers irrespective of whether the stored energy is a major concern, if the high gain appears at another wavelength than the desired one. The reason is that ASE (or lasing) at the gain peak will suppress the gain achievable at the desired wavelength, possibly to a value below what is required for a good amplifier or laser. This applies to all types of amplifiers and lasers. Furthermore, in optically pumped lasers and amplifiers, a suitable interaction between the gain medium and the amplified or generated signal beam is not enough; also the interaction between the pump beam and the gain medium must be appropriate. However, in some types of lasers and amplifiers (typically cladding-pumped ones), the interaction with the pump beam is significantly smaller than the interaction with the signal beam. Then, for a device that efficiently absorbs the pump, the interaction with the signal beam will be much stronger than what is required. Unfortunately, this excess interaction is often accompanied by excess losses for the signal beam, since:

1. The scattering loss of an active medium is normally higher than it can be for a passive medium. For instance, rare-earth-doped fibers have scattering losses of, e.g., several orders of magnitude higher than standard, passive, single-mode fibers.
2. A fraction of the active medium often has inferior properties. For instance, in Er-doped fibers, pairs of $Er^{3+}$-ions can form. These result in an unbleachable loss. The strong interaction then leads to a high loss.
3. The active medium in its amplifying state can also absorb light (so-called excited-state absorption, ESA). Again, a stronger interaction leads to more power lost through ESA.

Moreover, a bleachable medium (e.g., an unpumped gain medium with a ground-state absorption) can be used as a saturable absorber. An efficient interaction leads to a low saturation power. A reduced interaction leads to a higher saturation power, which can be more suitable for some applications, especially if the interaction, and hence the saturation power, can be controlled.

Clearly, although often beneficial, the tight confinement of the guided light is a problem for some devices.

SUMMARY OF THE INVENTION

An aim of the present invention is to improve the interaction between light guided along a waveguide and rare-earth dopants within an active medium.

Accordingly in one non-limiting embodiment of the present invention, there is provided apparatus comprising a waveguide and an amplifying region wherein the waveguide comprises a core and a cladding and the amplifying region comprises rare-earth dopants and wherein the amplifying region comprises a ring around the core of the waveguide.

Various aspects of the invention are defined in the appended claims, and in passages throughout the present application.

According to a first embodiment of the present invention, there is provided an amplifying optical device comprising a first waveguiding structure comprising a first core and cladding and configured to guide optical radiation, at least one pump source configured to supply optical pump power, an amplifying region situated in the cladding; and wherein the pump source is optically coupled to the amplifying region; and wherein in use the optical radiation guided in the first waveguiding structure overlaps the amplifying region.

The invention also provides a method of pumping at least one optical fiber amplifier with a fiber laser, the method comprising providing a first waveguiding structure fabricated from at least one glass system and comprising a first core and cladding; providing a second waveguiding structure comprising a second core at least partly formed by the cladding and an amplifying region comprising Ytterbium; providing a source of optical pump power in optical communication with the second waveguiding structure and having a wavelength in the band from about 870 nm to about 950 nm; providing an optical feedback device; guiding optical radiation using the first waveguiding structure; guiding the optical pump power using the second waveguiding structure such that the amplifying region interacts with the optical radiation guided in the first waveguiding structure and the optical pump power guided in the second waveguiding structure to amplify the optical radiation guided by the first waveguiding structure; using the optical feedback device to ensure that a plurality of times a portion of the optical radiation guided by the first waveguiding structure is amplified more than once by the amplifying region; providing an amplifying region characterized by a dopant concentration, a disposition and a length, and wherein the dopant concentration, the disposition and the length of the amplifying region are arranged such that the fiber laser emits optical radiation at an emission wavelength in the region of about 970 nm to about 990 nm; and coupling the optical radiation at the emission wavelength in the region of about 970 nm to 990 nm into the at least one optical amplifier.

A second method provided by the invention is a method of amplifying optical pulses to energies exceeding the intrinsic saturation energy of an amplifying optical device, comprising: providing a first waveguiding structure comprising a first core and cladding; providing a source of optical pump power; providing a second waveguiding structure comprising a second core at least partly formed by at least part of the cladding, and an amplifying region; guiding optical radiation using the first waveguiding structure; and guiding the optical pump power using the second waveguiding structure such that the amplifying region interacts with the optical radiation guided in the first waveguiding structure and the optical pump power guided in the second waveguiding structure.

A third method provided by the invention is the method of using a waveguiding saturating absorber comprising: providing a waveguiding structure having a core and a cladding; guiding optical radiation in the waveguiding structure; providing an absorbing region situated within the cladding and disposed such that it provides an absorption of the optical radiation guided in the core such that in use at least 10% of the absorption is bleached by the optical radiation guided by the core in at least a part of the waveguiding saturating absorber at least part of the time.

According to a second embodiment of the present invention, there is provided an amplifying optical device comprising: a first waveguiding structure configured to guide optical radiation which can propagate in a fundamental mode; a pump source configured to supply optical pump power; and a second waveguiding structure configured to guide the optical pump power, wherein the pump source is optically coupled to the second waveguiding structure; and wherein in use the optical radiation is characterized by an optical power distribution of the fundamental mode having a contour of equal intensity perpendicular to the local longitudinal axis of the first waveguiding structure the contour enclosing about 75% of the optical power of the fundamental mode; and wherein the second waveguiding structure contains an amplifying region situated to interact with the optical pump power guided in the second waveguiding structure when the amplifying optical device is in use; and wherein the amplifying region is situated to lie outside the contour of equal intensity; and wherein during use at least 0.1% of the optical radiation guided by the first waveguiding structure overlaps the amplifying region.

Embodiments of the invention provide devices that are considerably improved by a predetermined reduction of the interaction between a signal light beam and an active medium (per unit volume) compared to prior-art designs, without necessarily changing the properties of the gain medium or reducing the confinement of the signal light (although a reduced confinement can also be beneficial for the disclosed devices). The active medium serves to amplify or generate the signal light beam, or, if unpumped, can act as a saturable absorber.

The reduction in interaction is achieved by placing the bulk of the active medium in regions where the intensity of the signal beam is substantially smaller than its peak intensity, in a cross-section of the waveguiding device perpendicular to the direction of propagation of the signal beam. This can provide advantages for the following devices:

1. Lasers (e.g., Q-switched and gain-switched ones) and amplifiers in which it is desirable to store large energies. In these devices (as well as for so-called energy-storage devices in general), the reduced interaction leads to a larger stored energy before practical upper limits on the gain is reached.
2. Optical amplifiers (typically semiconductor ones) for which even the energy of a single signal bit can be comparable to the stored energy. In those, already the amplification of a bit extracts enough energy to reduce the gain. This leads to four-wave mixing, cross-talk, and inter-symbol interference. This can be reduced with the higher stored energy that, for a given gain, accompanies the reduced interaction.
3. Amplifiers and lasers in which an efficient pump absorption necessitates large amounts of gain media, which in prior-art devices leads to excessive small-signal absorption, background absorption, or excited state absorption at the operating wavelength, or excessive gain at another wavelength. A reduced interaction then leads to reduced losses. Moreover, a reduced interaction can reduce the gain at the undesired wavelength relative to that at the desired one, and thereby the problems associated with a too high gain at the wrong wavelength. This applies to lasers in which there is a significant unpumped loss (typically, reabsorption loss or out-coupling loss). These points are especially relevant for cladding-pumped devices. For example, to ensure sufficient pump absorption, the fiber may need to be so long that one or both of those problems arise.
4. Saturable absorbers, in which the saturation power is otherwise too small.

Embodiments of the invention can overcome or alleviate some of the problems described above and can at least partially achieve one or more of the following:

1. To reduce the susceptibility to so-called quenching and background losses, in particular for cladding-pumped devices.
2. To obtain efficient emission at wavelengths otherwise inaccessible for devices where there is a significant unpumped loss, in particular for cladding-pumped devices.
3. To improve the energy storage capabilities, for energy-storage devices.
4. To reduce signal cross-talk and inter-symbol interference for signal amplifiers.
5. To allow for a larger, predetermined, saturation power.

Embodiments of the invention can provide the following devices and embodiments, and the use of the following amplifying and/or absorbing waveguiding structures in such devices:

1. An amplifying optical fiber in which the active medium is placed partly or wholly outside the waveguiding core, e.g., in a ring around the core. The gain medium can also reside inside the core in regions where the normalized modal intensity of the signal beam is small. The fiber can be made of a glass, partly doped with $Pr^{3+}$, $Tm^{3+}$, $Sm^{3+}$, $Ho^{3+}$, $Nd^{3+}$, $Er^{3+}$, or $Yb^{3+}$, or a combination thereof, and it can be cladding-pumped.

2. A cladding-pumped amplifier or laser in which the difference between the overlaps of the pump and signal beams with gain medium is substantially reduced compared to prior-art designs.

3. A ring-doped optical fiber for high-energy pulse amplification or generation or other energy storage applications. The fiber can for instance be made of a glass, partly doped with $Pr^{3+}$, $Tm^{3+}$, $Sm^{3+}$, $Ho^{3+}$, $Nd^{3+}$, $Er^{3+}$, or $Yb^{3+}$, or a combination thereof, and it can be cladding-pumped. Moreover, the device can incorporate a longitudinally distributed saturable absorber to suppress the build-up of ASE. In one embodiment, the gain medium is a $Yb^{3+}$-sensitized $Er^{3+}$-doped glass, and the saturable absorber is an $Er^{3+}$-doped glass, and they are located so that the signal intensity is higher in the saturable absorber than in the gain medium.

4. A Q-switched or gain-switched fiber laser based on an amplifying fiber with a relatively higher saturation energy combined with a saturable absorber fiber having a relatively lower saturation energy. The difference in saturation energy stems, at least to a significant part, from differences in the geometry of the fibers. The active media in the different fibers can be the same or different, and can for instance be a glass doped with a rare earth, e.g., $Pr^{3+}$, $Tm^{3+}$, $Sm^{3+}$, $Ho^{3+}$, $Nd^{3+}$, $Er^{3+}$, or $Yb^{3+}$, or a combination thereof.

5. A ring-doped, cladding-pumped ytterbium-doped fiber for amplification or generation of light in the range 950 nm to 1050 nm.

6. A ring-doped, cladding-pumped neodymium-doped fiber for amplification or generation of light in the range 850 nm to 950 nm.

7. A ring-doped, cladding-pumped erbium-doped fiber for amplification or generation of light in the range 1450 nm to 1600 nm.

8. An amplifying planar waveguide structure in which the active medium is placed partly or wholly outside the waveguiding core, thus interacting with the signal beam only where the normalized intensity of the modal field is small. The waveguide can be cladding-pumped. Moreover, the design can be specifically adapted to correspond to any of the fiber devices listed above.

9. A semiconductor amplifier for signal amplification, in which the gain region is placed partly or wholly outside the waveguiding core, thus interacting with the signal beams only where their normalized modal intensities are small. Thereby, the saturation energy of the device will be increased, which subsequently reduces the inter-symbol interference and inter-wavelength crosstalk.

10. A waveguiding structure with a saturable absorption, in which the absorbing medium is placed partly or wholly outside the waveguiding core, thus interacting with the signal beam only where its normalized modal intensity is small.

Evanescent-field devices, including ring-doped fiber devices have not been considered for devices of the type proposed here, nor has any device been proposed or demonstrated based on ring-doping (or evanescent field interaction) that provide significant benefits of the type considered here, compared to traditional devices in which the gain-medium resides in the core in places where the interaction with the signal beam is large. Specific differences between embodiments of the invention and a prior art device are as follows:

1. It has not been one of the specific devices considered here.
2. It has not used a single-moded or few-moded waveguiding core.
3. It has not been a device in which the energy extraction results in cross-talk or inter-symbol interference.
4. The control of the emission wavelength that we propose has not been obtained.
5. The device has not substantially reduced the effect of losses at the signal wavelength.
6. It has not been a cladding-pumped device.
7. It has not been a device for high-energy pulses.
8. It has not been an optical fiber doped with erbium or another rare-earth for high-energy pulses.
9. The output of the device could not be launched into a standard single-mode fiber through splicing or buttcoupling, nor has the device allowed for an easy launch of signal light.
10. The output beam has not been tightly confined.
11. It has been a device doped in regions of the core where the modal intensity is large.
12. It has been a device doped in a large area around the core (e.g., homogeneously in the cladding), hence rendering it inefficient for cladding-pumping.
13. It has not been a fiber structure, or at least not an all-fiber structure.
14. It has not been a solid-state device.
15. The interaction length has been limited to a few centimeters.
16. It has not been a high-gain device.
17. It has not been a device pumped by an optical beam guided along the amplifying medium.
18. It has not been possible to manufacture the device with standard manufacturing techniques for rare-earth doped fibers like MCVD and solution doping.
19. The purpose of the design has not been to obtain a smaller interaction between the gain medium and the signal light than would otherwise be possible, nor have any substantial benefits of a substantially smaller interaction been proposed, discussed, or demonstrated.

BRIEF DESCRIPTION OF THE DRAWINGS

The invention will now be described by way of example with reference to the accompanying drawings, throughout which like parts are referenced to by like references, and in which:

FIG. 11 illustrates a view of a fiber having a saturable absorber in the central part of the core and a ring-shaped gain medium around the absorber;

FIG. 12 illustrates a semiconductor amplifier for signal amplification;

FIGS. 13a to 13c illustrates devices in which unwanted, higher-order modes are suppressed by the inclusion of an absorber;

DETAILED DESCRIPTION OF PREFERRED EMBODIMENTS OF THE INVENTION

Figure 1:
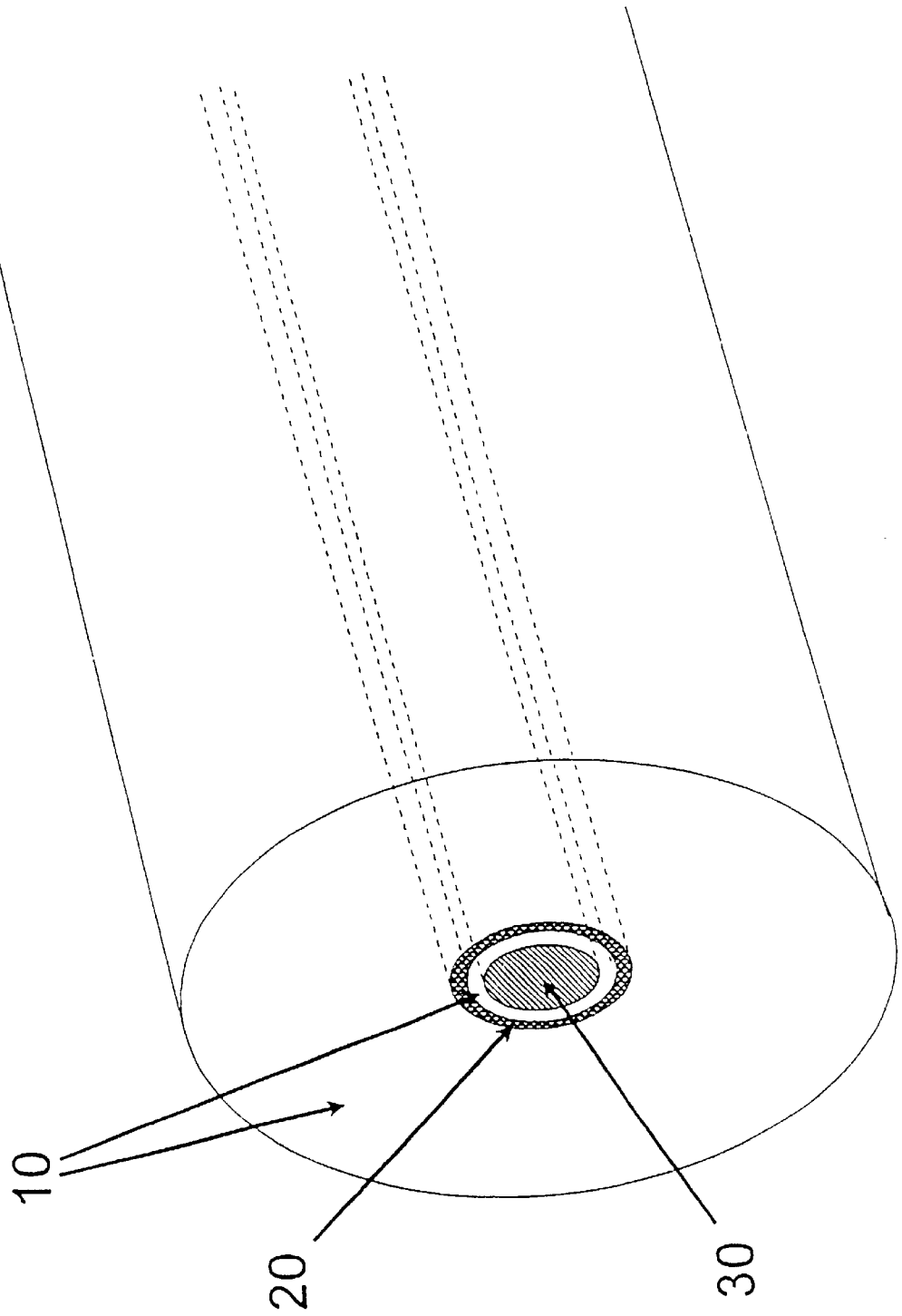
FIG. 1 illustrates a Ring-doped optical fiber.

FIG. 1 depicts a ring-doped optical fiber. A transparent cladding (10) (typical radius 50 μm–250 μm) surrounds a transparent waveguiding core (30) of a higher refractive index, with a diameter of typically a few to ten μm (micrometers). The core is surrounded by a gain medium (20), which can amplify a signal beam, guided by the core. The gain medium (20) can be pumped by an optical pump beam, which can amplify a signal beam, guided by the core.

Figure 2:
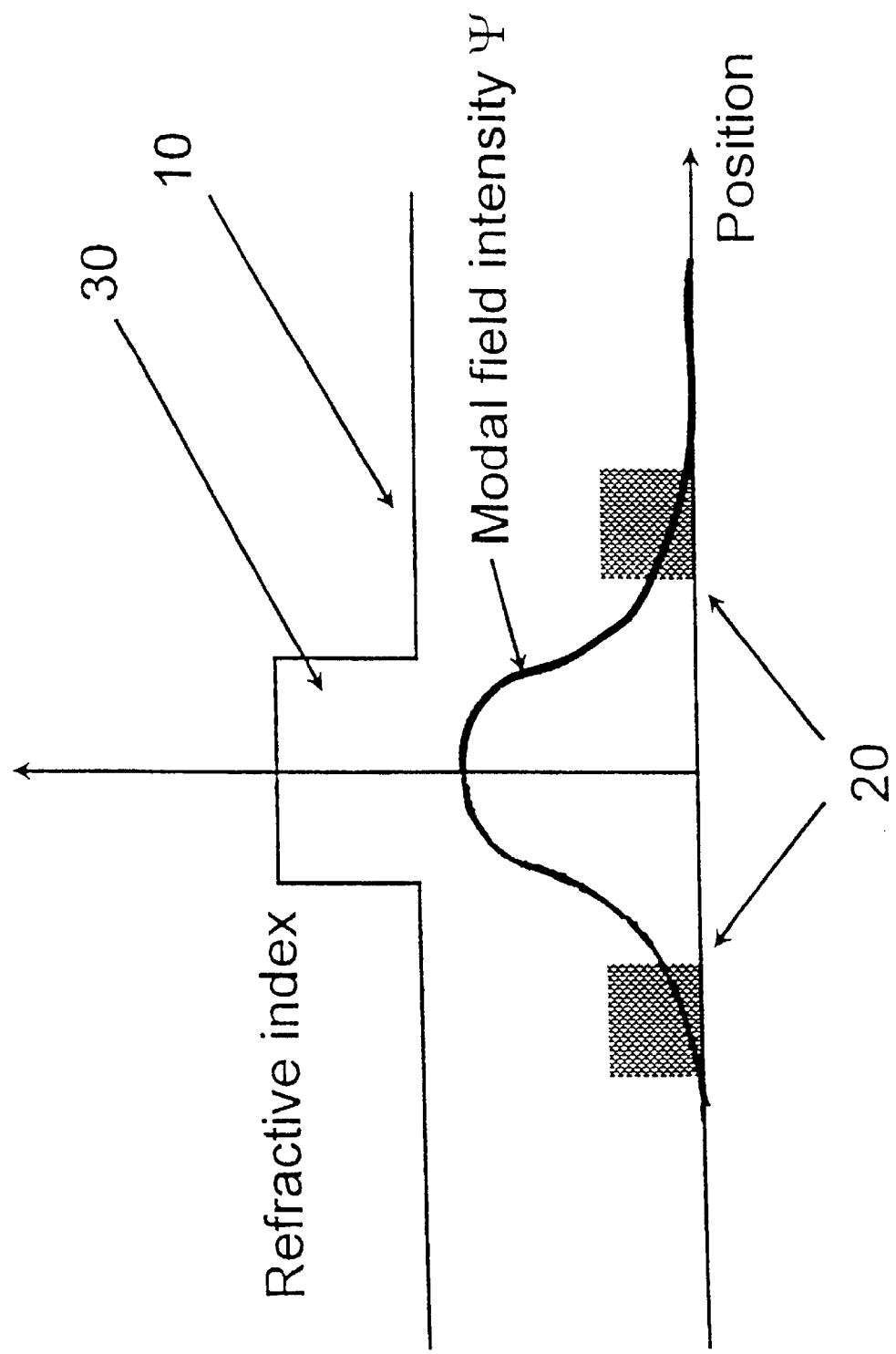
FIG. 2 illustrates the dependencies of the refractive index, the gain medium, and the modal field across a transverse cross-section through the center of the fiber in FIG. 1.

FIG. 2 illustrates the normalized modal intensity distribution Ψ the refractive index profile with the core (30), and the dopant profile (20), in a transverse cross-section through the center of the fiber. For an optical fiber in glass, the cladding refractive index is typically around 1.5, and the numerical aperture is typically around 0.1–0.3.

Figure 3:
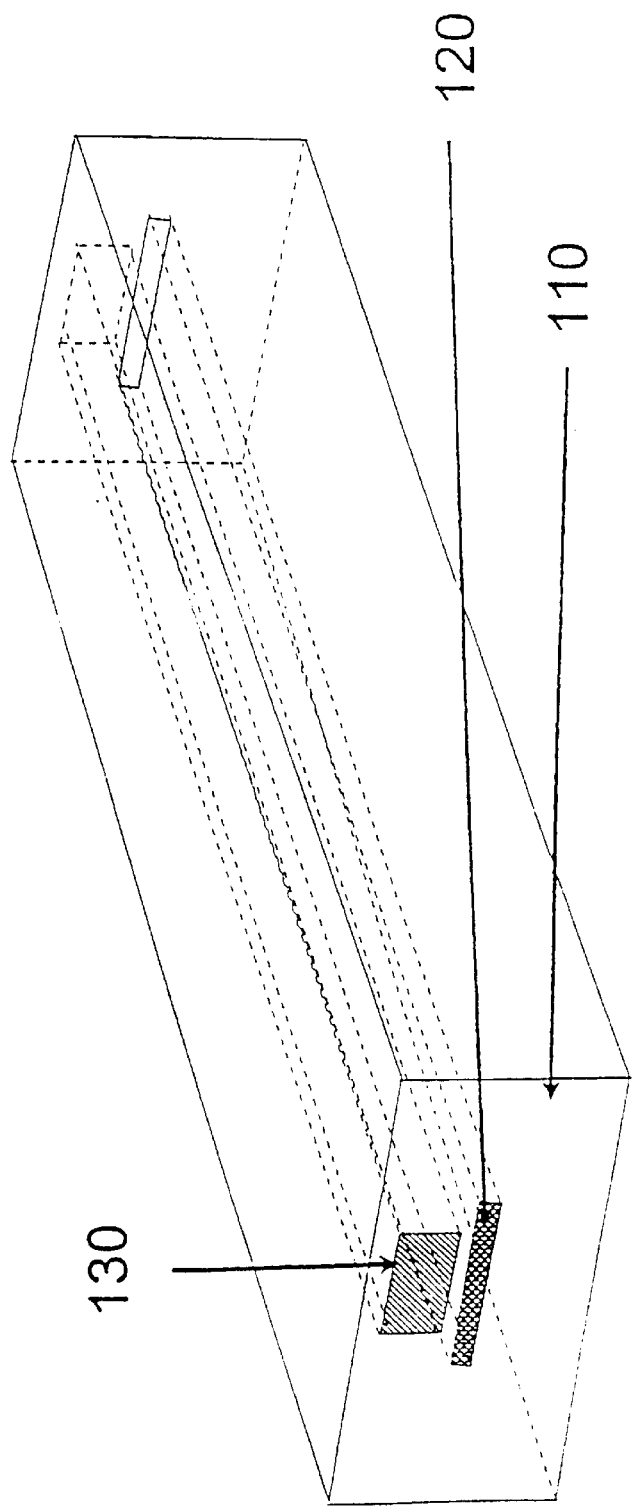
FIG. 3 illustrates a planar waveguide structure amplifying the evanescent field of a signal beam.

FIG. 3 shows a waveguiding amplifier or laser. As for the fiber, a transparent cladding (110) surrounds a transparent waveguiding core (130) of a higher refractive index. A gain medium (120) is situated near the core.

Figure 4:
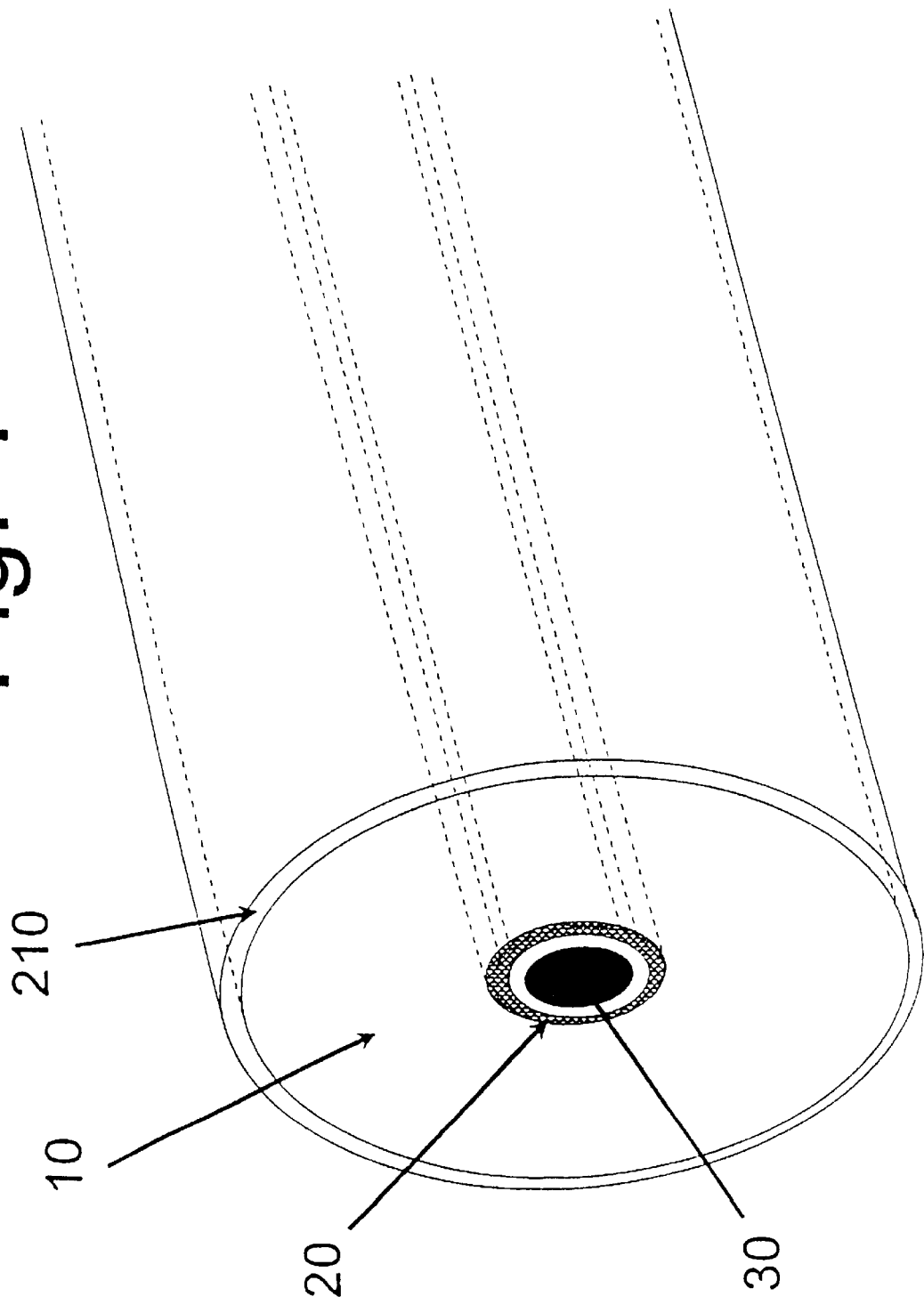
FIG. 4 illustrates a double-clad ring-doped optical fiber.

FIG. 4 is similar to FIG. 1, except that the inner cladding (10) is now surrounded by an outer cladding (210), of a lower refractive index. Thus, the inner cladding can guide light, and serves to guide a pump beam launched into the inner cladding. The signal beam is guided by the core (30).

Figure 5:
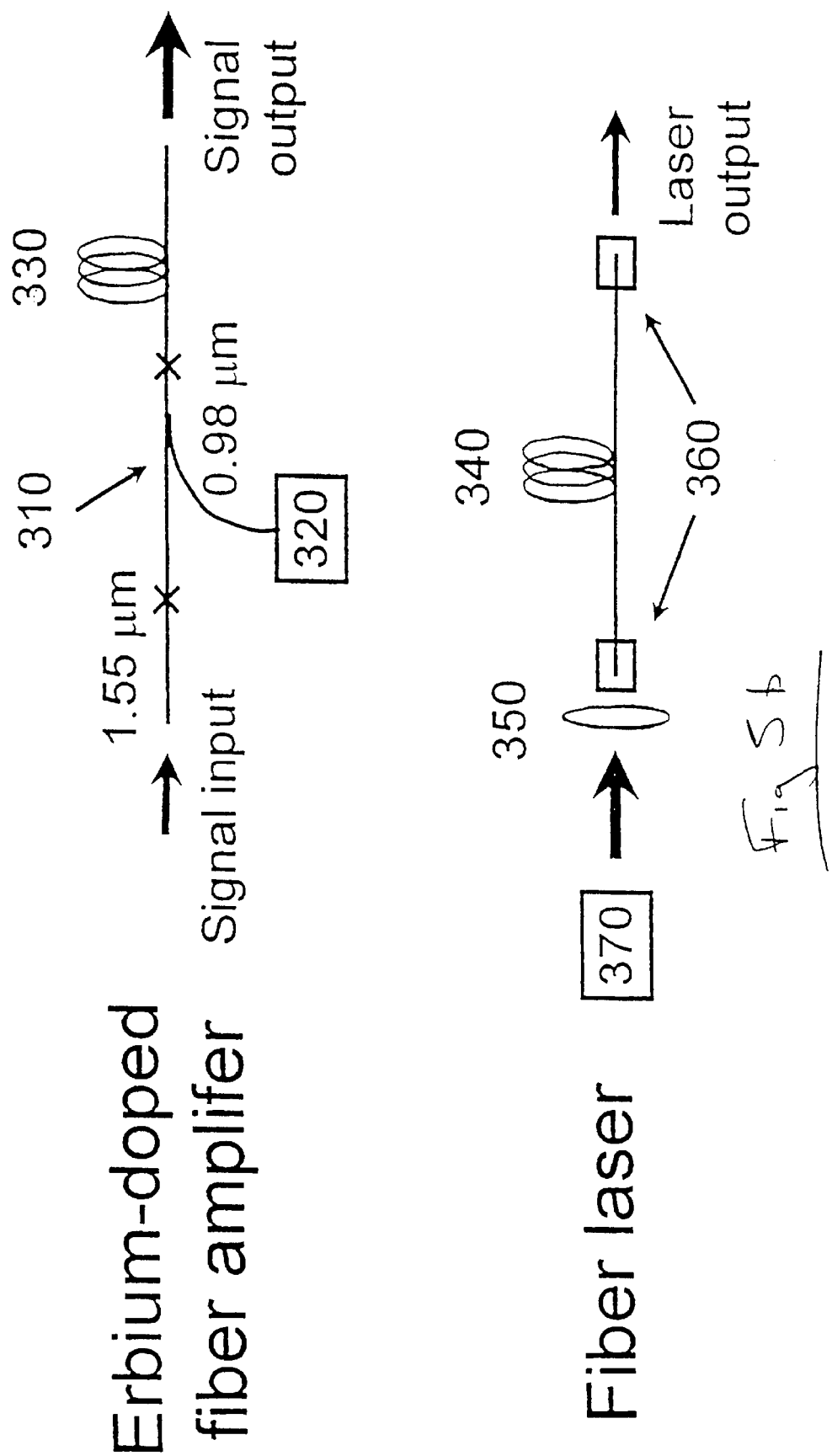
FIGS. 5a and 5b illustrate examples of the proposed devices.

FIGS. 5a and 5b illustrate examples of an erbium-doped fiber amplifier and a fiber laser respectively. For the amplifier of FIG. 5a, a signal beam in an optical fiber is launched into a wavelength-selective coupler (310). Also an optical pump beam from the pig-tailed pump source (320) is launched into the coupler, which combines the pump and signal beams and launches them both into an erbium-doped fiber (330). In the fiber, the erbium-ions serve to transfer energy from the pump beam to the signal beam, which is thereby amplified. The amplified signal is then, for example, launched into another fiber for further transmission.

For the laser of FIG. 5b, a beam from an optical pump source (370) is coupled via a lens (350) into a fiber (340) doped with a gain medium. The ends of the fiber provide some means (360) for reflecting a signal beam, possibly with wavelength discrimination, thus providing feedback for the laser. The reflector at the pump input end transmits the pump and reflects the signal, while the out-coupling reflector in the other end transmits a significant fraction of the signal beam. Other components are also often used in the devices of FIGS. 5a and 5b, e.g., an isolator for the amplifier; however those have been omitted for clarity.

Although it is clear that the ideas and concepts disclosed below apply to many different geometries, the discussion below will for conciseness be focused on ring-doped fibers. Moreover, it will be assumed that the structures are longitudinally uniform, although this is not necessarily so.

Other waveguiding geometries can also be used. For example, the core can be of a more complicated shape than the traditional ones illustrated in the drawings. The invention also extends to cores that fulfill the same or a similar function as traditional ones do, and allow for an active medium to be incorporated in a region where the normalized modal intensity is small.

Moreover, while the embodiments primarily deal with devices pumped by an optical beam propagating along the core, other pumping schemes are also possible, like flashlamp pumping and side-pumping with diode bars, electrical pumping, chemical pumping, and more.

While advantages are described mainly in terms of localizing the active medium in regions where the normalized modal field is small, the active medium can also extend to regions where it is large.

Principle

The disclosed devices provide advantages compared to prior-art, core-doped, devices by suppressing gain and thus radiation losses at undesired wavelengths and/or by reducing the propagation losses in the device. Below follows a description of how these advantages can be obtained. We restrict the discussion to homogeneously broadened gain media; substantial benefits can be realized also in inhomogeneously broadened devices. The description focuses on cladding-pumped devices.

It is known that with a gain medium for which the shape of the gain spectrum depends on the population inversion, the emission wavelength of a fiber can be modified by changing the strength of the interaction between a signal beam and the gain medium. For instance, the fiber length can be changed. This also changes the absorption of the pump. However, we will demonstrate below that in cladding-pumped devices, the same control can be obtained through ring-doping, while separately controlling the absorption of the pump. In particular, the pump absorption can be kept sufficiently large, as will be further described in the following.

The following relation can be used for evaluating the gain G in a waveguiding device with a homogeneously broadened gain medium [see C. R. Giles and E. Desurvire, "Modeling erbium-doped fiber amplifiers", J. Lightwave Technol. 9, 271–83, (1991)]:

$$G = \frac{10}{\ln 10}\left[\sigma^e \int\int N_0(x,y)n_2(x,y)\Psi(x,y)dxdy - \sigma^a \int\int N_0(x,y)(1-n_2(x,y))\Psi(x,y)dxdy\right]L \quad [\text{dB}] \qquad (1)$$

where $N_0$ is the concentration of amplifying centra, $n_2$ is the degree of excitation, $\Psi$ is the normalized mode intensity, $\sigma^a$ and $\sigma^e$ are the absorption and emission cross-section of the active centra, respectively, and L is the length of the gain region. Equation 1 can be written in a simplified form:

$$G = (10/\ln 10)N_0 A_{doped}\Psi_{doped}[n_2\sigma_e - (1-n_2)\sigma^a]L\,[\text{dB}] \qquad (2)$$

where $N_0$, $n_2$, and $\Psi_{doped}$ have been appropriately averaged over the doped area $A_{doped}$. (In the literature, the product $A_{doped}\Psi_{doped}$ is often replaced by the so-called overlap $\Gamma$.)

There are two assumptions in Eqs. 1 and 2, namely, that the gain is homogeneously broadened and that only two levels in the gain medium are significantly populated. However, even for devices that do not meet these assumptions, the problems that we address exist and can generally be countered by designing devices according to our present invention. In the notation, there is also the implicit, unimportant, assumption that the gain stems from a number of active centra, each of which has been ascribed cross-sections for stimulated emission and absorption. Other types of gain media also exist, and the results will be valid also for them. To proceed, we will also assume that the degree of inversion is wavelength-independent. This is normally true to a good approximation. If not, this results in a slight inhomogeneity in the gain spectrum. For simplicity, we have also assumed that other losses are small compared to either the gain G or the bleachable absorption (10/ln10) $N_0 A_{doped} \Psi_{doped} \sigma^a L$. Again, this is a non-restrictive assumption, and the equations can be easily modified to include any other loss. For instance, a filter can be used for controlling the gain spectrum and laser output wavelength, both in prior-art devices and the devices disclosed here.

It follows from Eq. 2 that the gains $G_1$, $G_2$, and $G_3$ at three different wavelengths $\lambda_1$, $\lambda_2$, and $\lambda_3$ are related to each other in the following way:

$$3^a/\sigma_1^a)/(\sigma_2^e/\sigma_1^e - \sigma_2^a/\sigma_1^a) + G_1(\Psi_{3,doped}/\Psi_{1,doped})(\sigma_3^e/\sigma_2^e - \sigma_3^a/\sigma_2^a)/(\sigma_1^e/\sigma_2^e - \sigma_1^a/\sigma_2^a)\,[\text{dB}] \qquad (3)$$

Equation 3 makes the important point that for given cross-sections, the only parameters that affect this relation are the normalized mode intensities, averaged over the doped region. Let now $\lambda_1$ be the pump wavelength. The pump is then absorbed by an amount $\alpha_p^{operating} = -G_1$ in the operating state of the device. In order to operate efficiently, $\alpha_p^{operating}$ needs to be sufficiently large, say, at least 5 dB. Also, we assume that we require a certain gain $G_2$ at a wavelength $\lambda_2$. $\alpha_p^{operating}$ and $G_2$ are then parameters already specified. This also implies a certain gain $G_3$ at other wavelengths $\lambda_3$, but if this gain is too large, prohibitive amounts of power will be lost to ASE. Insofar as the cross-sections cannot be significantly modified, this can only be remedied by designing the device for appropriate values of the normalized modal intensities. The description of such designs is a central part of the present invention.

To simplify the further description, we now assume that the pump does not stimulate any emission; hence, $\sigma_1^e = 0$. Equation 3 then becomes $$G_3 = G_2(\sigma_3^e\Psi_{3,doped}/\sigma_2^e\Psi_{2,doped}) + \alpha_p^{operating}(\sigma_3^e\Psi_{3,doped}/\sigma_p^a\Psi_{p,doped})[(\sigma_2^a/\sigma_2^e) - (\sigma_3^a/\sigma_3^e)]\,[\text{dB}] \qquad (4)$$

The value of the first term depends on the relative sizes of $\Psi_{2,doped}$ and $\Psi_{3,doped}$ at $\lambda_2$ and $\lambda_3$. In a fiber, the spot-sizes at $\lambda_2$ and $\lambda_3$ can differ. Then, ring-doping implies that the gain at the wavelength with the larger spot-size gets relatively larger than at the other wavelength, compared to a homogeneously doped core. Depending on how close the wavelengths are to each other, this is often not a significant effect.

In contrast, in cladding-pumped devices, the second term in Eq. 4 can to a significant extent be controlled by designing the device for an appropriate value of ($\Psi_{3,doped}/\Psi_{p,doped}$). Normally, it is very different in a cladding-pumped device and in a core-pumped device. In the core, the normalized pump intensity $\Psi_p$ is approximately equal to the inverse of the pumped area for both core-pumped and cladding-pumped devices, so the same is true for $\Psi_{p,doped}$ in a core-doped device. It follows that in a core-doped device, $\Psi_{p,doped}$ will be much larger in a core-pumped device than in a cladding-pumped device. Thus, the effective area ratio $r_{effective} = (\Psi_{3,doped}/\Psi_{p,doped})$ will be much larger. (We will also use "effective area ratio" for the ratio $\Psi_{2,doped}/\Psi_{p,doped}$.) Consequently, a core design which is suitable for the core-pumped device may be inappropriate for a cladding-pumped device because the effective area ratio becomes too large. In prior-art cladding-pumped devices, $r_{effective}$ is large, typically around 100. Then, the second term in Eq. 4 is potentially large for some undesired wavelength $\lambda_3$, which makes it difficult to absorb the pump without getting a high gain at the undesired wavelength. Therefore, laser systems with significant reabsorption that work well in a core-doped, core-pumped, geometry will not be efficient core-doped, cladding-pumped lasers. (In a device doped in the core, $r_{effective}$ is approximately equal to the area ratio $r \equiv A_{pumped}/A_{doped}$, where $A_{pumped}$ is the pumped area and $A_{doped}$ is the doped area. Hence, for a cladding-pumped device homogeneously doped throughout the core, $r = A_{cladding}/A_{core}$.)

Consider instead a ring-doped, cladding-pumped device. Since $\Psi_p$ is approximately constant over the inner cladding, $\Psi_{p,doped}$ will not change much with the transverse disposition of the gain medium. However, since the light at $\lambda_3$ is confined to the core, $\Psi_{3,doped}$ decreases rapidly if the amplifying region is moved away from the core. This obviously reduces the interaction between the gain medium and the signal beam. Hence, the devices disclosed here allows $r_{effective}$ to be substantially reduced, e.g., to values in the range 1–10, whereby the gain at unwanted wavelengths can be suppressed compared to the gain at a desired wavelength.

First, we treat the case where the scattering (or absorption) loss of the gain region is larger than that of a transparent, passive region. For simplicity, we assume that there is no scattering loss outside the gain region. Starting from Eq. 2, we can then derive the following expression between the scattering loss and the gain $G_1$ and $G_2$ at two different wavelengths:

$$\alpha_2^{scatter} = \sigma_2^{scatter}[G_2(\sigma_1^a + \sigma_1^e) - (\Psi_{2,doped}/\Psi_{1,doped})G_1(\sigma_2^a + \sigma_2^e)]/(\sigma_1^a\sigma_2^e - \sigma_1^e\sigma_2^a) \text{ [dB]} \quad (5)$$

In Eq. 5, we have arbitrarily made the non-restrictive assumption that each active center scatters with a cross-section $\sigma_2^{scatter}$. Also, we have for simplicity assumed that scattering is small compared to the gain. It follows that the scattering losses can become high already at a small value of the ratio between stimulated emission and scattering ($\sigma_2^{scatter}/\sigma_2^e$) if $r_{effective} \approx 100$, i.e., in a core-doped, cladding-pumped device. Then, already a value ($\sigma_2^{scatter}/\sigma_2^e$) as low as 1/1000 can result in significant losses. In contrast, in ring-doped cladding-pumped devices, acceptable values of ($\sigma_2^{scatter}/\sigma_2^e$) will be one or two orders of magnitude larger.

Next, we will show how ring-doping also can reduce the sensitivity to quenching.

Very often, some active centra in a gain medium are defect. These quenched centra retain their ground-state absorption (GSA), but, if they absorb a photon, they are not efficiently excited. This leads to a so-called unsaturable absorption, the spectrum of which is approximately proportional to the small-signal ground-state absorption spectrum of the medium. For instance, this type of unsaturable absorption has been observed in the important $Yb^{3+}$:glass and $Er^{3+}$:glass gain media. The small-signal absorption is given by:

$$\alpha_2^{ss} = \sigma_2^a[G_2(\sigma_1^a + \sigma_1^e) - (\Psi_{2,doped}/\Psi_{1,doped})G_1(\sigma_2^a + \sigma_2^e)]/(\sigma_1^a\sigma_2^e - \sigma_1^e\sigma_2^a) \text{ [dB]} \quad (6)$$

If, for instance, 3% of the active centra are quenched, we get an unsaturable absorption of $0.03 \times \alpha 2ss$. Equation 6 is very similar to Eq. 5, and the same result holds: A cladding-pumped device with the currently disclosed design will be typically 10–100 times less sensitive to quenching than are core-doped designs of the prior-art. (This does not apply to four-level systems, for which $\alpha 2ss = 0$ dB.)

Next, we consider the case of excited-state absorption at the signal wavelength $\lambda_2$. Again, a stronger interaction leads to more power lost through ESA, at least for a device with significant small-signal absorption, as the following equations will show. The excited-state absorption can be written as:

$$\alpha_2^{ESA} = \sigma_2^{ESA}[G_2/\sigma_2^a - (\Psi_{2,doped}/\Psi_{1,doped})G_1/\sigma_1^a]/[(\sigma_2^e - \sigma_2^{ESA})/\sigma_2^a - \sigma_1^e/\sigma_1^a][dB] \quad (7)$$

For a transition to the ground-state, the total excited-state absorption can be significant already for values of $\sigma_2^{ESA}/(\sigma_2^e - \sigma_2^{ESA})$ of 1/1000. Again, in cladding-pumped devices, the sensitivity can be reduced one or two order of magnitudes by ring-doping. (For four-level transitions, $\sigma_2^a = 0$, so the sensitivity to ESA is independent of any ring-doping, and equal to that of traditional core-doped, core-pumped devices.)

Equations 1–7 thus demonstrate how ring-doping makes the disclosed devices less susceptible to absorption loss and scattering losses and to emission losses to ASE at an undesired, high-gain wavelength. The improvements are a direct consequence of the reduction of the effective area ratio $r_{effective} \neq r$ to values around 1–10. In contrast, in prior-art devices, the signal light in the core is confined to an area approximately 100 times smaller than that of the pump, so the area ratios $r \approx r_{effective} \approx 100$. While the area ratio can well be made larger, a smaller area ratio is troublesome since a smaller area of the inner cladding can make it difficult to launch the pump into the device, and since a larger signal spot-size leads either to a large bend sensitivity or to a multi-mode core.

In addition to the general designs described up to this point, we next describe some particular cladding-pumped fiber lasers and amplifiers with sizable advantages compared to the prior art.

Ytterbium-doped Fiber Operating in Wavelengths Between 975 and 985 nm

For $Yb^{3+}$-doped devices at these wavelengths, the suppression of quasi-four-level emission around 1030 nm can be especially troublesome for cladding-pumped devices designed according to the prior art. For a wavelength of 975 nm (corresponding to the peak of the cross-sections) with representative cross-section values (cf. Table 1), Eq. 3 gives the following relation between the gain at 975 nm, the gain at 1028 nm, and the pump absorption of the pumped (i.e., partly bleached) fiber:

$$G_{1028} = 0.25\ G_{975} + 0.74(\Psi_{doped}/\Psi_{p,doped})\alpha_p^{operating} \text{ [dB]} \quad (8)$$

Here, we have assumed that $\Psi_{975,doped} = \Psi_{1028,doped}$, which is a reasonable approximation for guided modes at nearby wavelengths. Now, assume that we want the laser to work at 975 nm, with 3.5% reflectivity at one end and 100% at the other one. Then, if the background losses are negligible, $G_{975} = 7.28$ dB.

Consider a representative core-doped prior-art design with $r \approx r_{effective} = 100$. Then, for every dB of pump absorption we get 74 dB of gain at 1028 nm. Since the gain at unwanted wavelengths must be below approximately 50 dB, we would have to restrict the single-pass pump absorption to below 1 dB or 20%. This would be a highly inefficient laser.

Instead, we propose to use ring-doping. Then, the pump absorption can be 5 dB or more, which allows for a good laser efficiency. Note that increasing the end-face reflectivity at 975 nm will not help us much, as the high gain at 1028 nm largely follows from the requirements on pump absorption, while it is comparatively insensitive of the gain at 975 nm. For the same reason, the gain at 1028 nm will not be much higher for a high-gain amplifier at 975 nm than it is for a low-gain laser, so the disclosed design provides benefits for both applications.

A high-power laser at 975 nm can be used for pumping $Er^{3+}$. Also other wavelengths can be used for this, e.g., 980 nm and 985 nm. However, also those wavelengths are severely affected by unwanted emission around 1030 nm.

TABLE I

Cross-sections for absorption and stimulated emission used in some numerical examples.

| Active medium | Wavelength/ nm | Absorption cross-section/ $10^{-25}$ m$^2$ | Emission cross-section/ $10^{-25}$ m$^2$ | Remark |
|---|---|---|---|---|
| $Nd^{3+}$:glass | 800 | 20 | 0 | Pump to $^4F_{5/2}$. |
| $Nd^{3+}$:glass | 870 | 10 | 10 | |
| $Nd^{3+}$:glass | 1050 | 0 | 30 | Unwanted wavelength |
| $Yb^{3+}$:glass | 912 | 8.25 | 0.275 | Pump |
| $Yb^{3+}$:glass | 975 | 25.85 | 25.85 | |
| $Yb^{3+}$:glass | 980 | 6.76 | 8.57 | |
| $Yb^{3+}$:glass | 985 | 1.77 | 2.97 | |
| $Yb^{3+}$:glass | 1030 | 0.45 | 6.3 | Unwanted wavelength |
| $Er^{3+}$:glass | 980 | 2 | 0 | Pump to $^4I_{11/2}$ |
| $Er^{3+}$:glass | 1531 | 5 | 5 | |
| $Er^{3+}$:glass | 1550 | 2.4 | 3.8 | |
| $Er^{3+}$:glass | 1564 | 1.6 | 3 | Unwanted wavelength |

In the following, we will show that lasing at 975 nm will be particularly sensitive to any unbleachable $Yb^{3+}$, the existence of which has been reported in [R. Paschotta, J.

Nilsson, P. R. Barber, A. C. Tropper, and D. C. Hanna, "Lifetime quenching in Yb doped fibers", submitted to Optics Communications]. This sensitivity can be order of magnitudes higher in core-doped designs according to prior art, compared to the devices of the present invention.

From Eq. 6, we get $$\alpha_{975}^{ss}=1.07\ G_{975}+6.48(\Psi_{doped}/\Psi_{p,doped})\ \alpha_p^{operating}\ [dB] \quad (9)$$

Hence, with a prior-art design for cladding-pumping, we get several thousand decibels of small-signal absorption at 975 nm for a desired pump-absorption of around 5 dB. For $r_{effective}=100$, already an unsaturable fraction of 1% of this (the lowest value reported in R. Paschotta, J. Nilsson, P. R. Barber, A. C. Tropper, and D. C. Hanna, "Lifetime quenching in Yb doped fibers", submitted to Optics Communications) leads to an unsaturable absorption of around 30 dB, which is unacceptable. With the new devices, the sensitivity is drastically reduced. Even further reductions are possible by lasing at other wavelengths, e.g., $$\alpha_{980}^{ss}=0.83\ G_{980}+1.34(\Psi_{doped}/\Psi_{p,doped})\alpha_p^{operating}\ [dB] \quad (10)$$

at 980 nm, and $$\alpha_{985}^{ss}=0.64\ G_{985}+0.37(\Psi_{doped}/\Psi_{p,doped})\ \alpha_p^{operating}\ [dB] \quad (11)$$

at 985 nm. The sensitivity to quenching is much reduced, and can be quite small in a ring-doped device.

While the analytic considerations above clearly demonstrate the advantages of the disclosed devices, they do not quantify the advantages in terms of the most important laser characteristics, namely, pump threshold $P_{th}$ and slope efficiency $\eta_{slope}$. In order to provide a more complete description of the improvements compared to prior art, we next present calculations of $P_{th}$ and $\eta_{slope}$ from simulations with a spectrally and spatially resolved numerical model [B. Pedersen, A. Bjarklev, J. H. Povlsen, K. Dybdal, and C. C. Larsen, "The design of erbium-doped fiber amplifiers", J. Lightwave Technol. 9, 1105–1112 (1991)]. The only significant simplification in the model is that the pump is always assumed to be uniformly distributed across the inner cladding. Besides that, the gain medium is assumed to be homogeneously broadened, which is reasonable for $Yb^{3+}$:glass systems. With the model, we analyzed fibers of different core-doped and ring-doped designs. In all cases, we kept the doped area constant, equal to the core size, while the outer radius $r_d^{outer}$ of the doped area and hence $\Psi_{doped}$ was varied. The area ratio was 80, and $\Psi_{p,doped}=(3080\ \mu m_2)^{-1}$. Other parameters are given in Table 2.

A first studied cavity had one laser mirror formed by a bare, cleaved, fiber end, providing a broadband reflectivity of 3.5%, while a narrow-band reflector (typically, a fiber bragg-grating) provided a 99.9% reflectivity in a desired laser wavelength range 975 nm to 977 nm. Outside this range, the reflectivity was zero, as can be achieved with an AR-coated or an angle-cleaved fiber end.

Lasing in the desired wavelength range was prevented by strong ASE at long wavelengths (1028 nm–1035 nm) until $r_d^{outer}$ became 5 $\mu$m. Then, the diameter of the inner ring is 4.2 $\mu$m and $r_{effective}=5.8$ in good agreement with earlier estimates. The results are presented in Table 3.

TABLE 2

Values used in detailed Yb-calculations. Other parameters as in Table 1.

| Quantity | Symbol | Value |
|---|---|---|
| Numerical aperture | NA | 0.1 |
| Core diameter | | 7 $\mu$m |
| Cut-off wavelength | $\lambda_c$ | 915 nm |
| Doped area | $A_{doped}$ | 38.5 $\mu m^2$ |
| Yb concentration | $[Yb^{3+}]$ | $2.7 \times 10^{25}\ m^{-3}$ |
| Signal overlap with core | $\Gamma_{core}$ | 0.796 |
| Area of inner cladding | $A_{pump}$ | 3080 $\mu m^2$ |
| Pump overlap with core | $\Gamma_{p.\ core}$ | 1/80 |
| Effective area ratio for core-doped device | $r_{effective}$ | 63.7 |
| Small-signal pump-absorption | $\alpha_p^{ss}$ | 1.21 dB/m |
| Metastable lifetime | $\tau$ | 0.76 ms |
| Background loss | — | 0 dB/m |
| Reflectivity pump launch end | — | 99.9% at desired wavelength, 0 elsewhere |
| Reflectivity at other end | — | Either 3.5% broadband, or 50% at desired wavelength and 0% elsewhere |

TABLE 3

Laser characteristics of 10 m long unquenched fiber operating at 976 nm, with a HR fiber grating and a bare, cleaved end providing the laser cavity reflections. The small-signal absorption $\alpha^{ss}$ applies to a wavelength of 977 nm. The transmitted pump power $P_p^{transmitted}$ is expressed as a fraction of the launched pump power. $r_d^{inner}$ is the inner radius of the gain medium.

| $r_d^{outer}/\mu m$ | $r_d^{inner}/\mu m$ | $r_{effective}$ | $\alpha^{ss}/dB/m$ | $P_{th}/W$ | $\eta_{slope} \times 100$ | $P_p^{transmitted}$ |
|---|---|---|---|---|---|---|
| 3.5–5 | 0–3.6 | 64–12 | 170–31 | No lasing for a pump power of 5 W. ASE around 1030 nm dominates the output | | 22%–46% |
| 5.5 | 4.2 | 5.8 | 15.3 | 2.01 ± 0.1 | 69 ± 2 | 26% |
| 6.0 | 4.9 | 2.9 | 7.47 | 2.14 ± 0.1 | 66 ± 2 | 29% |
| 6.5 | 5.5 | 1.6 | 4.03 | 2.37 ± 0.1 | 62 ± 2 | 33% |
| 7.0 | 6.1 | 1.0 | 2.58 | 2.78 ± 0.1 | 61 ± 2 | 34% |
| 7.5 | 6.6 | 0.57 | 1.43 | 3.62 ± 0.1 | 51 ± 2 | 44% |

Clearly, in contrast to prior-art devices, the device disclosed here can lase at 976 nm with a good efficiency. The range of acceptable effective area ratios is 1–6. The slope efficiency with respect to absorbed pump was approximately 93%—a quite high number which in reality will be lowered by background losses. These were assumed negligible in the calculations.

A shorter fiber length favors lasing at shorter wavelengths in a two-level system like this. However, shortening the fiber to 5 m is not sufficient for lasing at 976 nm in a core-doped design. Moreover, at this length, a significant fraction of the pump is not absorbed. Hence, making the fiber sufficiently short to ensure 976 nm lasing in a core-doped design is not an attractive option, even if the pump is double-passed through the cavity. The conclusion is that prior-art designs are inadequate for lasing at 976 nm for the considered area ratio.

Above, the smaller ring diameters appear to be better than the larger ones (provided that lasing is obtained). However, if a fraction of the Yb-ions are quenched, this will change, as is evident from Table 4.

The relations will be similar for other wavelengths in this transition. Equation 12 reveals that the gain at 1050 nm will be at least three times larger than that at 870 nm. This limits the 870 nm gain to 15 dB—a comparatively low but still useful number. However, with a prior-art, core-doped device, it will not be possible to absorb the pump properly, since the gain at 1050 nm becomes prohibitively high already for a single-pass pump absorption of less than 0.5 dB (a 10%). On the other hand, in a ring-doped device, $r_{effective}$ can be reduced by a factor 10 or more, so an absorption $\alpha_p^{operating}$ of at least 5 dB (=68%) is possible, while still allowing for a single-pass gain at 870 nm of 10 dB.

In Eq. 12, we for simplicity assumed that $\Psi_{doped}$ is equal at 1050 nm and 870 nm. However, for ring-doping, $\Psi_{doped}$ will be larger at 1050 nm than at 870 nm. This means that the factor "3" in Eq. 12 actually will be larger. For instance, with a numerical aperture of 0.1 and a core diameter of 6 $\mu$m, a doped ring with $r_d^{inner}=4$ $\mu$m and $r_d^{outer}=5$ $\mu$m gives

TABLE 4

Laser characteristics of 5 m long fiber operating at 976 nm, with 2% of the $Yb^{3+}$-ions quenched. A HR fiber grating and a bare, cleaved end provided the laser cavity reflections.

| $r_d^{outer}/\mu m$ | $r_d^{inner}/\mu m$ | $r_{effective}$ | $\alpha^{ss}/dB/m$ | $P_{th}/W$ | $\eta_{slope} \times 100$ | $P_p^{transmitted}$ |
|---|---|---|---|---|---|---|
| 3.5–4.5 | 0–3.5 | 64–22 | 170–57 | No lasing for a pump power of 10 W. ASE around 1030 nm dominates the output | | 33%–47% |
| 5.0 | 3.5 | 12 | 30.6 | 1.69 ± 0.1 | 29 ± 2 | 50% |
| 5.5 | 4.2 | 5.8 | 15.3 | 1.77 ± 0.1 | 34 ± 2 | 53% |
| 6.0 | 4.9 | 2.9 | 7.47 | 2.04 ± 0.1 | 33 ± 2 | 58% |
| 6.5 | 5.5 | 1.6 | 4.03 | 2.57 ± 0.1 | 29 ± 2 | 64% |
| 7.0 | 6.1 | 1.0 | 2.58 | 3.58 ± 0.1 | 26 ± 2 | 68% |

At 980 nm and 985 nm, the fiber behaved similarly as at 976 nm, except that 985 nm would not lase for an output reflectivity of 3.5%. A grating with 50% reflectivity at the output end allowed for lasing at 985 nm. In contrast, lasing at 976 nm in an unquenched fiber was only marginally improved by a grating also at the output end, and for a partly quenched fiber, results were worse with a grating than with a bare end. Also, as predicted in Eqs. 9–11, the longer wavelengths are less sensitive to quenching than are the 976 nm lasers. These and other detailed numerical model calculations have shown:

The earlier analytic considerations are largely accurate in determining whether or not a laser can work efficiently.

The disclosed devices perform much better as lasers at 975 nm–985 nm than do prior-art designs.

The best value of the effective area ratio is around 3–10 for this laser.

The sensitivity to quenching is reduced with a smaller effective area ratio.

The susceptibility to quenching is smaller at 980 nm and especially at 985 nm than it is at 976 nm.

Neodymium-doped Fiber Operating on the $^4F_{3/2} \rightarrow {}^4I_{9/2}$ Transition (850 nm–950 nm)

A device designed in a similar way as the $Yb^{3+}$-doped cladding-pumped fiber will also improve on prior-art designs for this $Nd^{3+}$-transition. For $Nd^{3+}$-doped devices at these wavelengths, the suppression of the dominant $^4F_{3/2} \rightarrow {}^4I_{11/2}$ at 1050 nm transition is a problem, especially for cladding-pumped devices. For a wavelength of 870 nm, typical cross-sections (cf. Table 1) gives the following relation between the gains at 870 nm and around 1050 nm and the pump absorption of the pumped fiber:

$$G_{1050} = 3\ G_{870} + 1.5(\Psi_{doped}/\Psi_{p,doped})\alpha_p^{operating} \text{ [dB]} \quad (12)$$

$(\Psi_{1050,doped}/\Psi_{870,doped})=1.6$. Then, $G_{1050}=4.8\ G_{870}+1.5\ (\Psi_{doped}/\Psi_{p,doped})\ \alpha_p^{operating}$. Nevertheless, appropriate designs allow enough gain for efficient lasing at 870 nm before the gain at 1050 nm becomes unrealistically large. The 870 nm gain can be even higher in modified designs: If the core has a higher cut-off wavelength of, e.g., 950 nm, the core will be multi-moded at 870 nm. Since the higher-order $LP_{11}$-mode penetrates further into the cladding than the fundamental $LP_{01}$-mode does, the $LP_{11}$-mode gain at 870 nm is higher than the gain of the $LP_{01}$-mode. Hence, higher-order mode lasing at 870 nm becomes relatively easier to achieve compared to the 1050 nm lasing in the fundamental mode.

Erbium-doped Fiber Operating on the $^4I_{13/2} \rightarrow {}^4I_{15/2}$ Transition (1450 nm–1600 nm)

The concerns of this device are similar to those of the cladding-pumped Yb-doped fiber described above. For instance, if we want the device to operate at 1531 nm, emission at 1564 nm or longer wavelengths is a potential problem in an aluminosilicate host. From Eq. 3 and Table 1, we get $$G_{1564} = 0.6\ G_{1531} + 0.7(\Psi_{doped}/\Psi_{p,doped})\ \alpha_p^{operating} \text{ [dB]} \quad (13)$$

Clustering is a well-known problem in erbium-doped fibers, and results in a saturable absorption. Equation 6 gives $$\alpha_{1531}^{ss} = G_{1531} + 5(\Psi_{doped}/\Psi_{p,doped})\alpha_p^{operating} \text{ [dB]} \quad (14)$$

These numbers are similar to the ones for $Yb^{3+}$ operating at 976 nm, so ring-doping allows for similar improvements as for $Yb^{3+}$.

The wavelength range 1550 nm–1565 nm is technologically important for optical communication systems. In this range, lasing at 1550 nm may be particularly hard to achieve, because the gain at, e.g., 1564 nm may become prohibitively large. From Eq. 3, we get $$G_{1564}=0.79\ G_{1550}+0.15(\Psi_{doped}/\Psi_{p,doped})\ \alpha_{p,operating}\ [dB] \quad (15)$$

Also in this relatively benign case, adequate pump absorption can be troublesome in a prior-art design for unfavorable values of $r_{effective}=(\Psi_{doped}/\Psi_{p,doped})$, so a ring-doped fiber will be advantageous. As it comes to the unsaturable absorption, we have that $$\alpha_{1550}^{ss}=0.6\ G_{1550}+2.0(\Psi_{doped}/\Psi_{p,doped})\ \alpha_p^{operating}\ [dB] \quad (16)$$

Core doped devices can then have a small signal absorption of 1000 dB. Even an unsaturable fraction as low as 1% of this small signal absorption will create an unacceptable unsaturable loss of 10 dB. Consequently we conclude that ring-doped designs are better.

Principle

The type of high-energy pulse amplifiers and lasers we consider are so-called energy-storage devices in which a pulse extracts significant amounts of energy stored in the gain medium. The energy supplied by the pump during the generation/amplification of a single pulse can be negligible. The amount of energy stored in the device then sets an upper limit on how much energy can be extracted by a pulse. This is a significant difference compared to other laser and amplifiers, for which power extraction is typically limited by the supplied pump power, and in any case not by the stored energy.

In order to obtain high-energy pulses from such an energy storage laser or an amplifier, we need both a large stored (and extractable) energy and a sufficiently high gain. While the gain efficiency of waveguiding amplifiers means that it is often easy to meet the second objective, the same gain efficiency can make it difficult to store large amounts of energy in the device: The gain efficiency implies that a comparatively small amount of extractable energy in the gain medium leads to a high gain. However, as already pointed out, since ASE limits the achievable gain of the device, it also limits the energy that can be stored [J. Nilsson and B. Jaskorzynska, "Modeling and optimization of low repetition-rate high-energy pulse amplification in cw-pumped erbium-doped fiber amplifiers", Opt. Lett. 18, 2099–2101 (1993).].

The gain G in a transverse mode is related to the energy E stored in the gain medium through the following relation:

$$G=(10/\ln 10)\ [\Psi_{doped}E(\sigma^a+\sigma^e)/h\nu-\alpha L]=(10/\ln 10)\ [\Psi_{doped}E/U_{sat}-\alpha L]=(10/\ln 10)\ \Psi_{doped}E^{extractable}/U_{sat}=(10/\ln 10)E^{extractable}/E_{sat}\ [dB] \quad (17)$$

Here, hv is a photon energy, αL is the unpumped loss of the medium, $U_{sat}\equiv h\nu/(\sigma^a+\sigma^e)$ is the saturation energy fluence, $E^{extractable}$ is the energy over the bleaching level, i.e., the maximum energy that can be extracted from the device, and $E_{sat}\equiv U_{sat}/\Psi_{doped}$ is the saturation energy. The important point is that G is proportional to $\Psi_{doped}$. Hence, a smaller value of $\Psi_{doped}$ leads to a smaller gain per unit extractable energy. Therefore, for a gain medium located in a region where the normalized modal intensity of the signal beam is small, the extractable energy for a given gain will be high. Then, if the gain is sufficiently large for the device in question, a device with low values of $\Psi_{doped}$ will be capable of generating or amplifying pulses to high energies.

Here, we disclose the use of devices that, although the light is tightly confined in a single- or few-moded waveguide, have a small value of $\Psi_{doped}$ for high-energy pulse amplifiers and lasers, e.g. Q-switched and gain-switched ones. Note that any effect this may have on the relative gain at different wavelengths can be counteracted by simply making the device longer or increasing the concentration of active centra.

In addition to the general geometries described earlier, we will now describe some specific geometries and devices.

Core-pumped Ring-doped Pulse Fiber Amplifier or Fiber Laser

In the important class of core-pumped devices, the pump and the signal are guided by the same core. For instance, most erbium-doped fiber amplifiers (EDFAs) are of this type. Typically, the gain medium can be a $Tm^{3+}$, $Sm^{3+}$, $Ho^{3+}$, $Nd^{3+}$, $Er^{3+}$, or $Yb^{3+}$-doped glass. The desired weakness of the interaction between the signal beam and the gain medium normally then implies that also the interaction with the pump beam is weak, whereby the pumping of the medium becomes weaker and the pump absorption smaller. Nevertheless, the disclosed devices can show significant improvements.

Figure 6:
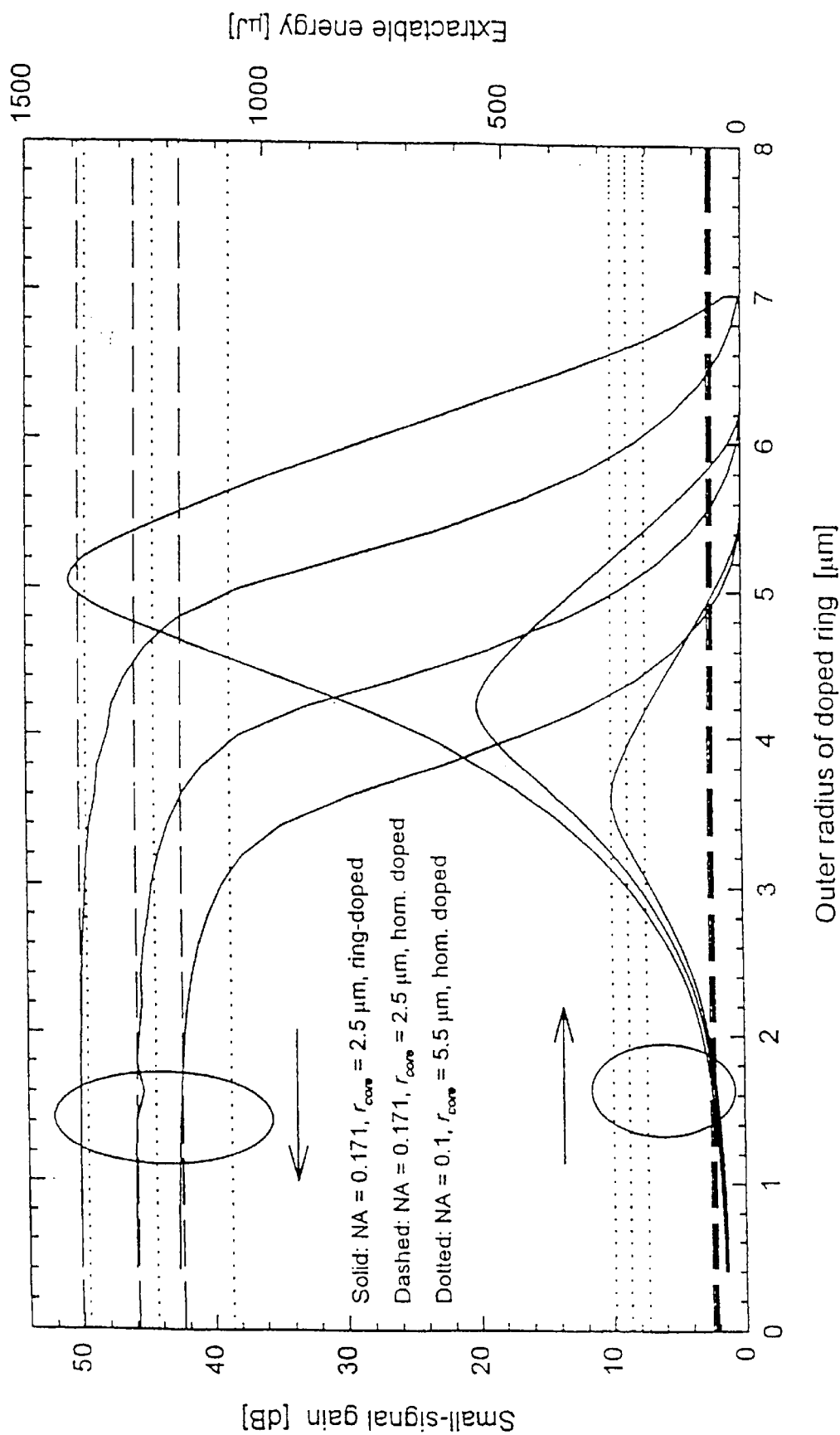
FIG. 6 illustrates the extractable energy and small-signal gain at 1550 nm for a ring-doped erbium-doped fiber (EDF) pumped by 0.1 W, 0.2 W, and 0.5 W at 1480 nm in the core.
Figure 8:
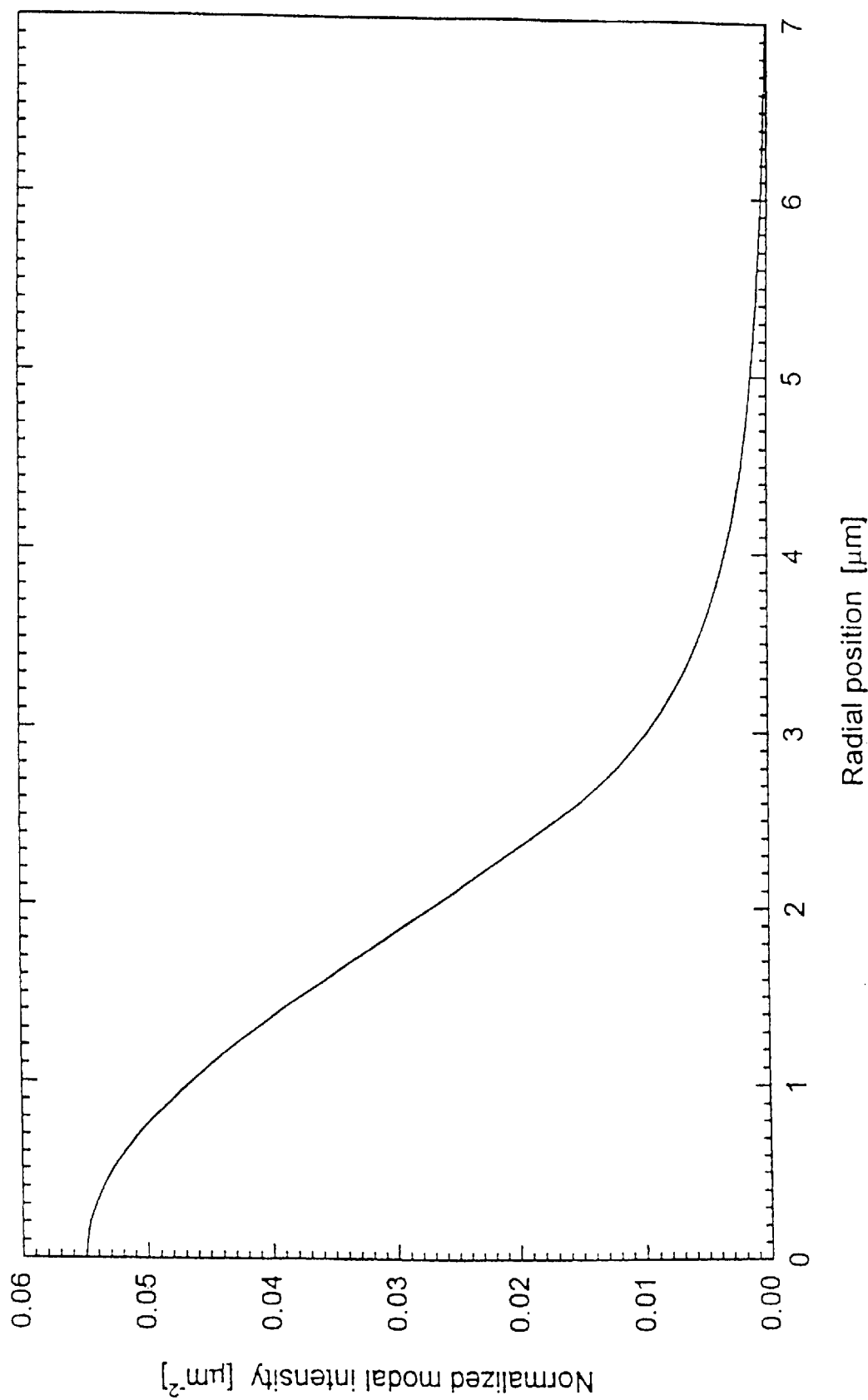
FIG. 8 illustrates the normalized modal intensity Ψ vs. ring position for the ring-doped EDFs of FIGS. 6, 7, and 10.

We can distinguish two cases:

1. The pump and signal wavelengths are close, so the signal and pump mode profiles are close to each other. In this case, it is just a matter of finding suitable values of Ψ for placing the ring. These will depend on the lifetime and cross-sections of the dopant, the pump power and pulse energy, and other parameters. FIG. 6 shows how the extractable energy and small-signal gain at 1550 nm depends on the position of the ring for a ring-doped EDF core-pumped by 0.1 W, 0.2 W, and 0.5 W at 1480 nm. FIG. 6 illustrates the extractable energy and small signal gain at 1550 nm for a ring-doped erbium-doped fiber (EDF) pumped by 0.1 W, 0.2 W, and 0.5 W at 1480 nm in the core. The ring thickness was sufficiently thin to make variations of the normalized intensity of the modal field negligible over its thickness. Other parameters are listed in Tables 5 and 6 under "normal core" amplifier and a "large core" amplifier. In all cases, a higher pump power gives a higher small-signal gain and a larger extractable energy. Moreover, the fiber length was optimized for maximum small-signal gain in all cases. The advantages compared to the prior-art EDFs (also shown) are substantial. FIG. 8 shows model calculation results on how $\Psi_{doped}$ depends on the ring position for the ring-doped EDF. The method used for these and other similar calculations in this specification follows [J. Nilsson and B. Jaskorzynska, "Modeling and optimization of low repetition-rate high-energy pulse amplification in cw-pumped erbium-doped fiber amplifiers", Opt. Lett. 18, 2099–2101 (1993).].

Figure 7:
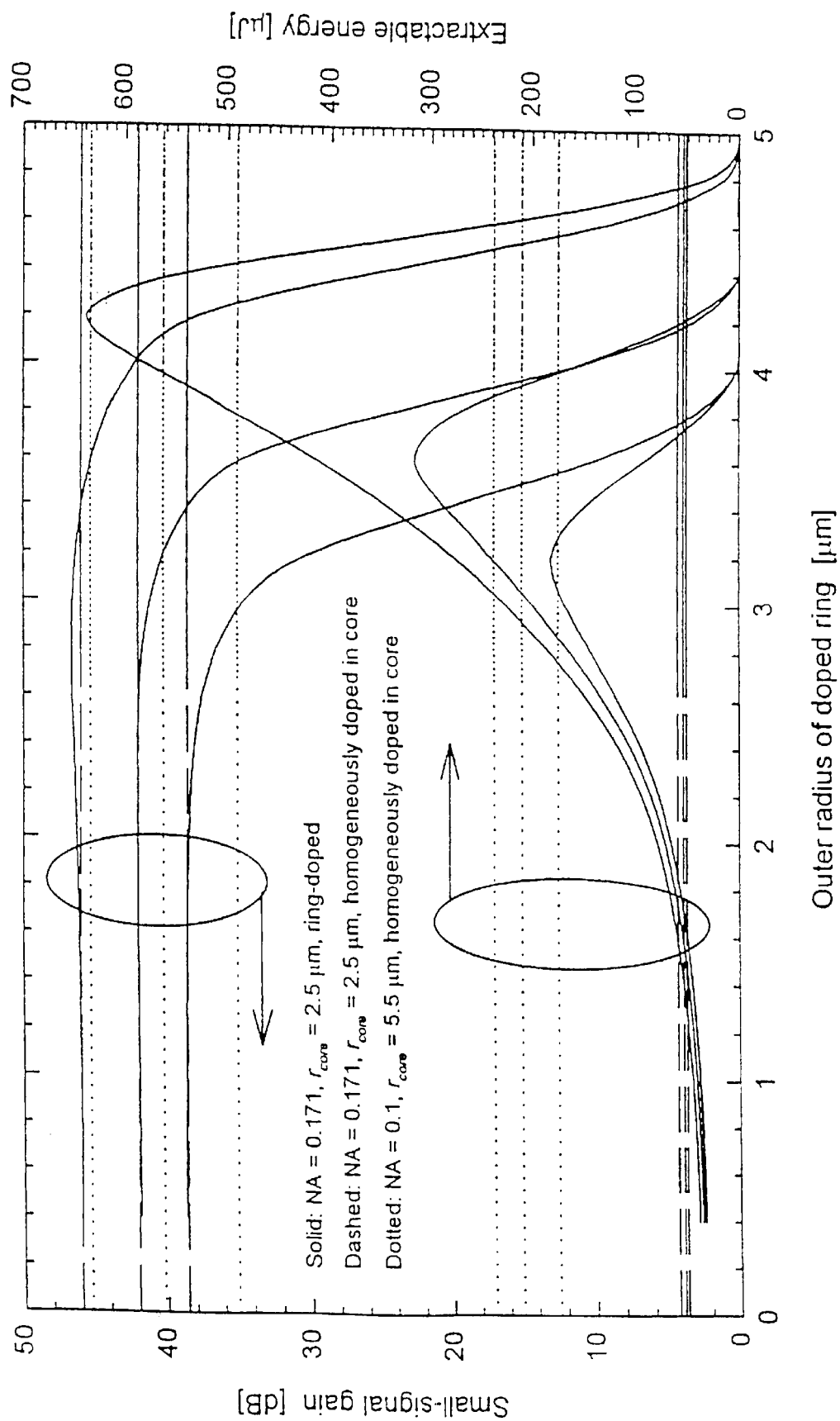
FIG. 7 illustrates the extractable energy and small-signal gain at 1550 nm for a ring-doped erbium-doped fiber (EDF) pumped by 0.1 W, 0.2 W, and 0.5 W at 980 nm in the core.

2. The pump and signal mode profiles are different. In this case, the pump is unlikely to penetrate far into the cladding, so the doped region must be inside the core or immediately outside the core. Unfortunately, for positions for which the signal intensity is suitable, the pump intensity tends to be much too weak. A good design should then aim at reducing this problem as far as possible. FIG. 7 is similar to FIG. 6, except that the pump wavelength is now 980 nm. In particular, FIG. 7 illustrates the extractable energy and small-signal gain at 1550 nm for a ring-doped erbium-doped fiber (EDF) pumped by 0.1 W, 0.2 W and 0.5 W at 980 nm in the core. The ring thickness was sufficiently thin to make variations of the normalized modal intensity negligible over its thickness. Other parameters are listed in Tables 5 and 6 under "normal core amplifier". For comparison, also results for EDFAs homogeneously doped throughout the core are shown, both for the "normal core" amplifier and a "large core" amplifier. In all cases, a higher pump power gives a higher small-signal gain and a larger extractable energy. Moreover, the fiber length was optimized for maximum small-signal gain in all cases. We see that the results are now worse, and that the benefits of ring-doping are smaller. However, performance is still superior compared to that of prior-art designs.

TABLE 5

Geometrical and dopant parameters for energy-storage EDFAs.

| Quantity | Symbol | Normal-core amplifier | Large-core amplifier |
|---|---|---|---|
| Core diameter | | 5 μm | 11 μm |
| Numerical aperture | NA | 0.171 | 0.100 |
| Cut-off wavelength | $\lambda_c$ | 1118 nm | 1437 nm |
| Signal overlap with core | $\Gamma_{core}$ | 0.651 | 0.795 |
| Area of inner cladding for cladding-pumping | $A_{pump}$ | 1571 μm² | 1571 μm² |
| Pump overlap with core for cladding-pumping | $\Gamma_{p.core}$ | 1/80 | 1/16.5 |
| Effective area ratio for core-doped device | — | 52.1 | 13.1 |
| Background loss | — | 0 dB/m | 0 dB/m |

TABLE 6

Spectroscopic parameters for energy-storage EDFAs.

| Quantity | Symbol | Value |
|---|---|---|
| Metastable lifetime | τ | 10.9 ms |
| Absorption cross-section at 1480 nm | $\sigma_{1480}^a$ | 1.87 × 10⁻²⁵ m² |
| Emission cross-section at 1480 nm | $\sigma_{1480}^e$ | 0.75 × 10⁻²⁵ m² |
| Absorption cross-section at 980 nm | $\sigma_{980}^a$ | 2 × 10⁻²⁵ m² |
| Absorption cross-section at 1550 nm | $\sigma_{1550}^a$ | 2.45 × 10⁻²⁵ m² |
| Emission cross-section at 1550 nm | $\sigma_{1550}^e$ | 3.83 × 10⁻²⁵ m² |
| Pump intensity required at 1480 nm to invert 35.7% of the population | $I_{sat}$ | 0.0470 mW/μm² |
| Pump intensity required at 980 nm to invert half the population | $I_{sat}$ | 0.0930 mW/μm² |

As an alternative, the core can be single-mode at the signal wavelength, and multi-moded for the pump. It is well-known that pump-light in higher-order modes will penetrate further into the cladding, thereby improving the pumping of the gain medium. Moreover, for so-called upconversion devices, the pump wavelength is shorter than the signal wavelength, with the favorable side-effect that the pump extends further into the ring, even if it is in the same mode as the signal.

Figure 9:
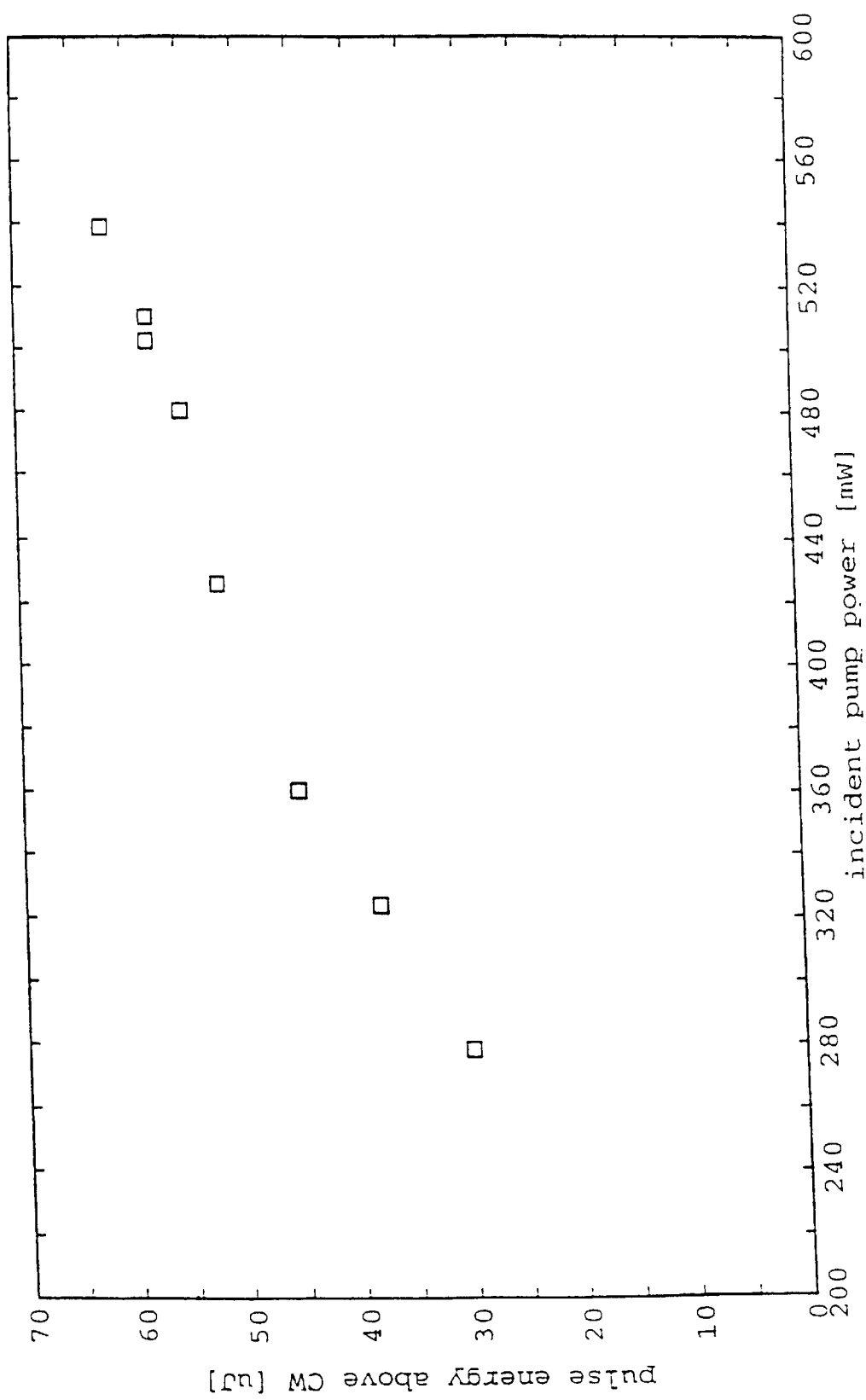
FIG. 9 illustrates the extractable energy ("pulse energy above cw") vs. launched pump power for a core-pumped fiber amplifier with an $Yb^{3+}$-doped ring.

FIG. 9 shows measured results on high-energy pulse amplification for a ring-doped, core-pumped $Yb^{3+}$-doped fiber amplifier according to the present embodiments. FIG. 9 illustrates the extractable energy ("pulse energy above cw") vs launched pump power for a core-pumped fiber amplifier with an $Yb^{3+}$-doped ring. The fiber was pumped at 1000 nm, and amplified signal pulses at 1047 nm. The highest recorded extracted pulse energy (above the cw-level) of more than 60 μJ can be compared to published 10 μJ total pulse energy from large-area core amplifier (albeit at a lower pump power of 160 mW) [D. T. Walton, J. Nees, and G. Mourou, "Broad-bandwidth pulse amplification to the 10-μJ level in an ytterbium-doped germanosilicate fiber", Opt. Lett. 21, 1061–1063 (1996)], as used in the prior art for high pulse-energies. The ring-doped fiber had $\Psi_{doped} \approx 0.02$ μm². A smaller value can allow for even larger extracted energies, as long as the pump power is large enough to create a significant gain.

The emission cross-section of erbium in glass is smaller than for many other gain media, like $Nd^{3+}$:glass at 1050 nm and many transition metals. It follows from Eq. 17 that the stored energy will be smaller in these media. Therefore, the improvements with ring-doping can be relatively larger than for $Er^{3+}$:glass.

Cladding-pumped Devices

We now describe cladding-pumped ring-doped fibers for high-energy pulse amplification and generation. Because of the typically higher pump powers used with these devices and because of the separately controllable normalized pump and signal mode intensities in the doped region, the disclosed cladding-pumped devices will by far outperform any prior-art core-doped single- or few-moded waveguiding device. A typical device will be a rare-earth-activated glass fiber optically pumped by a pump beam launched into the inner cladding (cf. FIG. 3).

Figure 10:
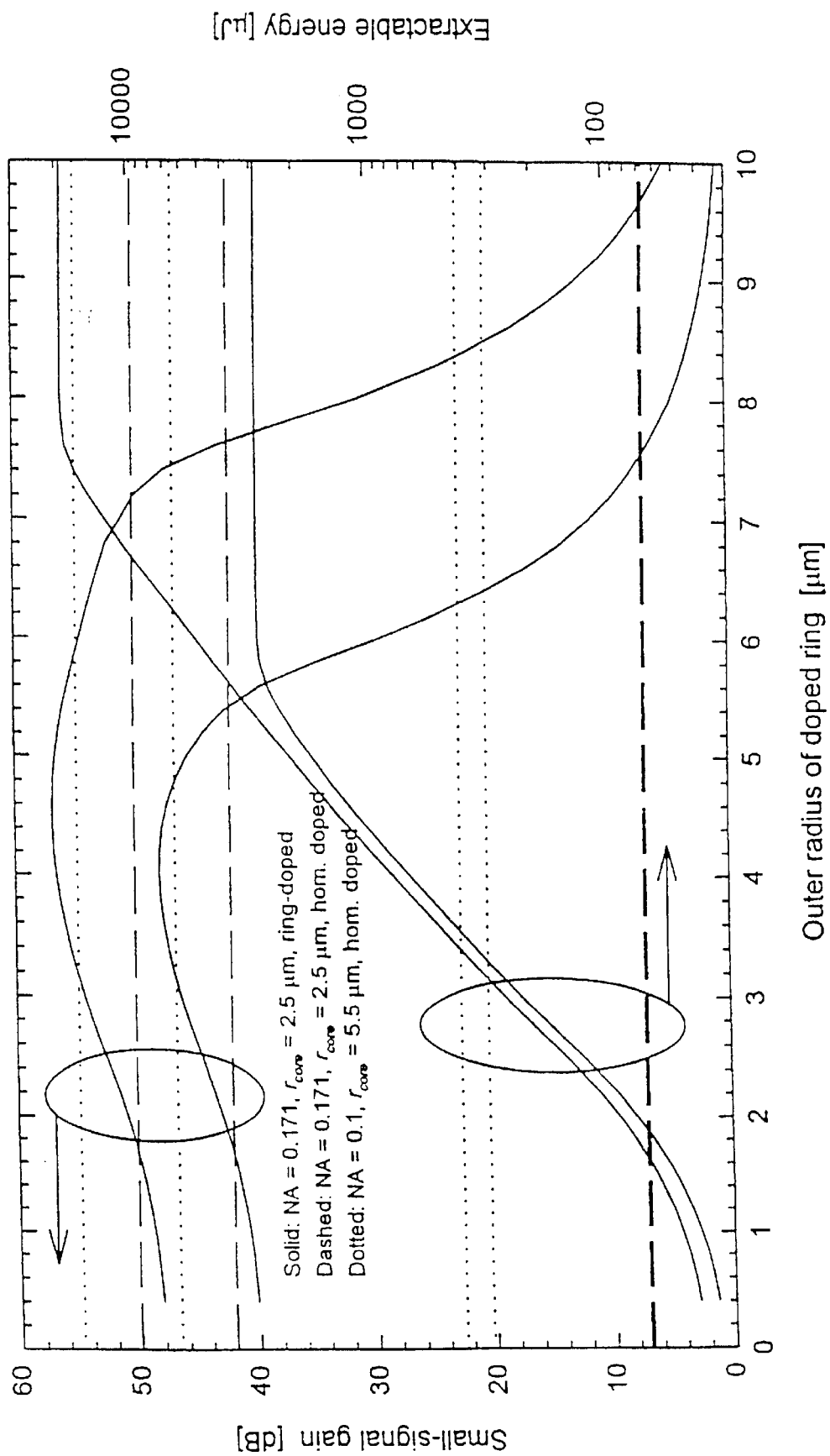
FIG. 10 illustrates the extractable energy and small-signal gain at 1550 nm for a ring-doped EDF cladding-pumped by 1 W and 5 W at 980 nm.

FIG. 10 shows how the extractable energy and small-signal gain at 1550 nm depends on the position of the ring for a ring-doped EDF cladding-pumped by 1 W and 5 W at 980 nm. In particular, FIG. 10 illustrates the extractable energy and small-signal gain at 1550 nm for a ring-doped EDF cladding-pumped by 1 W and 5 W at 980 nm. The ring thickness was sufficiently thin to make variations of the normalized modal intensity negligible over its thickness. Other parameters are listed in Tables 5 and 6 under "normal-core amplifier". For comparison, also results for EDFAs homogeneously doped throughout the core are shown, both for the "normal core" amplifier and a "large core" amplifier. In all cases, a higher pump power gives a higher small-signal gain and a larger extractable energy. Moreover, the fiber length was optimized for maximum small-signal gain in all cases. In all cases, the fiber length was optimized for maximum small-signal gain. Other parameters were the same as in FIG. 10, and are listed in Tables 5 and 6. The advantages compared to the prior-art EDFs (also shown) are substantial. The increase of the extractable energy can approach two orders of magnitude in the devices studied here.

In view of these results, we propose a ring-doped cladding-pumped optical fiber where the ring is located at a position where the mode intensity is, e.g., one or two orders of magnitude smaller than it is in its center. In order to get sufficient absorption, sensitization can be used, e.g., as in ytterbium-sensitized erbium-doped fibers.

A ring-shaped gain medium outside the core can be better pumped by a beam in the cladding. Thus, while cladding-pumping has normally been considered to facilitate launching of non-diffraction-limited sources like diode bars, we also propose to use cladding-pumped, ring-doped fibers even when high-brightness, near-diffraction-limited pumps that could be efficiently launched into the core are available. The high brightness will still be favorable because the area of the inner cladding can be small. In these devices, cladding-modes can see a higher gain than the desired core-mode does, whereby some measure for suppressing cladding-modes would be required.

Even if only a small part of the stored energy is extracted from a ring-doped amplifier, the high stored energy can still be advantageous, since it for instance reduces the distortions of the chirped-pulse amplification with small distortions of the pulse shape.

Passively Q-switched and Gain-switched Lasers

In passively Q-switched lasers, energy and thereby ASE builds up in a region of gain. The ASE then transfers energy to a saturable absorber. The saturable absorber must be so that the absorption change per unit stored energy is smaller than it is in the gain region. In prior-art devices, this is achieved by using a saturable absorber with large absorption and/or stimulated emission cross-sections, compared to those of the gain medium. Ring-doped fibers open up for Q-switched lasers where the gain section and the saturable absorber are made from the same material, e.g. an erbium-doped glass. This is possible since $E_{sat} \equiv h\nu/[\Psi_{doped}(\sigma^a+\sigma^e)]$ can be two orders of magnitude higher in the ring-doped fiber than in the core-doped one, even though the material-dependent quantities ($\sigma^a+\sigma^e$) are equal in the two different fibers.

The gain section can also be a core-doped fiber with a large area core, however, this does not work as well as a properly designed ring-doped fiber.

In a first embodiment, a ring-doped fiber is cascaded with a core-doped fiber, each of which are doped with a similar dopant with a non-negligible ground-state absorption, to form a laser cavity. A pump beam is launched into a gain section, consisting of the ring-doped fiber, thereby building up a gain and stored energy. A cw pump beam can be used, and the fiber can be cladding-pumped. The gain section generates ASE, through which energy is transferred from the gain section to a core-doped fiber constituting a saturable absorber. The pump also acts to bleach the pump-absorption in the ring-doped fiber, whereby the pump penetrates deeper into the cavity, and possibly helps in bleaching the saturable absorber. The transfer of energy from the gain section to the absorber section increases the net gain in the cavity to a point where it exceeds threshold. Then, energy is radiated from the cavity in the form of a Q-switched pulse. This substantially reduces the stored energy, and hence the gain, in the cavity, so that the ASE becomes negligible, and the pump power that penetrates to the saturable absorber becomes small. The saturable absorber then relaxes to a state that is at least partly absorbing. Thereby, the absorption in the saturable absorber has increased substantially before the gain section starts to generate ASE again, whereupon the cycle is repeated.

A second embodiment is similar to the first embodiment, except that there is provided a pump-absorber or a pump reflector between the gain-section and the saturable absorber. This substantially reduces the pumping of the saturable absorber.

A third embodiment is similar to the first or second embodiment, except that the active centra in the gain medium and the saturable absorber are different. The pump wavelength can be chosen so that it cannot bleach the saturable absorber.

FIG. 11 is a view of a fiber having a saturable absorber (640) in the central part of the core (30), and a ring-shaped gain medium (620) around the absorber. In the illustrated example, the gain medium resides in the core, but it can be placed partly or wholly in the cladding (10).

FIG. 12 illustrates a semiconductor amplifier for signal amplification. The semiconductor amplifier provides gain for a guided optical signal beam in a region where the normalized modal intensity is small and comprises a cladding (410), a gain region or an active layer (420), a core or index guiding layer (430), a substrate (480), and a contact layer (490). Also the approximate location of a signal beam is indicated (470). The refractive index of the active layer (420) can be depressed with respect to the remainder of the cladding (410) in order to suppress gain guiding.

Figure 13B:
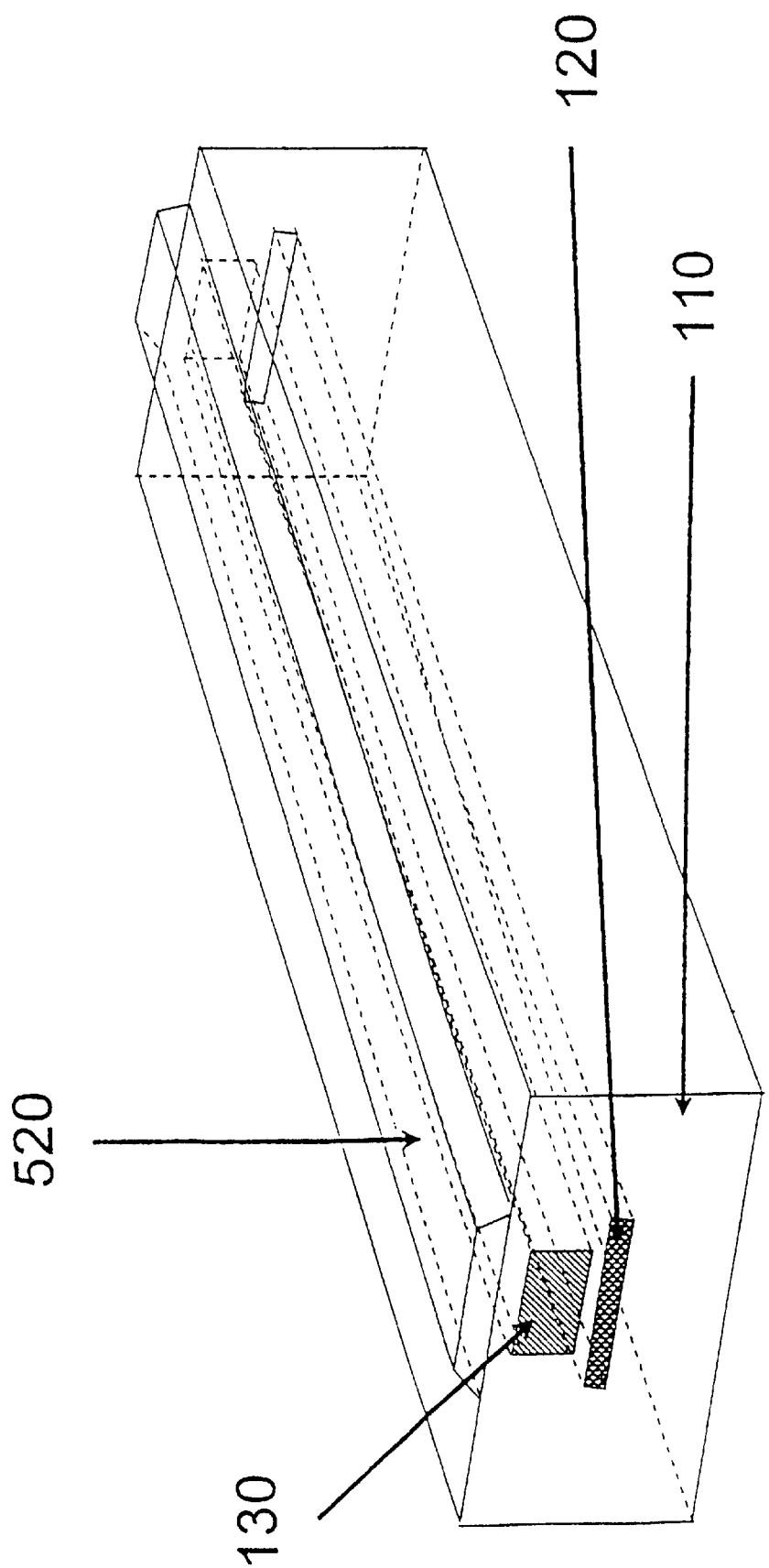

FIGS. 13a to c illustrate devices in which unwanted, higher-order modes are suppressed by the inclusion of an absorber. FIG. 13a shows a fiber with an amplifying ring 10 and an absorbing ring 510 configured to suppress high-order modes. The absorption of the desired fundamental mode is small or even negligible. FIG. 13b shows a planar waveguide with amplification of the evanescent field by a gain region 120, within an absorbing superstructure 520. Again, the absorption of the desired fundamental mode is small or even negligible. Undesired higher-order modes penetrate further into the absorber, whereby they are suppressed. FIG. 13c shows a double clad ring-doped fiber in which a signal-absorbing region 530 has been incorporated into the cladding, thereby preventing any build-up of signal light in the cladding.

Device with a Distributed Saturable Absorber

Above, two media with different saturation characteristics were combined in a cascade. However, the two gain media can also reside side by side in the same fiber. An example of this is illustrated in FIG. 11. A fiber having a core (30) and a cladding (10) is doped with a saturable absorber (640) and a gain medium (620). Here, the saturable absorber is located in a region where the normalized modal intensity is larger than it is in the region of the gain medium. Hence, if the absorber and gain media are similar (except that the gain medium is pumped), and the cross-section for stimulated emission of the gain medium is similar to the absorption cross-section of the absorber, the small-signal gain of the fiber can be negative or small, even though the extractable energy of the gain medium is larger than the energy required to bleach the saturable absorber. Hence, the ASE in the fiber can be suppressed, while the energy that can be extracted from the device, if for instance a signal pulse is launched into it, can be large.

In contrast to the prior art, a ring-shaped gain medium allows the active centra in the absorber and the gain media to be of the same or similar types, as long as it is possible to pump the centra in the gain medium while leaving those in the absorber medium unpumped. A particular studied embodiment consisted of an $Er^{3+}$-doped saturable absorber and an $Yb^{3+}$-sensitized $Er^{3+}$-doped gain medium. The $Er^{3+}$ in the gain medium was excited indirectly (i.e., via the $Yb^{3+}$) by an optical pump beam launched into the fiber core. The launched pump power was 1 W at a wavelength of 1064 nm, which is a wavelength that will not excite the $Er^{3+}$ in the saturable absorber. The fiber had a numerical aperture of 0.16, and a core diameter of 7 $\mu$m. The diameter of the saturable absorber (640) was 1 $\mu$m, while the inner and outer radii of the ring-shaped gain medium (620) were 3.4 $\mu$m and 3.5 $\mu$m, respectively. The $Er^{3+}$-concentration was $2.38 \times 10^{25}$ $m^{-3}$ in both the absorber and gain media, and the $Yb^{3+}$-concentration was $2.97 \times 10^{26}$ $m^{-3}$ in the gain medium. The absorption and emission cross-sections at the peak (wavelength 1536 nm) were both $6.8 \times 10^{-25}$ $m^2$. Hence, the small-signal absorption at that wavelength was 2.1 dB/m in the saturable absorber, and 1.3 dB in the (unpumped) gain medium. Moreover, at 1064 nm, the cross-sections for stimulated emission and absorption of the $Yb^{3+}$-ions were at $2 \times 10^{-26}$ $m^2$ and $5 \times 10^{-28}$ $m^2$, respectively. metastable lifetimes of the $Er^{3+}$ and the $Yb^{3+}$ were 10.2 ms and 1.3 ms, respectively. The energy was transferred from the $Yb^{3+}$ to the $Er^{3+}$ with a rate coefficient $k_{tr}$ of $1.05 \times 10^{-21}$ $m^3/s$ [J. Nilsson, P. Scheer, and B. Jaskorzynska, "Modeling and optimization of short $Yb^{3+}$-sensitized $Er^{3+}$-doped fiber amplifiers", IEEE Photon. Technol. Lett. 6, 383–385 (1994).]. The spectral characteristics of the gain and absorber region followed those for $Er^{3+}$ and $Yb^{3+}$ in a phosphosilicate glass. Numerical calculations, following those in [J. Nilsson and B. Jaskorzynska, "Modeling and optimization of low repetition-rate high-energy pulse amplification in cw-pumped erbium-doped fiber amplifiers", Opt. Lett. 18, 2099–2101 (1993).] and [J. Nilsson, P. Scheer, and B. Jaskorzynska, "Modeling and optimization of short $Yb^{3+}$- sensitized Er$^{3+}$-doped fiber amplifiers", IEEE Photon. Technol. Lett. 6, 383–385 (1994).] and using the parameters above, showed that the extractable energy in this device was approximately 0.6 mJ at 1536 nm and 1.1 mJ at 1560 nm.

In the example above, the ring-shaped gain region was thin and hence the extractable energy per unit length small. This implied that the length of the fiber became so long (several hundred meters) that background losses could become important, and the calculated energy, neglecting background losses, difficult to achieve. By placing a ring-shaped gain medium outside the core (where the normalized modal intensity is smaller), its gain can be kept constant while the stored energy in the gain medium is increased (cf. Eq. 17). Hence, the fiber can be shorter. For a cladding-pumped fiber having an inner cladding with a radius of 10 µm, a saturable absorber (640) with a radius of 0.5 µm (small-signal absorption 2.2 dB/m at 1536 nm), and a gain medium (620) with an inner radius of 4.5 µm and an outer radius of 5.5 µm (small-signal absorption 3.3 dB/m at 1536 nm), calculations gave an extractable energy of 0.8 mJ at 1536 nm and 1.4 mJ at 1560 nm, for a fiber length of 50 m. The fiber length can be further reduced by using a larger-area gain region (e.g., a thicker doped ring). The other parameters of the fiber were the same as above. A problem with this approached is that the preferred host material for a Yb$^{3+}$-sensitized Er$^{3+}$-doped gain medium (phosphosilicate glass) has a higher refractive index than the preferred cladding (fused silica). Hence, some extra measure may be needed to level the refractive index of the gain medium with that of cladding.

The calculations have also shown that ASE in the long-wavelength end of the $^4I_{13/2} \rightarrow ^4I_{15/2}$ emission spectrum, where the emission cross-sections become relatively larger compared to the absorption cross-section, can build up and partly bleach the absorption and compress the gain. This can be avoided by introducing an unsaturable loss at these long wavelengths. Bending the fiber provides a method for making the fiber lossy at 1600 nm, while keeping the unsaturable loss small at 1536 nm. For example, with the fiber parameters above and with a bend radius of 9 mm, the bend-loss is approximately 0.033 dB/m at 1600 nm, 0.012 dB/m at 1560 nm, and 0.0061 dB/m at 1536 nm, i.e., it is five times smaller at 1536 nm than at 1600 nm. Another alternative for an unsaturable loss at longer wavelengths is to use an unsaturable absorber in addition to the saturable absorber. For this particular transition, Tm$^{3+}$:glass and Tb$^{3+}$:glass are suitable systems for an optical fiber, as the absorption of suitable pump wavelengths (e.g., 1064 nm or at least 1047 nm in the case of Tm$^{3+}$) is small, as is the absorption for a signal at 1536 nm. Yet another alternative is to use different host media for the gain and the absorber media. A suitable host medium for the absorber makes its spectrum wider, and can thus prevent the build-up of ASE at long wavelengths.

In the example above, a pump wavelength of 1064 nm was assumed. Other wavelengths are also possible. However, the pump should not pump the Er$^{3+}$ directly, since then also the saturable absorber will be excited. Moreover, for pumps on the short-wavelength side of the Yb$^{3+}$ absorption peak, emission around 980 nm from the Yb$^{3+}$ can build up in the fiber and bleach the Er$^{3+}$-ions in the absorber.

Even if the centra providing the gain and the saturable absorption are different, a design according to FIG. 11 can improve to prior-art devices in that the gain efficiency of the gain medium is relatively lower than it otherwise would be.

Saturable Absorber

The saturation power $P_{sat}$ of a saturable absorber is given by $P_{sat} = hv[\Psi_{doped}(\sigma^a + \sigma^e)\tau]$, where $\tau$ is the lifetime of a metastable state. For some devices, a medium that would otherwise be a suitable saturable absorber (e.g., because of a suitable spectral response) is inappropriate because its saturation power is too small. This can be the case for an EDF saturable absorber, with $P_{sat}$ typically smaller than 1 mW. We here disclose that ring-doping allows $\Psi_{doped}$ to be chosen so that a larger, predetermined value of $P_{sat}$ can be obtained. For this application, a few-moded fiber can be acceptable for single-mode applications, as higher-order modes will experience a higher loss which can render the power in them negligible.

Signal Amplifiers for Reduced Cross-talk

In some optical amplifiers, especially semiconductor ones, even the energy of a single signal bit (e.g., 0.1–100 fj) can be non-negligible comparable to the stored energy. Then, already the amplification of a single bit extracts enough energy to reduce the gain. This leads to four-wave mixing and cross-talk in multi-wavelength amplifiers and inter-symbol interference in single-wavelength amplifiers. This can be avoided with the higher stored energy that, for a given gain, accompanies the reduced interaction in the devices disclosed in this invention.

FIG. 12 illustrates an embodiment. A semiconductor amplifier provides gain for one or several guided optical signal beams in a region where the normalized modal intensity is small. The device can be electrically pumped. The refractive index of the gain region can be depressed in order to suppress gain-guiding, since this can otherwise occur in semiconductor optical amplifiers in which the gain per unit length is large. This would lead to a large normalized modal intensity in the gain-region, thereby preventing substantial reductions of the interaction.

Suppression of Unwanted Modes

Often, lasing on a specific transverse mode is desired, and then normally on the fundamental mode of the core. If so, it may be necessary to suppress other, undesired, modes. Higher-order guided modes of the core extend further into the cladding and thus see a significantly higher gain than does the fundamental mode in a ring-doped device. Although we normally envisage single-moded cores as preferred designs, higher-order modes can also be present due to fabrication errors, etc. However, these modes are less strongly guided and will be more sensitive to bending. Hence, with a fiber, simply bending it can reinstate a net gain advantage for the fundamental mode.

Another alternative is to incorporate a region outside the gain region that absorbs the signal (at desired and possibly also at undesired wavelengths) but has a low loss for the pump. This absorbing region is located so that it preferentially absorbs light in undesired modes. These can be higher-order modes of the core, and also cladding-modes. See FIG. 13.

Several possibilities exist for creating the absorbing region. In the case of a Yb-doped device, Pr$^{3+}$ and Er$^{3+}$ can be suitable such absorbers. For Nd$^{3+}$ at 850 nm–950 nm, Yb$^{3+}$ can be used. For Er$^{3+}$, Tm$^{3+}$ and Sm$^{3+}$ are potential candidates, just to mention some possibilities with rare-earth doping. Sm$^{3+}$ can also suppress unwanted 1050 nm radiation in Nd$^{3+}$-doped samples. Optionally, some additional measures can be taken to quench the dopant, to prevent it from bleaching.

Amplifying Optical Devices

Figure 14:
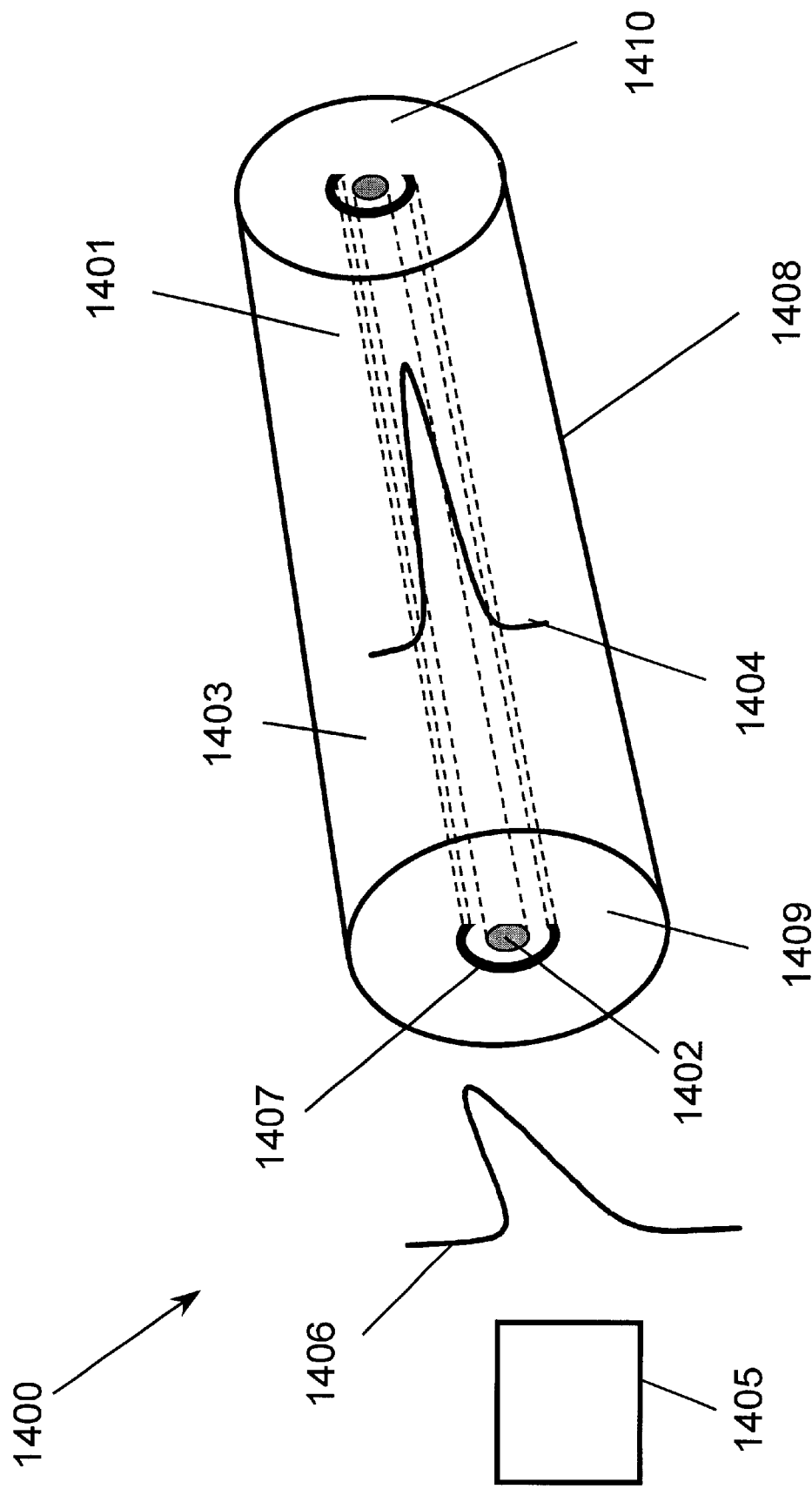
FIG. 14 shows an amplifying optical device.

FIG. 14 shows an amplifying optical device 1400 comprising a first waveguiding structure 1401 comprising a first core 1402 and a cladding 1403, and configured to guide optical radiation 1404; a pump source 1405 configured to supply optical pump power 1406, an amplifying region 1407 situated in the cladding 1403; wherein the pump source 1405 is optically coupled to the amplifying region 1407, and wherein in use the optical radiation 1404 guided in the first waveguiding structure 1401 overlaps the amplifying region 1407.

Also identified in FIG. 14 is an amplifying optical waveguide structure 1408 which comprises the first waveguiding structure 1401 and the amplifying region 1407. The purpose of the amplifying optical device 1400 is to generate or amplify optical radiation 1404.

The amplifying optical waveguide structure 1400 can also operate with an amplification less than unity for radiation at certain wavelengths (especially in the absence of optical pump power 1406) and can then be used to absorb optical radiation 1404.

The amplifying optical waveguide structure 1408 has first and second ends 1409 and 1410. The first waveguiding structure extends to first and second ends 1409 and 1410, so that optical beams can be coupled into and out of the first waveguiding structure 1401. It is also possible to couple light into the first waveguiding structure 1401 through the side of the amplifying optical waveguide structure 1408. Points at which optical beams can enter or exit an optical waveguiding structure can be referred to as input and output ports, as the case may be. An optical beam launched through a port can exit through the same port, if, for instance, the amplifying optical device is a reflecting traveling-wave amplifier.

FIG. 14 illustrates the optical radiation 1404 and the optical pump power 1406 with the intensity profile in a cross-section of the beams.

By amplifying optical device 1400 we mean a device for generating, amplifying, or absorbing the optical radiation 1404. By way of example only and without limitation, an amplifying optical device 1400 can be an optical amplifier, a master oscillator power amplifier (MOPA), an amplified spontaneous emission (ASE) source, a superfluorescent source, an energy storage device, a high-pulse energy device, a cladding-pumped device, a semiconductor signal amplifier, or a laser which by way of example and without limitation can include a laser, a fiber laser, a Q-switched laser, a mode-locked laser, or a semiconductor laser.

By a pump source 1405, we mean a device for supplying optical pump power 1406. By way of example only and without limitation, a pump source 1405 can include a gas laser, a solid state laser, a semiconductor laser, a chemical laser or a semiconductor light emitting diode. The semiconductor laser can be implemented with a diode bar or a broad-stripe laser diode, and can be used either for end-pumping or for side-pumping. A pump source 1405 can also be provided by natural illumination, for example by daylight. The preferred pump source 1405 is a high-power semiconductor laser diode.

Though FIG. 14 shows a single pump source 1405, multiple pump sources can be employed in order to obtain higher powers and/or for pump redundancy. The pump power 1406 from the multiple pump sources can be coupled into the amplifying region 1407 via at least one of the first end 1409, the second end 1410 and the side.

Though FIG. 14 shows optical pump power 1406 being launched through a facet at a first end 1409 of the amplifying optical waveguide structure, other schemes for launching the power are also possible, as will be described in this document.

By first core 1402, we mean the region of the first waveguiding structure 1401 where the intensity of the optical radiation 1404 is relatively high compared to the intensity of the optical radiation 1404 propagating in the cladding 1403 in the same transverse section. By way of example only and without limitation, the first core 1402 can be that region with a refractive index greater than the refractive index of the cladding 1403. However, for the purposes of this invention, the first core 1402 may sometimes be defined as the region of the first waveguiding structure 1401 bounded by a contour of equal optical intensity of the fundamental mode and which contains 75% of the optical radiation 1404 at a wavelength corresponding to the second mode cut-off of the first waveguiding structure 1401. Note however that the device cannot be operated at the wavelength corresponding to the second mode cut-off of the first waveguiding structure 1401.

The first waveguiding structure 1401 can be a single mode waveguiding structure, or can support several higher-order modes. The first waveguiding structure 1401 can be a planar waveguiding structure or can be an optical fiber.

Though not shown in FIG. 14, it is possible that a waveguiding structure has branches so that a light beam propagating in one waveguiding structure is divided into two beams propagating in different waveguiding structures. Correspondingly, two beams can be combined to one.

In some instances, the propagation of high-order modes, which can be leaky, is undesirable. These can be suppressed by bending the first waveguiding structure 1401, or by introducing a absorber into the cladding 1403 configured such that there is a high-differential loss between the undesired high-order modes and the desired propagating mode or modes.

The amplifying region 1407 can contain at least one rare earth dopant selected from the group consisting of Ytterbium, Erbium, Neodymium, Praseodymium, Thulium, Samarium, and Holmium. It can also contain Europium, Terbium, and/or Dysprosium. The amplifying region 1407 can contain at least one transition metal.

For embodiments where the amplifying region 1407 is located in both the first core 1402 and the cladding 1403, the rare-earth dopant within the portion of the amplifying region 1407 residing in the cladding 1403 is not be the same as the rare-earth dopant in the first core 1407.

It can also be that the amplifying region 1407 amplifies optical radiation 1404 at different wavelengths using, e.g., different rare-earth dopants, with at least two beams of optical radiation 1404 at different wavelengths propagate simultaneously or alternately through the waveguide. Therefore, we take the location of the amplifying region 1407 to be determined by the properties of the amplifying region at the wavelength of optical radiation 1404 of interest.

The amplifying region 1407 can be excluded from the first core 1407 leading to a so-called ring-doped design. A particular advantage of this embodiment is that the amplifying region 1407 in operation will contain a significantly larger stored energy than corresponding core-doped designs. This can be important for devices that emit optical pulses with pulse energies being a significant fraction of the energy stored in the amplifying region 1407. This can also be important for amplifiers with high requirements on linearity, for example in analog Community Antenna Television (CATV) applications—especially if the signal contains low-frequency components and the output power is high whereupon undesirable non-linear distortion can occur.

The first waveguiding structure 1401 can be configured such that in use the first waveguiding structure 1401 is a single-mode waveguide, and the optical radiation 1404 guided by the first waveguiding structure 1401 has a Gaussian equivalent spot size (1/e² intensity diameter) greater than about eight times the wavelength as measured in vacuum of the optical radiation 1404 guided by the first waveguiding structure 1401.

The first waveguiding structure 1401 can be of a more complicated shape than the traditional ones illustrated in the drawings. For example, it can be non-circular or utilize complicated core designs such as found in W-fibers, multiple cladding fibers (including those with areas in the cladding with a raised refractive-index), segmented core designs, and so-called alpha profiles.

The amplifying optical device 1400 can be advantageous in several ways as explained previously. For example, in order to incorporate a large enough amplifying region 1407 to absorb enough pump power some amplifying optical waveguide structures 1408 need to be long, e.g. 0.1 kilometers up to several kilometers. Around a wavelength of 1000 nm, low-loss first waveguiding structures made from doped silica fibers exhibit a background loss of at least approximately 1 dB/km. A 1 dB background loss may be acceptable in an amplifying optical device 1400. However, an amplifying region 1407 incorporated into the first core 1402 tends to significantly increase the background loss, often by more than one order of magnitude. This reduces the maximum acceptable lengths of the amplifying optical waveguide structure 1408, which can have an impact on the pump absorption. By placing the amplifying region 1407 in the cladding 1403 rather than in the first core 1402 in which most of the power of the optical radiation 1404 propagates enables us to use a passive first core 1402 (e.g. made from a pure silica or a silica doped with at least one of fluorine, germanium, phosphorus, tantalum, aluminium and titanium). The background losses of the first waveguiding structure 1401 can then be reduced so that a longer amplifying optical waveguide structures 1408 that can absorb more pump power 1406 can be used in order to generate higher power optical radiation 1404.

Figure 15:
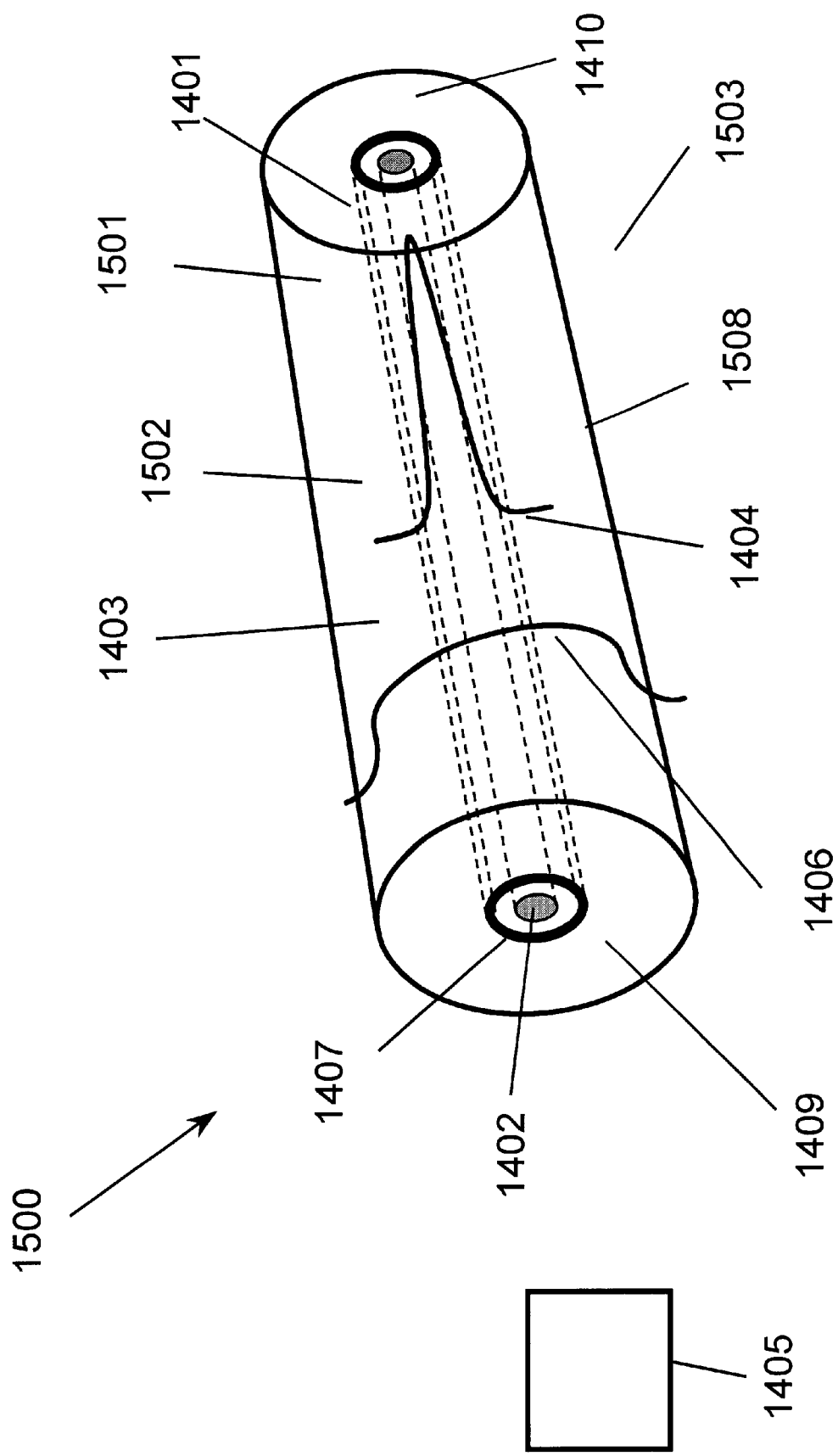
FIG. 15 shows an amplifying optical device containing a second waveguiding structure.

FIG. 15 shows an amplifying optical device 1500 based on the amplifying optical device 1400, which further comprises a second waveguiding structure 1501 comprising a second core 1502 and configured to guide the optical pump power 1406, and wherein the second waveguiding structure 1501 contains the amplifying region 1407 and wherein the second core 1502 is at least partly formed by at least part of the cladding 1403, and wherein the pump source 1405 is optically coupled to the second waveguiding structure 1501.

The first core 1402 can form a part of the second core 1502.

Also identified in FIG. 15 is a cladding-pumped amplifying optical waveguide structure 1508 which comprises the first and second waveguiding structures 1401, 1501 and the amplifying region 1407.

In some instances, unwanted modes in either the first or second waveguiding structures 1401, 1501 can be excited. The higher-order modes in the first waveguiding structure 1401 can be suppressed by bending the first waveguiding structure 1401. The higher-order modes in the first and second waveguiding structures 1401 and 1501 can be suppressed by introducing an absorber into the cladding 1403 configured such that there is a high-differential loss between the undesired modes and the desired mode or modes. Unwanted modes in the second waveguiding structure 1501 can also be removed by mode stripping—for example by removing outer coatings and placing the fiber into high-index fluid.

Examples of the first waveguiding structure 1401 and the amplifying region 1407 were described previously with reference to FIGS. 1, 2, 3, 4, 11, 12, 13a, 13b and 13c. The amplifying region 1407 is shown as the ring-doped dopant profile 20 in FIG. 1. As FIG. 14 illustrates, the amplifying region 1407 can comprise at least one doped region of arbitrary shape.

Waveguiding can also be achieved with a microstructured design, for example, the first or second waveguiding structures 1401, 1501 can contain longitudinally extensive holes.

A preferred design of the amplifying optical device 1500 is one in which in use the optical radiation 1404 can be guided by the first waveguiding structure 1401 without coupling to the second waveguiding structure 1501.

The cross-sectional area of the second core 1502 can be greater than 1000 square microns and smaller than 100,000 square microns.

The second core 1502 is preferably adjacent to a region 1503 having a lower refractive index than the second core 1502, the amplifying optical device 1502 being such that the region 1503 provides total internal reflection of the optical pump power 1406. The region 1503 can comprise a vacuum, a gas, a liquid, a polymer or a glass. If the amplifying optical waveguiding structure 1508 is an optical fiber, the polymer can be applied as a coating during the fiber drawing process. The amplifying optical waveguiding structure 1508 then forms an example of a double-clad optical fiber, as illustrated in FIG. 4. A double-clad optical fiber is a preferred amplifying optical waveguiding structure 1508. Alternatively the second core 1502 can be surrounded by a metal or a periodic layer for reflecting light.

It is preferred that the first waveguiding structure 1401 and the second waveguiding structure 1501 are fabricated in a single optical fiber.

It is preferred that the first waveguiding structure 1401 is fabricated from at least one glass system, preferably an oxide glass system selected from the group consisting of silica, doped silica, silicate, and phosphate. The second waveguiding structure 1501 can also be fabricated from the at least one glass system. By doped silica we mean (WITHOUT LIMITATION ETC) silica doped with fluorine and/or at least one of the oxides of the following—germanium, phosphorus, boron, tantalum, titanium, aluminum, tin, where the oxide dopant concentration is typically up to around 10%. By silicate, we mean doped silica where the dopant concentration is greater than about 10%. By phosphate we mean a phosphate compound glass which includes phosphoria with the addition of other glass forming or modifying agents. In addition, the dopants included in any of the above glass systems can include rare earth and transition elements.

The amplifying optical devices 1400 and 1500 can also contain limited amounts of gain medium in the first core 1402 while still retaining the basic characteristics of a device doped in the cladding 1403. We also note that the amplifying optical waveguide structures 1408 and 1508 can be longitudinally varying, e.g., with a section doped in the first core 1402 rather than the cladding 1403. Nevertheless, the advantages of the novel amplifying optical devices disclosed here remain to the extent that most of the power transferred to the optical radiation 1404 can be transferred from parts of amplifying region 1407 located in the cladding 1403.

Nevertheless, the advantages of the novel amplifying optical devices disclosed here remain to the extent that most of the power transferred to (or from) the optical radiation 1404 can be transferred from (or to) parts of the amplifying region 1407 located in the cladding 1403.

In order to obtain an efficient device, it is preferred to locate the amplifying region 1407 close enough to the first core 1402 so that the all of the optical pump power 1406 absorbed by the amplifying region 1407 can be transferred to the optical radiation 1404. Otherwise, pump-to-signal power conversion efficiency is reduced.

It is well-known that the shape of the second core 1502 as well as the location of the amplifying region 1407 relative to the second core 1502 affects the rate at which the amplifying region 1407 absorbs the optical pump power 1406. In particular, an amplifying region 1407 located near the center of a circularly symmetric second core 1502 may fail to absorb the optical pump power 1406 efficiently. Well-known methods for improving the pump absorption are to locate the amplifying region 1407 off-center, to use a non-circular second core 1502, or to bend the amplifying optical waveguide structure 1508.

For efficient absorption of the optical pump power 1406, it is preferred that the amplifying region 1407 is transversely disposed to regions within the second waveguiding structure 1501 where the intensity of the optical pump power 1406 is high.

FIG. 15 shows a second waveguiding structure 1501 that confines light in both directions transverse to the first waveguiding structure 1401 so that the first and second waveguiding structure 1401 and 1501 are parallel to each other. However, for instance, in a planar structure like the one illustrated in FIG. 3, the second core 1502 can be quite wide in one direction and effectively only confine light in one transverse direction. In such a structure, the optical pump power 1406 can also propagate at an angle to the first optical waveguiding structure 1401. In order to ensure sufficient pump absorption, the amplifying optical waveguide structure 1408 can contain several waveguiding structures 1401 with amplifying regions 1407. The different waveguiding structures 1401 can be coupled to each other in series or in parallel, or can be independent.

Figure 16:
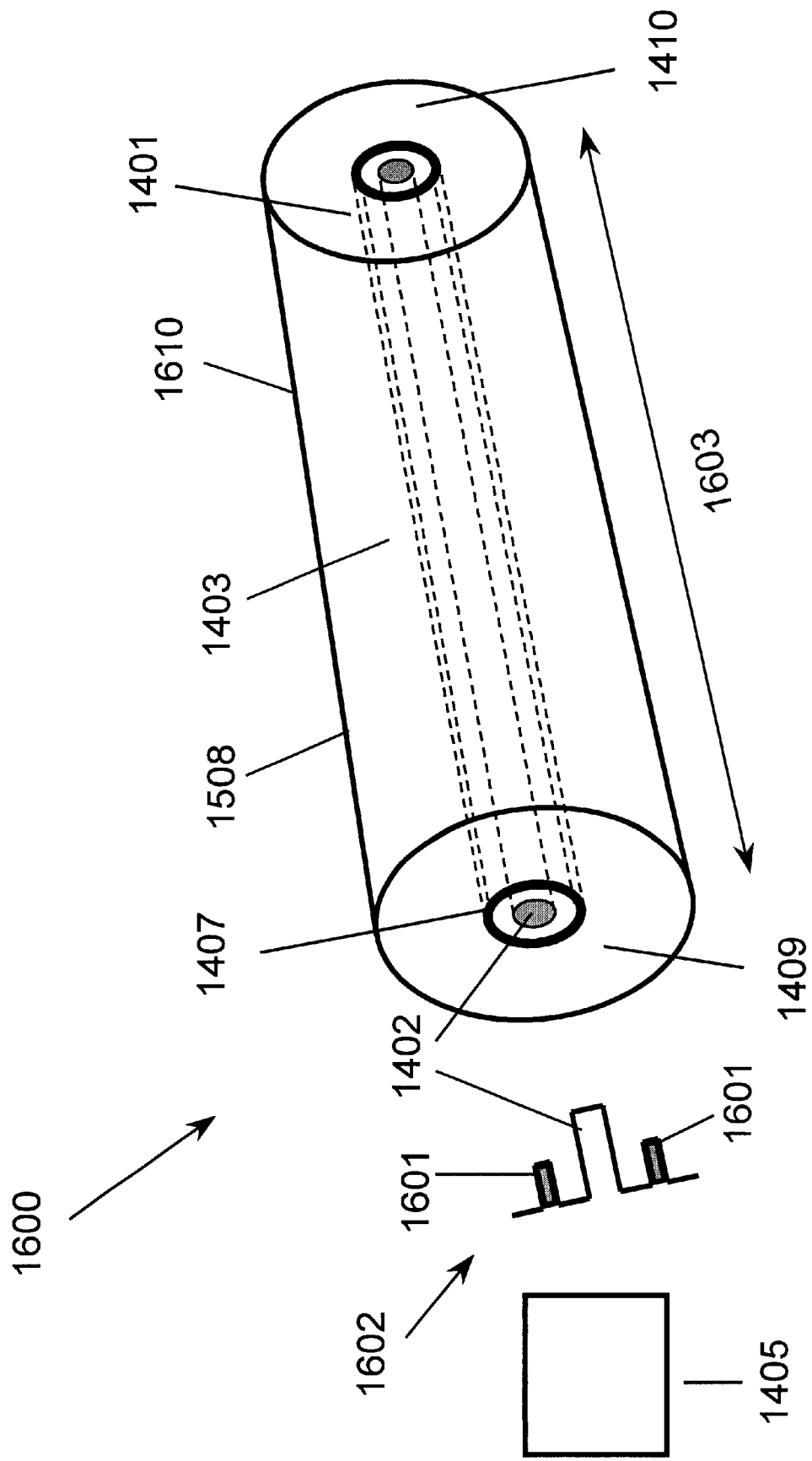
FIG. 16 shows a preferred embodiment of an amplifying optical device in which there is a significant saturable small signal absorption.

FIG. 16 shows a preferred embodiment of an amplifying optical device 1600 comprising an optical fiber 1610 containing an amplifying region 1407 that is characterized by a dopant concentration 1601, a disposition 1602 and a length 1603, and wherein the dopant concentration 1601, the disposition 1602 and the length 1603 of the amplifying region 1407 are arranged such that the amplifying optical device 1600 amplifies at an operating wavelength at which there is a significant saturable small signal absorption, for example as found in a two- or three-level system.

In a preferred embodiment, the optical fiber 1610 is fabricated from silica-based glasses. Several suitable dopants that increase the refractive index but are otherwise optically passive are well-known and include germania, phosphorus, alumina and tantalum. These can be used for defining the first core 1402. The cladding 1403 also functions as a second core 1502, and can be formed of pure silica except in the amplifying region 1407 which is formed by doping the cladding 1403 with a rare earth such that a ring is formed around the first core 1402.

It is well-known that co-dopants can be used to increase the solubility of rare earth dopants in silica. This is otherwise poor. Preferred co-dopants include alumina and phosphorous. The incorporation of alumina, phosphorous, and/or a rare earth in silica is known to increase the refractive index compared to pure silica. This increase can be significant, and depending on the design of the optical fiber 1610, it can be undesirable. If so, it can be negated by further co-doping the amplifying region 1407 with a index-lowering element like fluorine. Alternatively, we can use a cladding 1403 made from silica doped with an index-raising agent (e.g., tantalum or one of the other index-raising elements listed above). This way, the refractive index of the cladding 1403 can equal or even exceed that of the amplifying region 1407, even if this is co-doped with, say, alumina or phosphorous. All of these methods for modifying the properties of silica are well-known.

Preferred embodiments of the amplifying optical device 1600 enables efficient cladding pumping of the amplifying optical device 1600 at this operating wavelength compared to corresponding core-doped designs utilizing the same rare earth dopant.

A preferred embodiment is designed to operate in the wavelength range of about 1480 nm to about 1570 nm. The dopant is either Erbium or Erbium co-doped with Ytterbium. For Erbium, typical values for the length 1603 are in the range 5 to 100 meters, dopant concentration 1601 is approximately 0.1% to 0.5% by weight, and the disposition 1602 is a ring around the first core 1401 with an inner diameter of about one to two times the core diameter and a thickness of 2 to 5 microns. For Erbium co-doped with Ytterbium, typical values for the length 1603 are in the range 0.5 to 50 meters, dopant concentration 1601 is approximately Erbium 0.1% by weight and Ytterbium concentration is 10 to 20 times the Erbium concentration, and the disposition 1602 is a ring around the first core 1401 with an inner diameter of about one to two times the core diameter and a thickness of 2 to 5 microns. More examples are given with respect to FIGS. 6, 7 and 10. These design values are given for illustrative purposes only and are meant to be non-limiting. For example, it can be preferable in some instances to design a first waveguide structure 1401 with a very large first core 1402, in which case the length 1603 and the disposition 1602 would be different.

Another preferred embodiment is designed to operate in either the wavelength range of about 970 nm to 990 nm or the wavelength range of about 1010 nm to 1030 nm. The dopant is Ytterbium. Typical values for the length 1603 are in the range 0.5 to 50 meters, dopant concentration 1601 is approximately 0.1% to 2% by weight, and the disposition 1602 is a ring around the first core 1401 with an inner diameter of about one to two times the core diameter and a thickness of 1 to 3 microns.

While the intrinsic fluorescence from Ytterbium in glass peaks around 980 nm, it is well-known that cladding-pumped single-moded Ytterbium-doped fiber lasers normally emit around 1060–1120 nm. Emission at 980 nm is possible, but normally only at a significantly reduced efficiency. In contrast, a surprising and important result is that the design here allows efficient operation of cladding-pumped single-moded Ytterbium-doped fiber lasers at 980 nm. The pump source 1450 is preferably in the wavelength band from about 870 nm to about 950 nm, and preferably between 900 and 940 nm. It is preferred that the amplifying region 1407 absorbs at least about 30% of the optical pump power 1406 launched into the second waveguiding structure 1501.

Yet another preferred embodiment is designed to operate in the wavelength range of about 850 nm to 950 nm. The dopant is Neodymium. Typical values for the length 1603 are in the range 0.5 to 50 meters, dopant concentration 1601 is approximately 0.1% to 2% by weight, and the disposition 1602 is a ring around the first core 1401 with an inner diameter of about one to two times the core diameter and a thickness of 1 to 3 microns.

Figure 28:
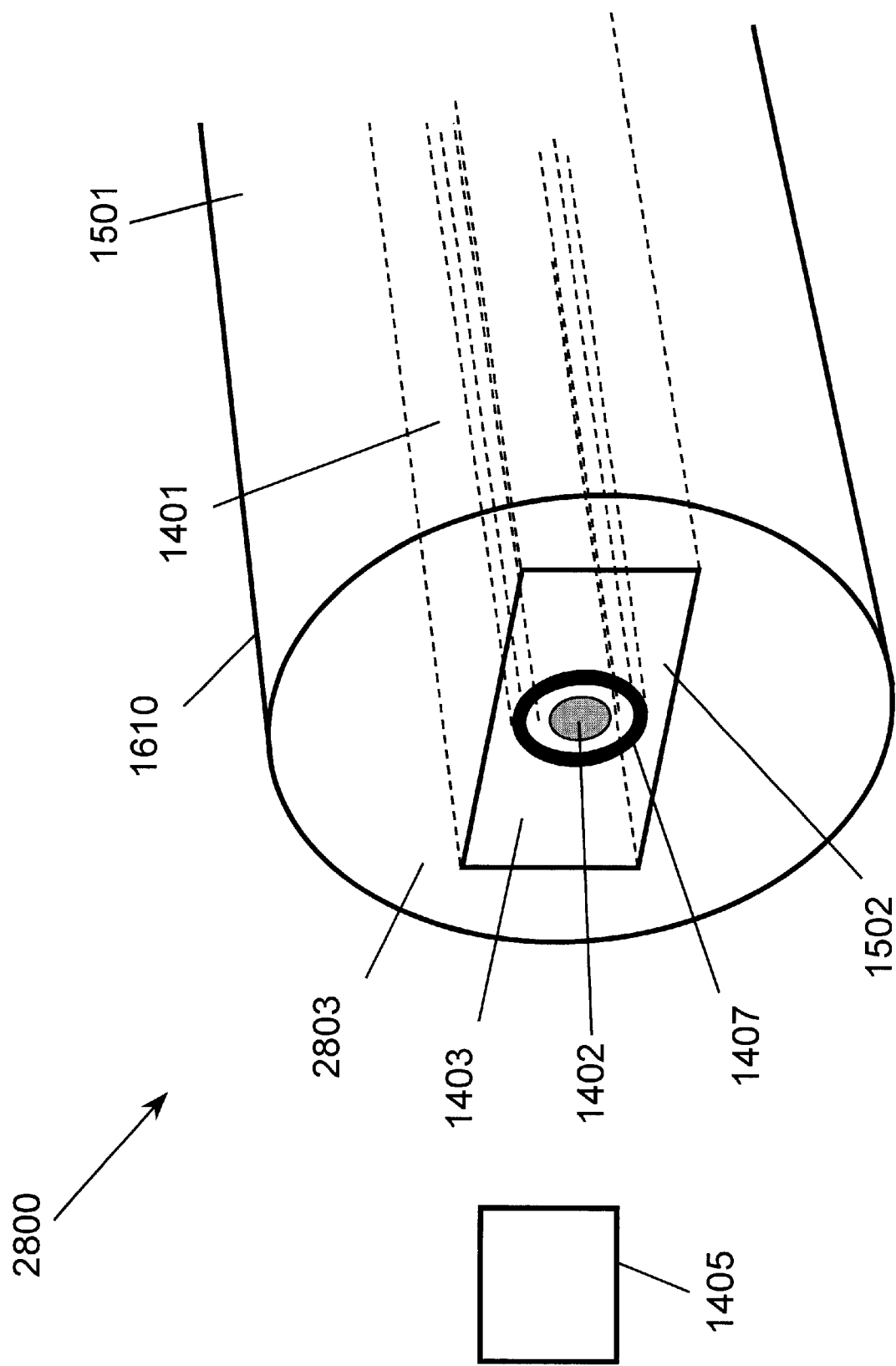
FIG. 28 shows an optical fiber having a ring-doped amplifying region located in the cladding.

FIG. 28 shows a cross-sectional view of a preferred embodiment of an optical fiber 1610, having a ring-doped amplifying region 1407 located in the cladding 1403 and centered on the first core 1402. Also provided is a second core 1502 comprising the first core 1402 and cladding 1403. The second core 1502 is rectangularly shaped and is located within an outer cladding 2803. The refractive index of the first core 1402 is higher than that of the cladding 1403, which is in turn higher than that of the outer cladding 2803. The refractive index of the amplifying region can be equal to that of the cladding 1403 by way of co-dopants. The amplifying region 1407 can be doped with erbium, ytterbium, and/or another rare earth element. The optical fiber 1610 can be made from glass, preferably doped and undoped silica. The fiber can be surrounded by a coating made from a polymer or another material. Alternatively, the outer cladding 2803 can be made from a polymer.

It is preferred that the first core 1402 is single-moded at a desired wavelength of optical radiation 1404.

Figure 17:
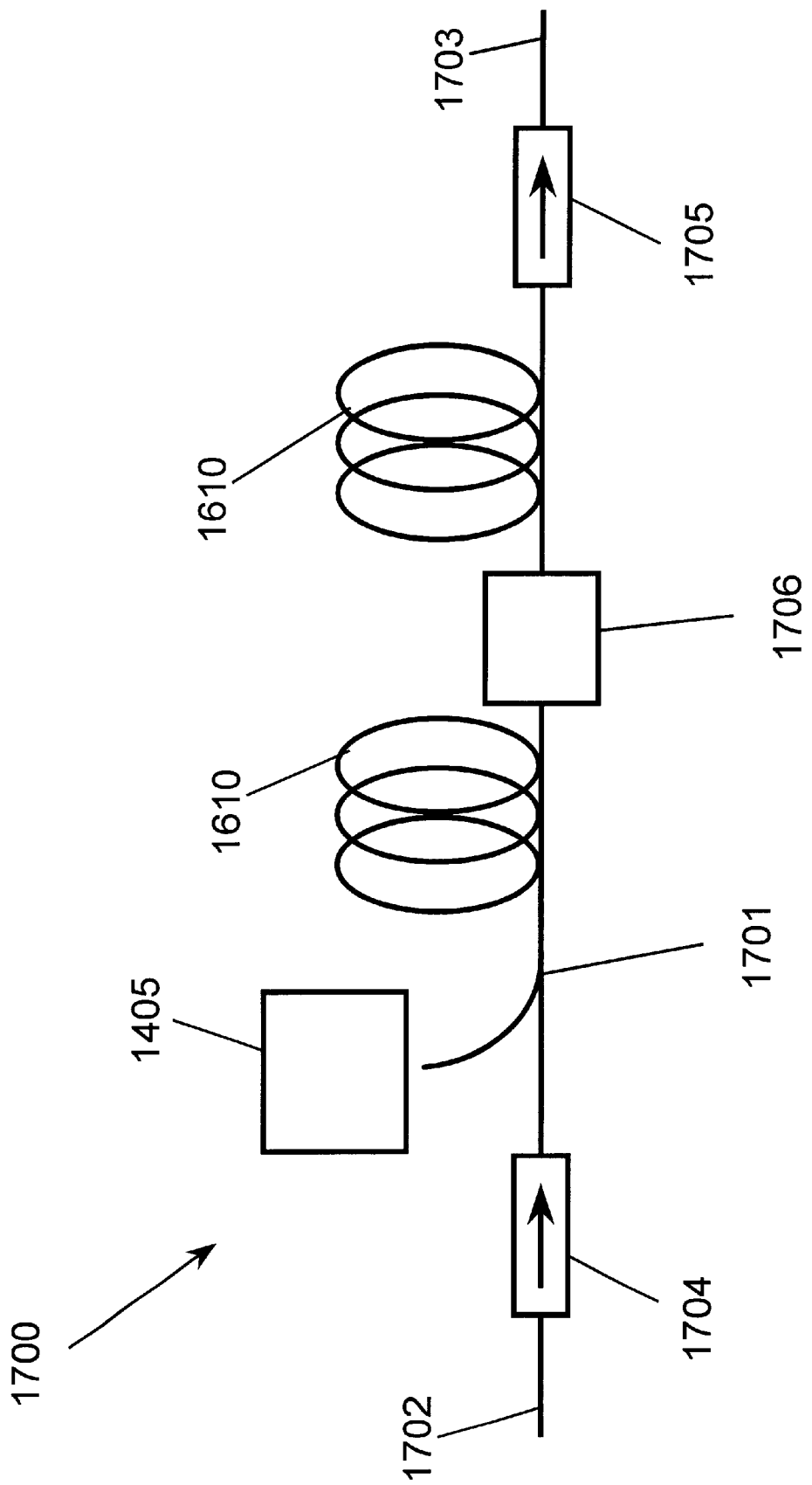
FIG. 17 shows a schematic of a high-power optical amplifier.

FIG. 17 shows a schematic of a high-power optical amplifier 1700 comprising at least one optical fiber 1610, an optical pump source 1405, a coupler 1701, an input port 1702, an output port 1703, a first isolator 1704 and a second isolator 1705.

FIG. 17 also shows a filter 1706 that can be added in order to suppress amplified spontaneous emission at undesired wavelengths. The filter 1706 can be a fiber optic Bragg grating, a long-period grating, an absorbing medium, an acousto-optic filter, or an interferometric filter such as implemented with a Mach Zehnder or a Fabry Perot. The filter 1706 can be tunable and it can alternatively be placed following the output port 1703.

The coupler 1701 can be a dichroic mirror, a wavelength division multiplexing coupler, or a pump-injecting fused fiber coupler formed by side-coupling the core of a multi-mode optical fiber to the second core 1502 by fusing and twisting the fibers together.

The optical pump source 1405 is preferably a high-power semiconductor laser-diode coupled into the optical fiber 1610.

For high-power applications (greater than about 1 Watt), the second isolator 1705 is preferably not utilized and the coupler 1701 is preferably a dichroic mirror or a pump-injecting fused fiber coupler. Optical pump power 1406 can also be launched into the second waveguiding structure 1501 through the side of the fiber, the pump power 1406 being reflected into the second core 1502 by a V-groove formed in the fiber. Optical isolators are often used to suppress reflections in the signal beam, and can also be used for protecting the optical pump source 1405. However, optical isolators are in general lossy and can also distort the beam, and will therefore normally only be used if deemed necessary. This depends on, for example, if high-gain strictly single-pass traveling wave amplification is required and also on if a pump source can be reached and damaged by cw or pulsed signal light, reflected pump light, or (in case of multiple pump sources) light from another pump source.

The different optical components in FIG. 17 and other embodiments can be optical fiber devices or they can provide fiber pigtails for use as input and output ports. If so, it is preferred that the different components are connected by splicing them together to form a continuous optical fiber waveguide. Alternatively, it is possible to fabricate several optical components with a single optical fiber.

Figure 18:
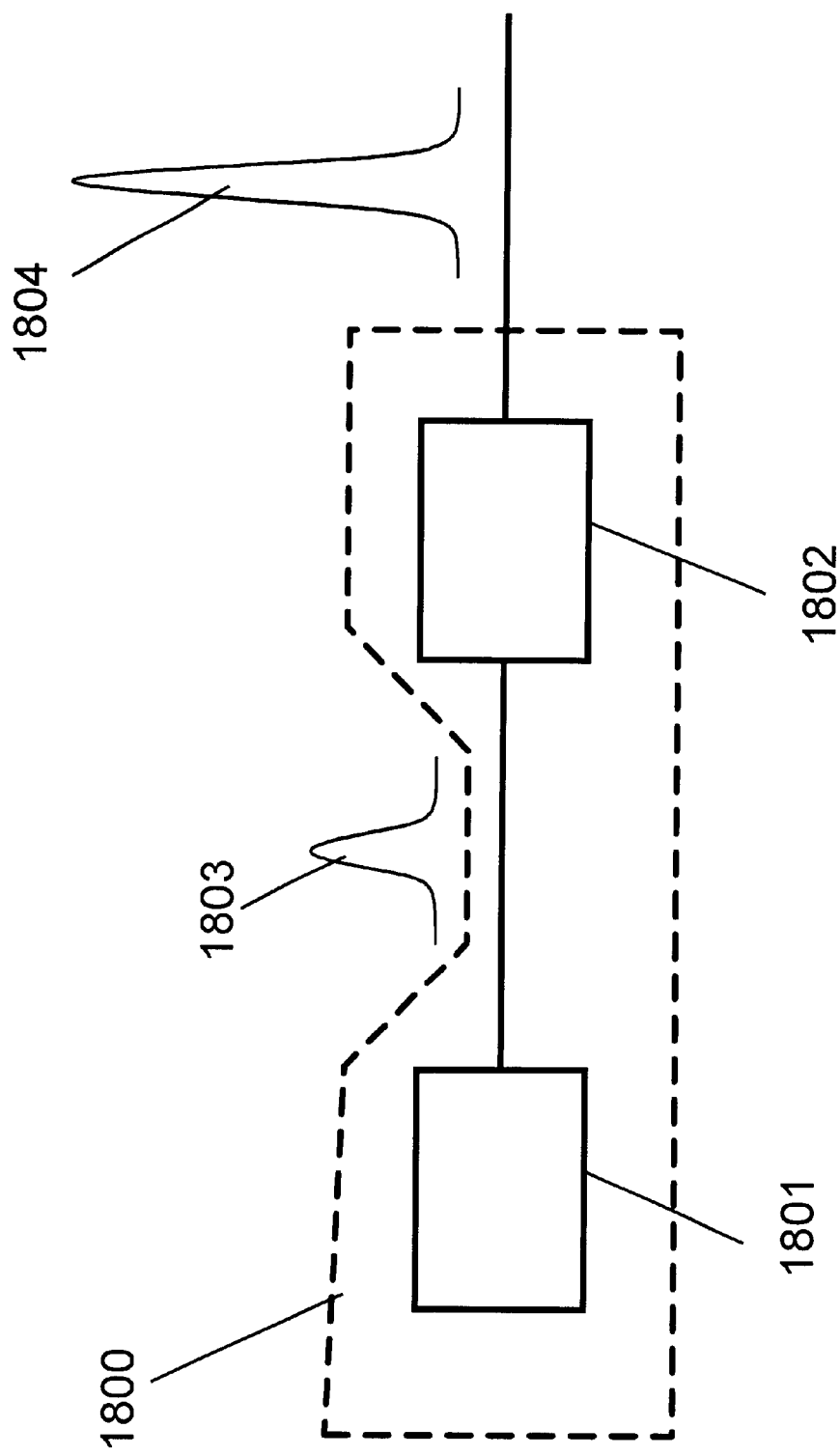
FIG. 18 shows a master oscillator power amplifier MOPA.

FIG. 18 shows a master oscillator power amplifier MOPA 1800 which comprises a master oscillator 1801 optically coupled to the first waveguiding structure 1401 of an optical amplifier 1802. The master oscillator 1801 generates an optical seed 1803 which is amplified by the optical amplifier 1802 to provide an output 1804 of higher power than the optical seed 1803.

The optical amplifier 1802 can be the optical amplifier 1700 shown in FIG. 17.

The master oscillator 1801 can be a semiconductor laser, a semiconductor distributed feedback laser, a fiber laser, a fiber distributed feedback laser, a fiber ring laser, a gas laser, a bulk laser, a source of amplified spontaneous emission or a light emitting diode filtered by an optical filter which can be an optical fiber Bragg grating.

The optical seed 1803 can be continuous wave, or can be an optical pulsed seed.

In a preferred embodiment, the disposition of the amplifying region 1407 is arranged such that the optical amplifier 1802 can store a large amount of energy before it reaches its intrinsic lasing threshold. By large, we mean large compared to a corresponding design in which the amplifying region 1407 is situated in the first core 1402. Optical amplifiers designed in accordance with FIGS. 14 and 15 will perform surprisingly well for this application, far better than prior art optical amplifiers having rare-earth dopants in the first core 1402.

The optical amplifier 1802 is preferably be the optical amplifier 1700 which can be designed to have high energy storage at its intrinsic lasing threshold when used with an optical pulsed seed, the optical amplifier 1700 being designed such that it is able to be operated such that the amplified optical pulse seed has an energy exceeding the intrinsic saturation energy of the optical amplifier 1700.

The optical amplifier 1802 preferably utilizes the optical fiber described with FIG. 11, either in a core-pumped or a cladding-pumped version.

The optical seed 1803 can also be provided by an external source not associated with the MOPA 1800. Thus the present invention provides for both the MOPA apparatus as well as the use of optical amplifiers to amplify optical pulses to energies exceeding the intrinsic saturation energy of the optical amplifier 1802.

The small-signal gain (without any optical radiation incident at the input port) of the optical amplifier 1802 is normally no more than 40 dB and efficient energy extraction is difficult at a gain above 20 dB for pulsed operation. In order to reach the intrinsic saturation energy of the optical amplifier 1802, it is therefore preferred that the master oscillator 1801 seeds the optical amplifier 1802 with pulses of at least 0.01% and preferably at least 1% of the desired output pulse energy. Seeds 1803 with still higher pulse energy are preferable. An intermediate amplifier can be required between the master oscillator 1801 and the optical amplifier 1802 to ensure that the optical seed 1803 is sufficiently large. The master oscillator 1801 can emit optical pulses. Alternatively, there can be an optical time gate between the master oscillator 1801 and the optical amplifier 1802 that opens and closes to create an optical pulse pattern. It is preferred that the pump source 1405 is a semiconductor laser diode.

It is preferable to reduce the reflections outside the first waveguiding structure 1401. This can be achieved by using antireflection coatings or an angled end to the first waveguiding structure 1401.

Similarly, for cw operation, the power of the optical seed 1803 that seeds the optical amplifier 1802 should be at least 0.01% and preferably at least 1% of the desired power of the output 1804. Still higher-power seeds 1803 are preferable. An intermediate amplifier can be provided to reach adequate power levels for the optical seed 1803.

In a preferred embodiment, the optical amplifier 1802 comprises an optical fiber 1610 containing an amplifying region 1407 that is doped with Ytterbium. The optical fiber 1610 is characterized by a dopant concentration 1601, a disposition 1602 and a length 1603, and wherein the dopant concentration 1601, the disposition 1602 and the length 1603 of the amplifying region 1407 are configured such that the optical amplifier 1802 amplifies in either the wavelength range of about 970 nm to 990 nm or the wavelength range of about 1010 nm to 1030 nm.

It is preferred that the amplifying region 1407 absorbs at least about 30% of the optical pump power 1406 launched into the second waveguiding structure 1501. Typical values for the length 1603 are in the range 0.5 to 50 meters, dopant concentration 1601 is approximately 0.1% to 2% by weight, and the disposition 1602 is a ring around the first core 1401 with an inner diameter of about one to two times the core diameter and a thickness of 1 to 3 microns.

It is preferred that the bandwidth of the optical seed 1803 is greater than about 50 MHz in order to avoid complications arising from Brillouin scattering.

Figure 19:
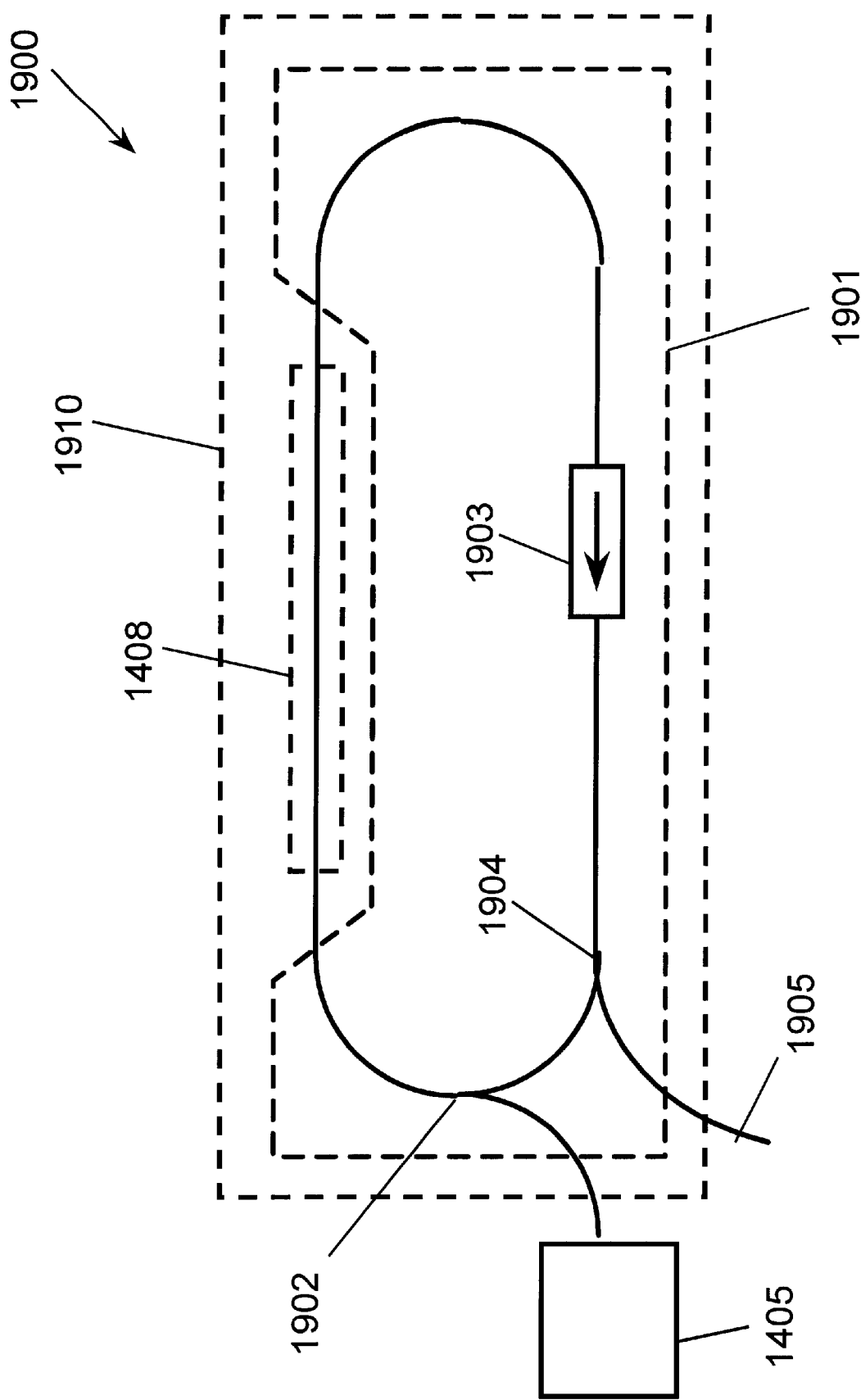
FIG. 19 shows a fiber laser.

FIG. 19 shows a fiber laser 1900 comprising a pump source 1405, an amplifying optical waveguide structure 1408 and an optical feedback device 1901, wherein the optical feedback device 1901 is configured to ensure that a portion of the optical radiation 1404 guided by the first waveguiding structure 1401 is amplified more than once by any one section of the amplifying region 1407.

The amplifying optical waveguide structure 1408 may be the cladding pumped amplifying optical waveguide structure 1508.

The optical feedback device 1901 may comprise a wavelength division multiplexing coupler 1902, an isolator 1903 and an output coupler 1904. The optical pump power 1406 is launched into the first waveguiding structure 1401 via the wavelength division multiplexing coupler 1902. This enables the optical radiation 1404 to circulate in a closed loop structure 1910. The closed loop structure 1910 in this example is a laser cavity 1906 that is configured in a ring.

The wavelength division multiplexing coupler 1902 may be a dichroic mirror, or a fused wavelength division multiplexing fiber coupler The fiber laser 1900 may be a core-pumped fiber laser with the optical pump power 1406 being coupled into the first waveguiding structure 1401.

Higher output powers are obtainable with cladding pumping whereby the optical pump power 1406 is coupled into the second waveguiding structure 1501. Closed loop designs such as shown in FIG. 19 is preferably use a dichroic mirror or a pump-injecting coupler formed by coupling the core of a multimode optical fiber to the second core 1502 by fusing and twisting the fibers together.

Figure 20:
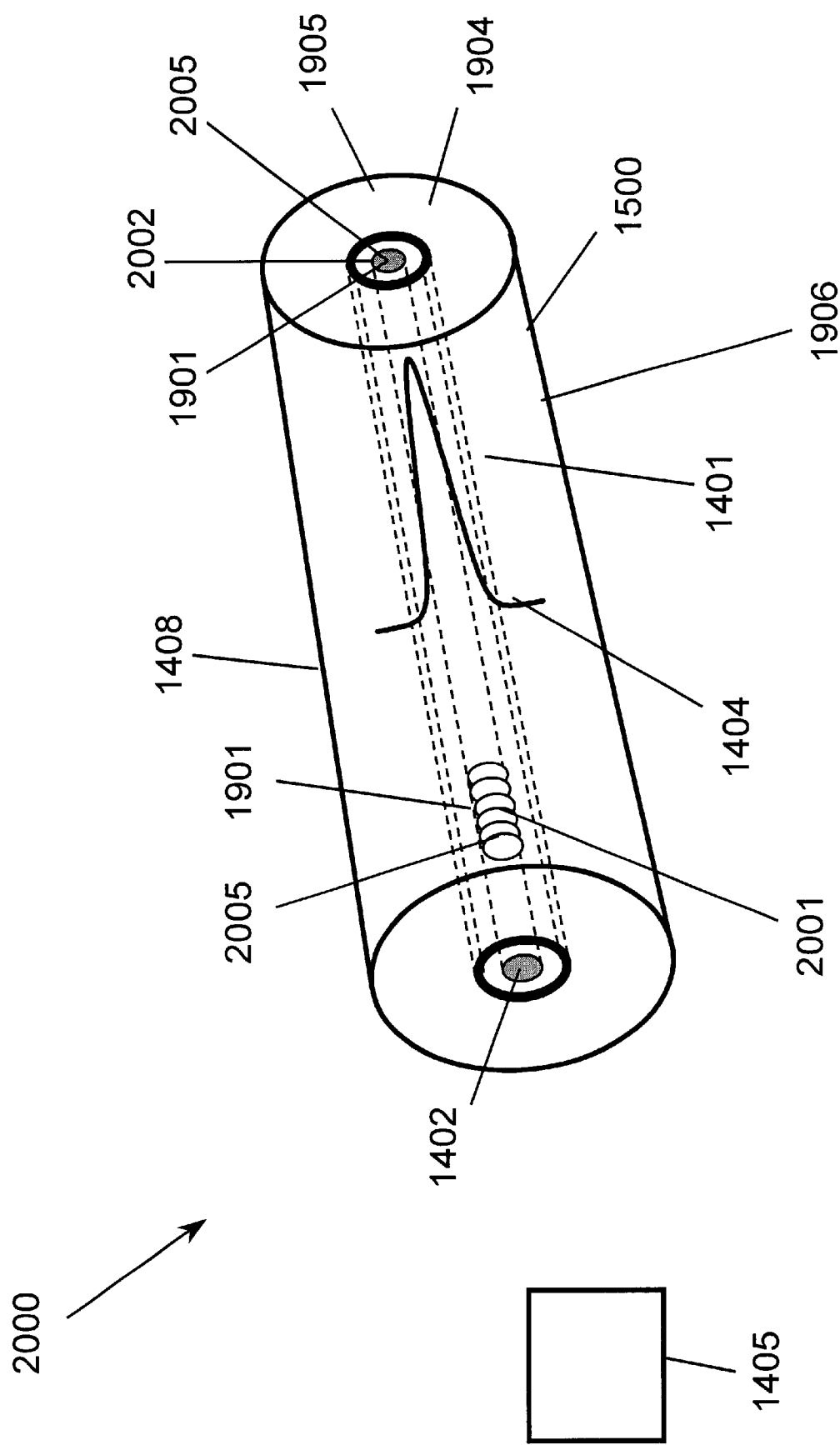
FIG. 20 shows a fiber laser which includes a reflector.

FIG. 20 shows a fiber laser 2000 where the optical feedback device 1901 comprises at least one reflector 2005. The reflector 2005 is shown as a fiber Bragg grating 2001 and a cleaved facet 2002. Alternatively, optical loop mirrors, dielectric mirrors, metallic mirrors or any other form of reflector can be utilized. The two reflectors 2005 in FIG. 20 and the amplifying optical waveguide structure 1408 are configured to form a laser cavity 1906, which in the example shown in FIG. 20 is a linear laser cavity. However, other types of laser cavity are also possible, such as ring cavities, A reflector 2005 can be partly transmitting to form an output coupler 1904 through which a part of the optical radiation 1404 that is incident on the reflector 2005 is transmitted, and emitted at an output port 1905 of the fiber laser 2000. In FIG. 20, the cleaved facet 2002 also forms the output coupler 1904.

The amplifying optical waveguide structure 1408 is preferably the cladding pumped amplifying optical waveguide structure 1508.

The reflector 2005 can be a diffraction grating placed externally to the first waveguiding structure 1401 and optically coupled to it.

The fiber Bragg grating 2001 is formed in the first waveguiding structure 1401 so that it interacts with the optical radiation 1404 guided by the first waveguiding structure 1401. The fiber Bragg grating 2001 can be formed in the first core 1402.

It is preferable to reduce the reflections outside the desired wavelength range. This can be achieved by using antireflection coatings or an angled end to the first waveguiding structure 1401.

Figure 21:
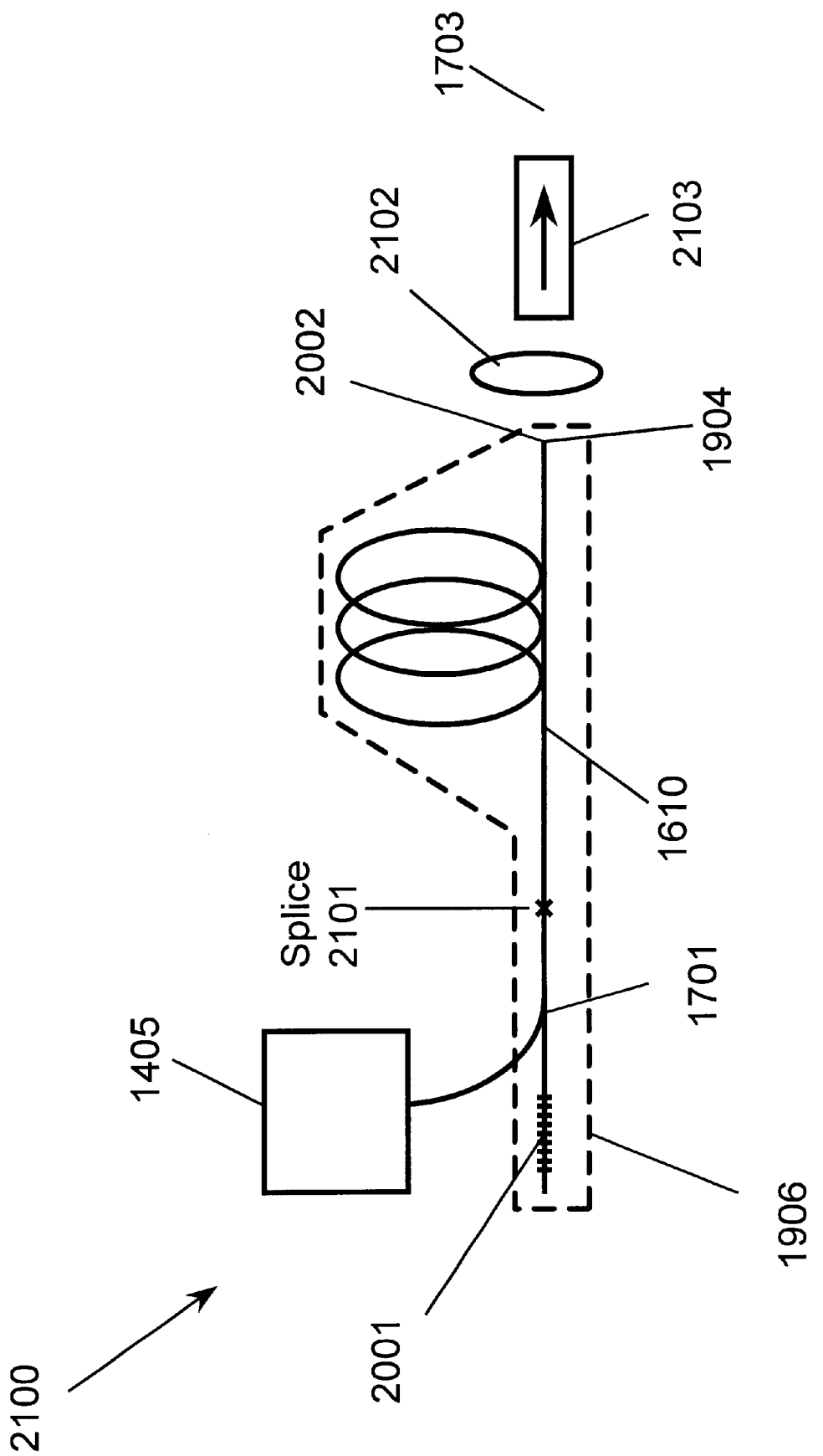
FIG. 21 shows a preferred embodiment of a fiber laser containing Ytterbium as a dopant.

FIG. 21 shows a preferred embodiment of a fiber laser 2100. The fiber laser 2100 comprises a laser cavity 1906. The optical fiber 1610 comprises the amplifying optical waveguide structure 1408. The amplifying region 1407 comprises Ytterbium and the fiber laser design is tailored such that it emits in a wavelength region of about 970 nm to about 990 nm. The design details of similar amplifier designs optimised to amplify between about 970 nm to 990 nm were described in the description pertaining to FIG. 16.

Although the coupler 1701 is shown implemented as an optical fiber coupler, any of the implementations described previously can be used. The coupler 1701 is shown as being optically connected with a splice 2101 to the optical fiber 1610, but this is not essential. It is preferred to fabricate the coupler 1701 using the optical fiber 1610 for the throughput connection.

It is preferred that the amplifying region 1407 is disposed in a ring surrounding the first core 1402.

The optical radiation 1404 guided by the first waveguide structure 1401 is characterized by an operating wavelength. It is preferred that the first waveguide structure 1401 is configured to support only one transverse guided optical mode, albeit in two orthogonal polarizations—note that in practice a single-mode optical fiber normally supports two orthogonally polarized modes.

A lens 2102 can be used to collimate optical radiation emitted by the optical fiber 1610 and coupled out from the laser cavity 1906. The out-coupled optical radiation can be passed through an optical isolator 2103.

The laser cavity 1906 can be configured in a linear configuration with the optical feedback device 1901 comprising the fiber Bragg grating reflector 2001 and the cleaved fiber facet 2002 shown in FIG. 21.

The optical feedback device 1901 can alternatively be provided by any of the implementations described previously, including a closed-loop structure.

The cleaved fiber facet 2002 also constitutes an output coupler 1904 through which optical radiation 1404 is emitted from the laser cavity 1906. Other options for an output coupler 1904 include any other partly transmitting and partly reflecting arrangement like fiber Bragg gratings and dielectric and metallic thin-film mirrors and also optical fiber and waveguide couplers, which can split a beam traveling in a waveguide into two beams traveling in different waveguides. One beam can then remain in the laser cavity 1906 while the other can be coupled out of the laser cavity 1906.

For improved wavelength selection and suppression of emission at unwanted wavelengths, it is preferred that the fiber Bragg grating 2001 reflects predominantly at a desired wavelength of emission, while the reflectivity at undesired but amplified wavelengths is low, e.g., below 0.1%. A lower value can be even better.

Figure 22:
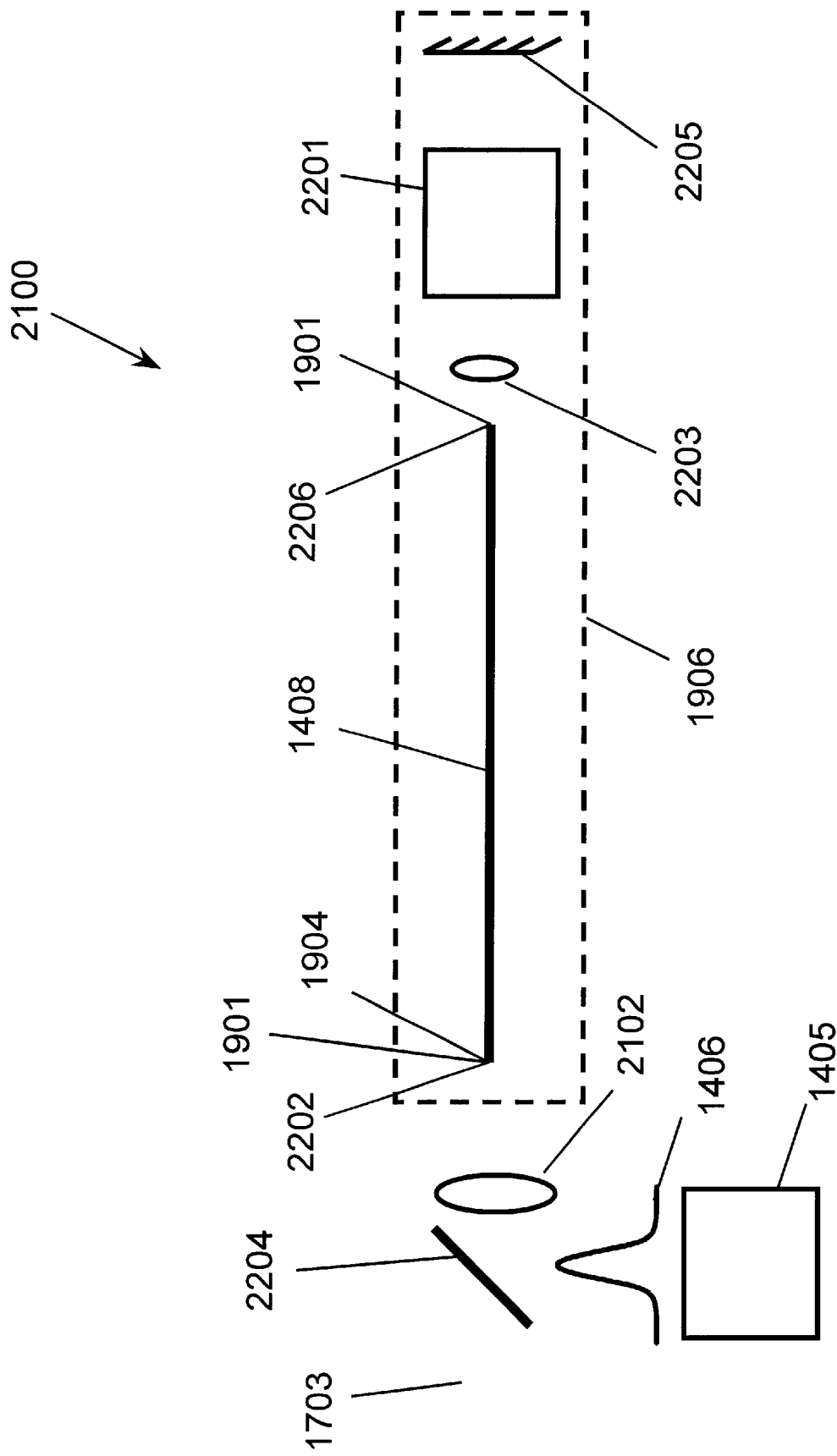
FIG. 22 shows a Q-switched laser.

FIG. 22 shows a Q-switched laser 2200 comprising a pump source 1405, an amplifying optical waveguide structure 1408, at least one optical feedback device 1901, and an optical switch 2201, wherein the optical feedback device 1901 is configured to ensure that a portion of the optical radiation 1404 guided by the first waveguiding structure 1401 is amplified more than once by any one section of the amplifying region 1407, the amplifying optical device being able to be operated such that energy is stored in the amplifying region 1407 with the optical switch 2201 in a blocking state, the energy being released in the form of an optical pulse when the optical switch 2201 is in a non-blocking state.

The optical switch 2201 is located inside the laser cavity 1906 in such a way that it can block optical radiation 1404 propagating in the laser cavity 1906.

In FIG. 22, the optical feedback device 1901 are exemplified by a mirror 2205 and a waveguide facet 2202 which also serves as a partly reflecting output coupler 1904. The waveguide facet 2202 is preferably perpendicular.

Intracavity reflections can arise at any interface between two media. This is often undesired, in which case the reflections should be suppressed. For example, reflections from the amplifying optical waveguide structure can be suppressed by using the angled facet 2206 illustrated in FIG. 22. Alternatively, a facet can be coated by an anti-reflection coating, e.g., in the form of a dielectric stack.

Reflections can also need to be suppressed in other types of amplifying optical devices 1400, and can be similarly suppressed.

The optical switch 2201 may not be physically connected to the amplifying optical waveguide structure 1408. In that case, an intracavity lens 2203 can be used to optically connect the optical switch 2201 to the amplifying optical waveguide structure 1408.

Optical pump power 1406 can be coupled from a pump source 1405 to the amplifying optical waveguide structure via a dichroic mirror 2204 and a lens 2102. The dichroic mirror 2204 can also separate the optical pump power 1406 and the optical radiation 1404 emitted from the amplifying optical waveguide structure 1408. The lens 2102 can also serve to collimate the optical radiation 1404. Other means for coupling the optical pump power 1406 into the amplifying optical waveguide 1408 can alternatively be used, including those previously discussed.

It is well known that Q-switched lasers can be operated in various modes, such as multiple pulses being emitted when the switch is opened, a single pulse being emitted, or a pulse being emitted on alternate switch signals.

A preferred embodiment utilizes an optical fiber as the amplifying optical waveguide structure 1408.

Another preferred embodiment utilizes the optical fiber described with FIG. 11 as the amplifying optical waveguide structure 1408, either in a core-pumped or a cladding-pumped version.

The optical switch 2201 can be implemented using a waveguide switch fabricated from Lithium Niobate, Gallium Arsenide, or a fiber-optic acousto-optic switch, or a bulk optical switch such as an acousto optic modulator, an acousto optic tunable filter, a Kerr cell, a Pockels cell, an elasto-optic modulator, or a liquid crystal switch.

The pump source 1405 can be a multi-moded semiconductor laser or a high-brightness, near-diffraction limited diode laser.

Figure 23:
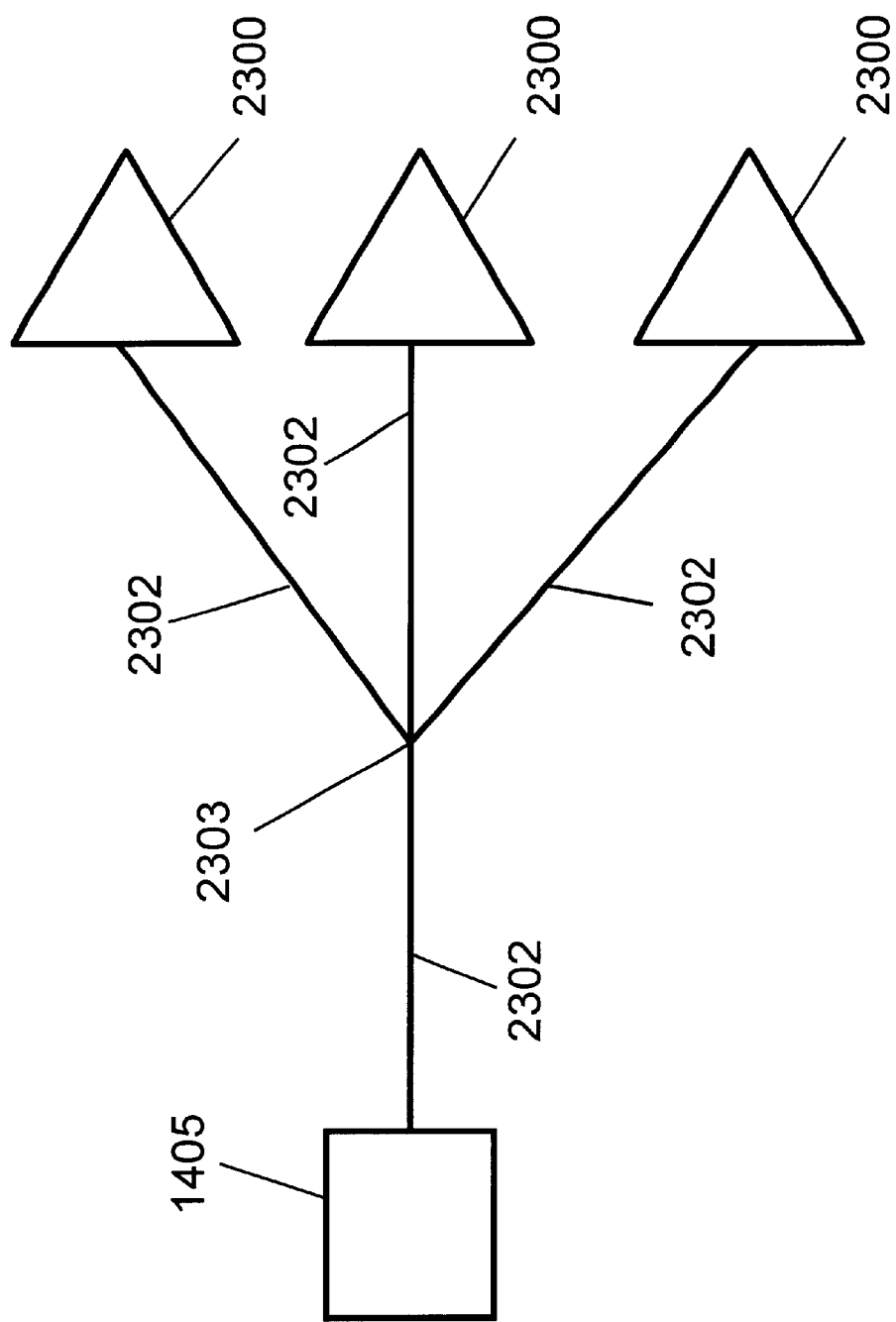
FIG. 23 shows a fiber laser being used to pump three optical fiber amplifiers.

FIG. 23 shows a laser 2301 being used to pump at least one amplifying optical device 2300 via optical fibers 2302 and a power splitter 2303. The laser 2301 can be any laser designed in accordance with this invention.

The amplifying optical device 2300 is preferably be an Erbium Doped Fiber Amplifier EDFA.

A preferred embodiment is the pumping of Erbium Doped Fiber Amplifiers EDFAs with the fibre laser 2100. It is preferred that the outputs from more than one fiber laser 2100 are coupled together prior to the pumping of the Erbium Doped Fiber Amplifiers in order to provide pump redundancy.

Advantages of using the fibre laser 2100 for this application include highly-efficient pumping of the Ytterbium ring-doped amplifying region 1407 by relatively low-cost, high power and very-reliable multimode semiconductor lasers for efficient generation of single-moded radiation in the wavelength band of about 970 nm to about 990 nm.

The amplifying optical devices 2300 can be conventional Erbium-doped fiber amplifiers such as amplifiers installed in numerous numbers in the telecommunication networks worldwide. Use of the fiber laser 2100 will allow the upgrading of such amplifiers to enable the amplification of numerous wavelength channels simultaneously at high output power (such as required in dense wavelength division multiplexing systems).

The amplifying optical devices 2300 can also be Erbium Ytterbium doped fiber amplifiers, or an amplifier designed in accordance with this invention, or any other optically pumped optical amplifiers including planar waveguiding ones.

The amplifying optical devices 2300 can also be optically pumped lasers, including fiber and planar distributed feedback lasers doped with erbium and/or ytterbium configured for pumping by the fiber laser 2100.

Figure 24:
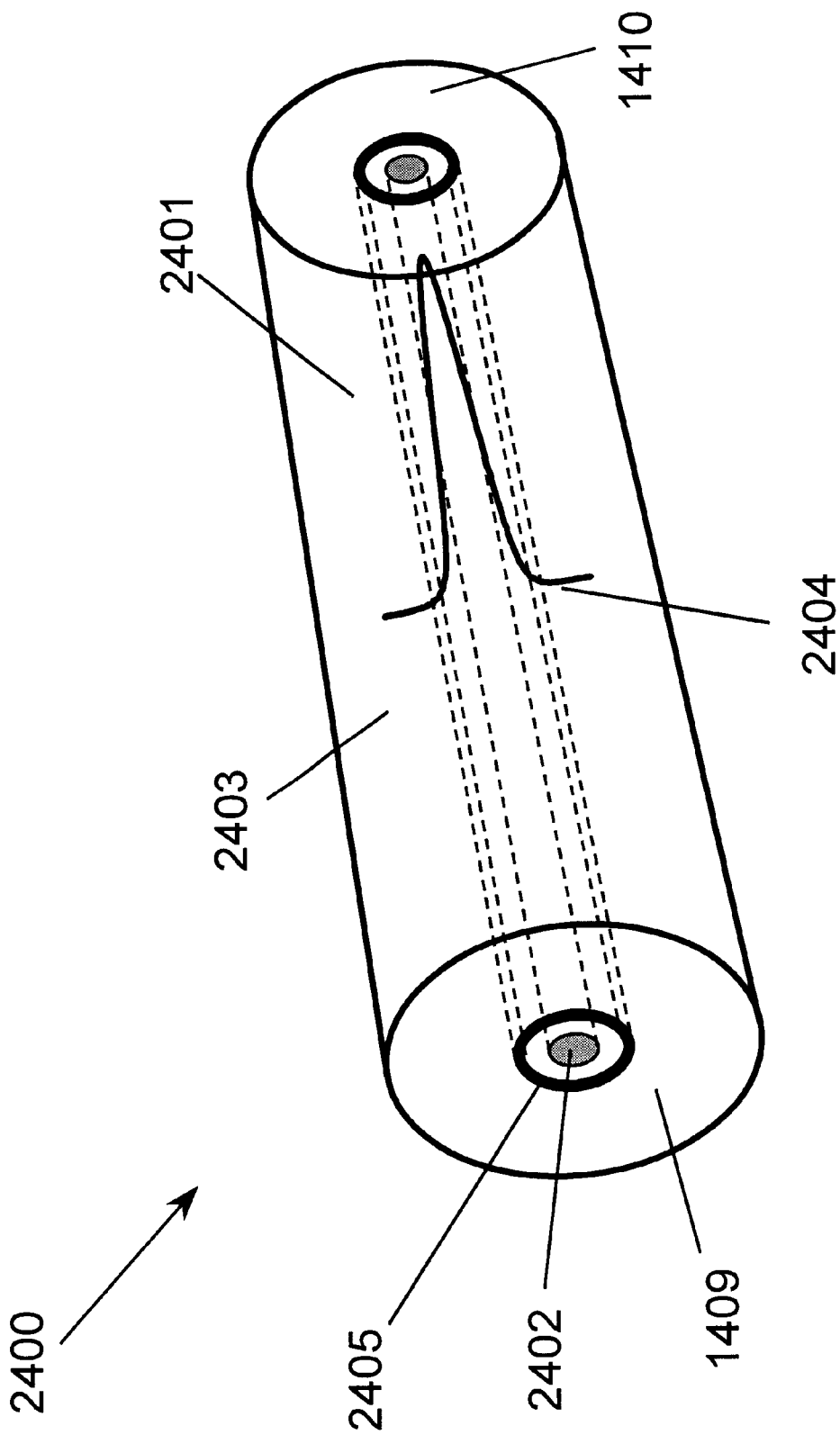
FIG. 24 shows a waveguiding saturating absorber.

FIG. 24 shows a waveguiding saturating absorber 2400 comprising a waveguiding structure 2401 having a core 2402 and a cladding 2403 configured to guide optical radiation 2404 and an absorbing region 2405 situated within the cladding 2403 and disposed such that it provides an absorption of the optical radiation 2404 guided in the core 2402.

A preferred method to use the waveguiding saturating absorber 2400 is where in use at least 10% of the absorption is bleached by the optical radiation 2404 guided by the waveguiding structure 2401 in at least a part of the waveguiding saturating absorber 2400 at least part of the time The waveguiding saturating absorber 2400 can absorb optical radiation 2404 guided by the waveguiding structure 2401. However, at the same time, power absorbed in the absorbing region 2405 bleaches the absorption, which thus becomes smaller for optical radiation 2404 of higher power. The intrinsic saturation power $P_{sat}$ is an important parameter for a waveguiding saturating absorber. If the power of the optical radiation 2404 is much smaller than $P_{sat}$ the waveguiding saturating absorber will be essentially unbleached and absorb a certain fraction of the optical radiation 2404. If the power of the optical radiation 2404 is much larger than $P_{sat}$ the waveguiding saturating absorber can be substantially bleached and unable to absorb any more power, in which case the fraction of the power that is absorbed decreases as the power increases.

By placing the absorbing region 2405 in the cladding 2403, the intrinsic saturation power $P_{sat}$ can be significantly higher, e.g., by one or two orders of magnitude, than if the absorbing region 2405 is placed in the core 2402. This is often advantageous. Because of the tight confinement of guided optical radiation 2404, (especially if the waveguiding structure 2401 only supports a single transverse mode at the wavelength of the radiation 2404), the optical intensity inside the core 2402 becomes high enough to bleach the absorbing region 2405 already at relatively low optical powers. For instance, an erbium-doped fiber in which erbium doped in the core 2402 provides absorption normally has an intrinsic saturation power of less than 1 mW for optical radiation 2404 around 1530 nm. It is often desirable to have a higher value of $P_{sat}$ than that. A larger value of $P_{sat}$ can be accomplished by placing the absorbing region 2405 (e.g., doped with erbium) in the cladding 2403. Thereby, we can increase $P_{sat}$ and furthermore by a careful choice of the location of the absorbing region 2405 achieve a specific value of $P_{sat}$ in order to optimize the characteristics of the waveguiding saturating absorber 2400 in a particular application. In contrast, if the absorber (e.g., the erbium-doped medium) is spread evenly out in the core of a standardized design, $P_{sat}$ will primarily be determined by the intrinsic properties of the absorber (e.g., the erbium doped medium), which are normally difficult to control.

Complex designs of the core 2402 can be used to increase the saturation power $P_{sat}$, (e.g., the effective size of the core 2402 can be increased) the scope for change is much smaller than if the absorbing region 2405 can reside in the cladding 2405. Complex designs of the core include segmented cores, W-fibers, multiple cladding fibres, and cores with so-called alpha profiles.

Any of the amplifying optical waveguide structures 1408 can, if un-pumped, accordingly operate as a waveguiding saturating absorber 2400 with a large and controllable intrinsic saturation power $P_{sat}$ wavelengths where the un-pumped gain region 1407 exhibits a saturable absorption. The dopants used must therefore operate as a two or three level system at the operating wavelength of the waveguiding saturating absorber 2400. Specific examples of amplifying optical waveguide structures are shown in FIGS. 14 and 15.

It is preferred that the saturable absorber is in a solid state.

It is preferred that the saturable absorber is a glass doped with a rare earth element.

A waveguiding saturating absorber 2400 can for instance be used for rejecting low-power radiation and as an optical switch in Q-switched and mode-locked lasers.

If the optical radiation 2404 is coherent and double-passed through the waveguiding saturating absorber 2400 following reflection in one end of the waveguiding saturating absorber 2400, the optical radiation 2404 can form a standing-wave pattern which bleaches the waveguiding saturating absorber 2400 according to the standing-wave pattern. In this case, bleaching will predominantly occur at the wavelength of the optical radiation 2404, while the absorption at neighboring wavelengths can be higher. This effect can be used in wavelength-tracking filters and for stabilization of single-frequency lasers.

Figure 29:
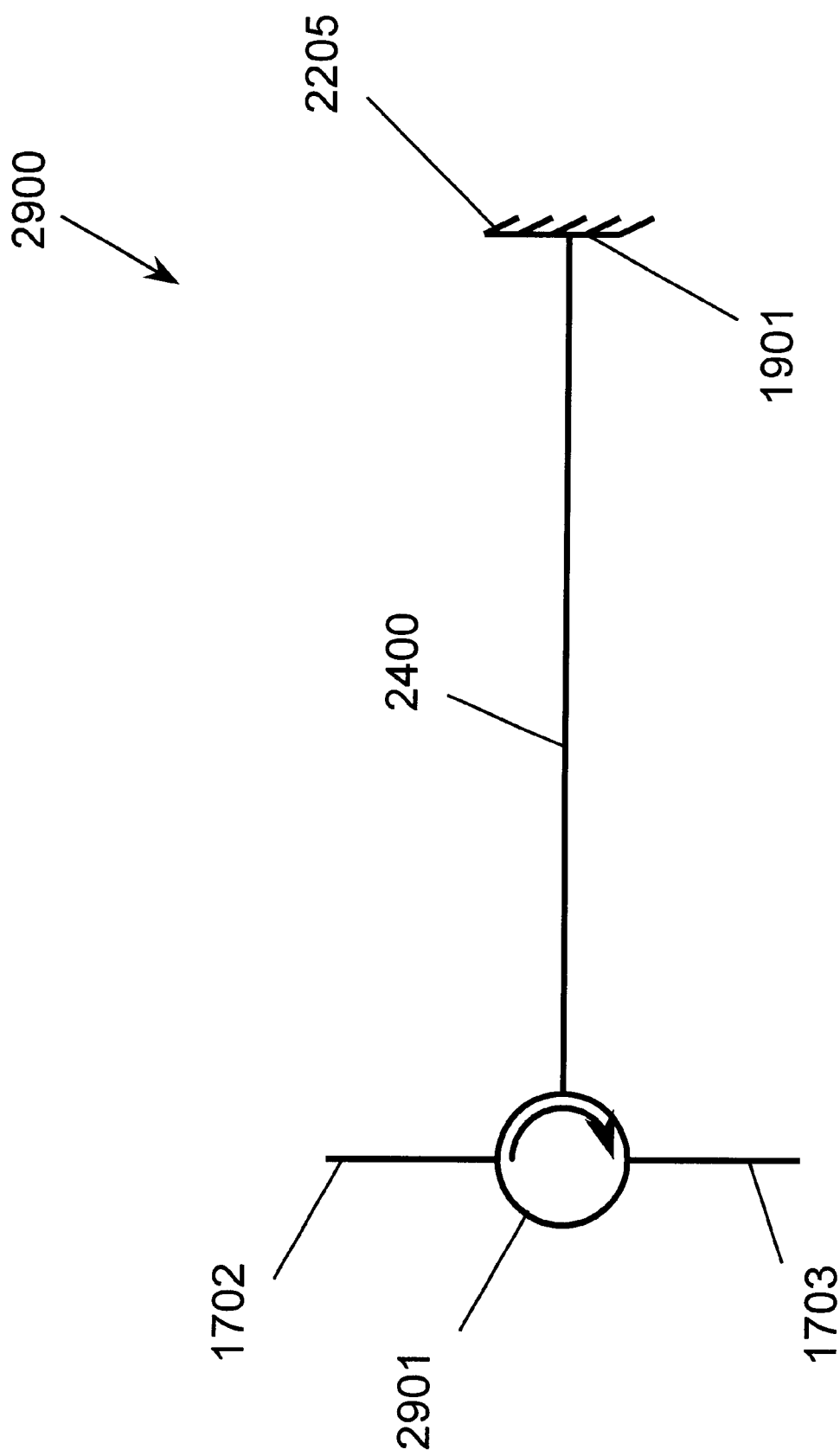
FIG. 29 shows a wavelength-tracking filter.

FIG. 29 shows a wavelength-tracking filter 2900 having a waveguiding saturating absorber 2400, a circulator 2901, and an optical feedback device 1901, which can be a mirror 2205 butted directly to the waveguiding saturating absorber 2400.

Figure 30:
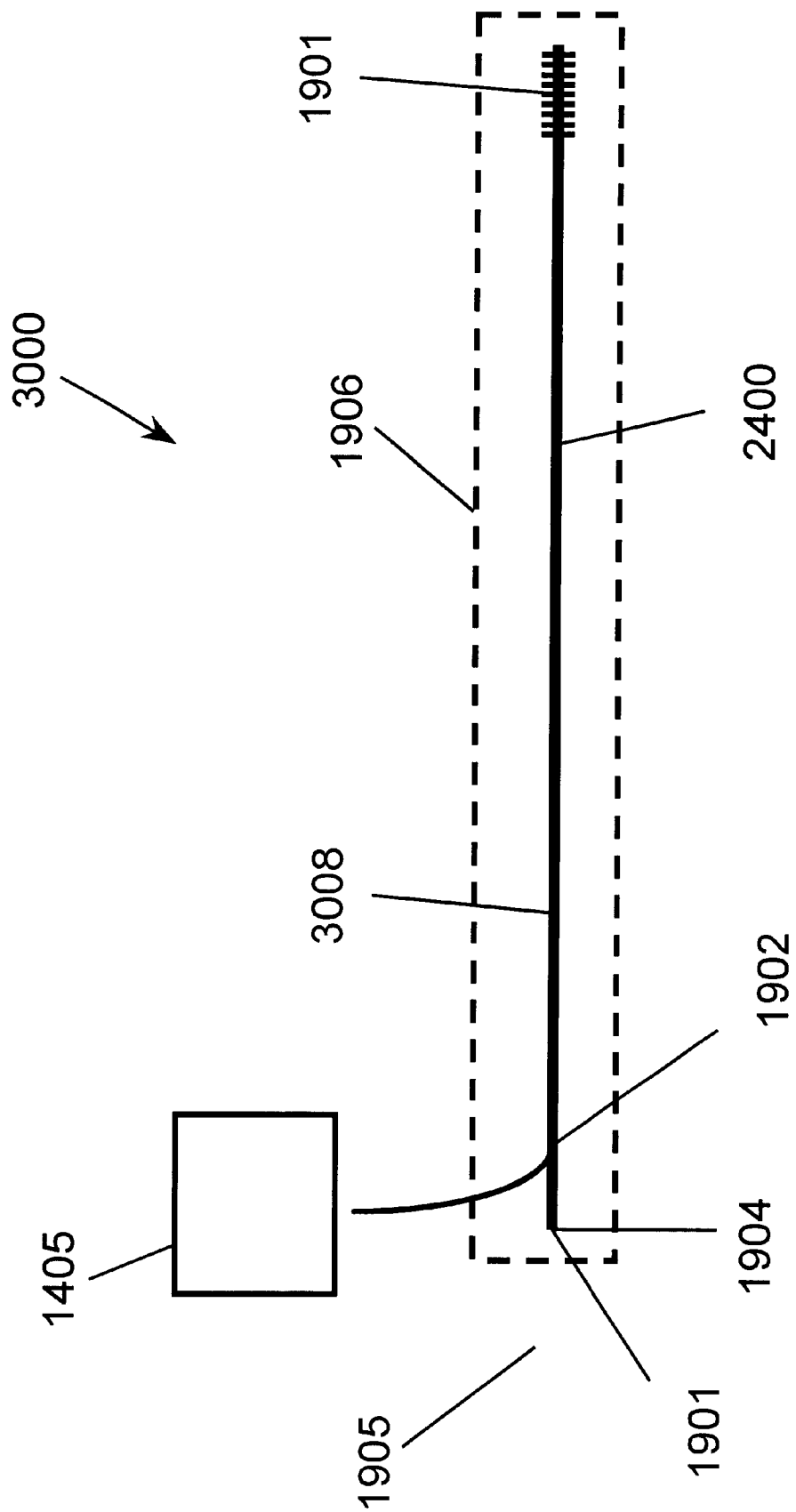
FIG. 30 shows a single-frequency laser.

FIG. 30 shows a single-frequency laser 3000 comprising an amplifying optical structure 3008 and a waveguiding saturating absorber 2400. The amplifying optical structure 3008 can be an amplifying optical waveguiding structure 1408, or a similar waveguiding structure but with the amplifying region placed in the first core 1402. The amplifying optical structure 3008 can be pumped by a pump source 1405 which can be launched via a wavelength division multiplexing coupler 1902. A laser cavity 1906 is formed by two optical feedback devices 1901. The optical feedback devices 1901 can be a fiber Bragg grating 2001 and a cleaved facet 2002, or any other optical feedback device.

The amplifying optical structure 3008 and the waveguiding saturating absorber 2400 can be formed from separate structures joined together. Alternatively, if the amplifying optical structure 3008 is an amplifying optical waveguide structure 1408, they can be formed from a single amplifying optical waveguide structure 1408, a part of which is pumped and a part of which is unpumped. A part of the amplifying optical waveguide structure 1408 can remain unpumped because of a limited pump penetration, or the configuration of the laser can be such that pump light cannot reach the waveguiding saturating absorber 2400.

For a narrow-band wavelength-tracking filter, it is preferred that the waveguiding saturating absorber 2400 is long, e.g., several centimeters up to several meters.

The waveguiding structure 2401 is preferably be single-moded and is preferably a polarization maintaining or single-polarization waveguiding structure.

Figure 25A:
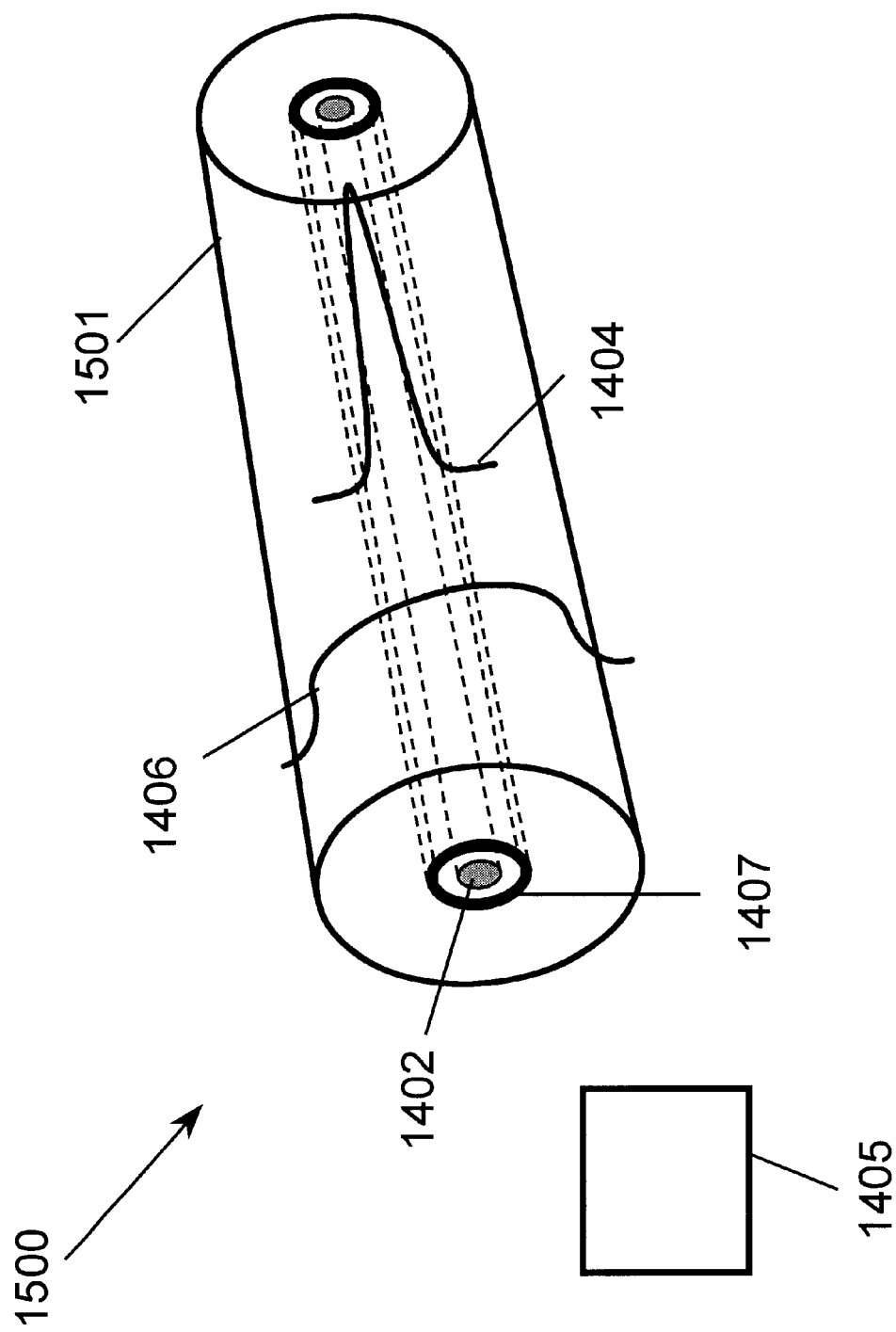
FIG. 25 shows an amplifying optical device in which an amplifying region is situated outside the first core.

FIG. 25a shows an amplifying optical device 1500 comprising a first waveguiding structure 1401 configured to guide optical radiation 1404 which can propagate in a fundamental mode, a pump source 1405 configured to supply optical pump power 1406, and a second waveguiding structure 1501 configured to guide the optical pump power 1406. The pump source 1405 is optically coupled to the second waveguiding structure 1501.

Figure 25D:
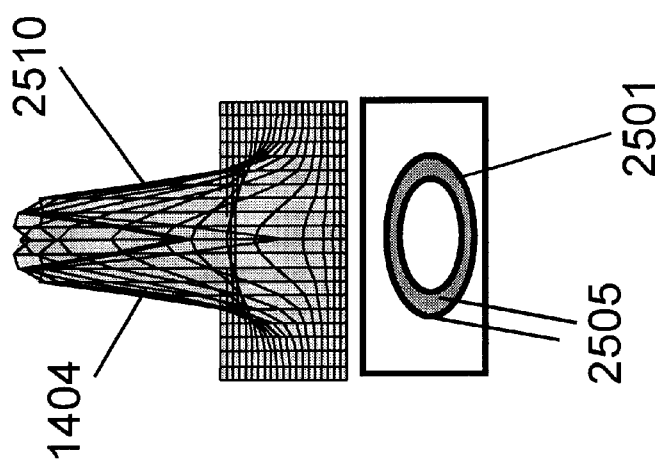
Figure 25C:
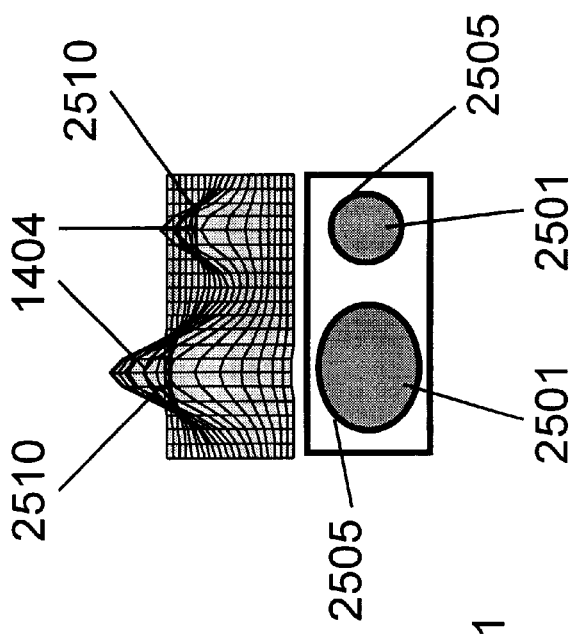
Figure 25B:
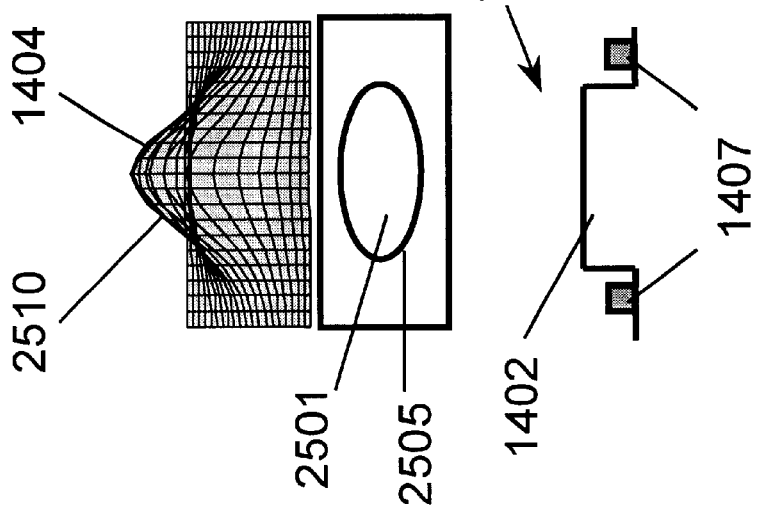

FIGS. 25b, 25c and 25d show optical power distributions 2510 of the fundamental mode of the optical radiation 1404 propagating along different first waveguide structures 1401.

In use, the optical radiation 1404 can be characterized by an optical power distribution 2510 of the fundamental mode having a contour 2505 of equal intensity perpendicular to the local longitudinal axis of the first waveguiding structure 1401, the contour 2505 enclosing about 75% of the optical power of the fundamental mode. The area enclosed by the contour 2505 defines a high intensity region 2501.

The second waveguiding structure 1501 contains an amplifying region 1407 situated to interact with the optical pump power 1406 guided in the second waveguiding structure 1501 when the amplifying optical device 1400 is in use; and wherein the amplifying region 1407 is situated to lie outside the contour 2505 of equal intensity.

It is preferred that during use at least 0.1% of the optical radiation 1404 guided by the first waveguiding structure 1401 overlaps the amplifying region 1407.

In FIGS. 25b, 25c and 25d, the contour 2505 and the high-intensity region 2501 is exemplified with optical power distributions 2510 from three different kinds of first waveguiding structures 1401. FIG. 25b shows the first waveguiding structure 1401 of a normal circular single-moded step-index fiber. The high-intensity region 2501 is circular and will large coincide with the core. The first core 1402 and possible location of the amplifying region 1407 are also sketched in this case. FIG. 25c shows the optical power distribution 2510 which can be propagated along a more complicated first waveguiding structure 1401. The high-intensity region 2501 is split up into two main regions. FIG. 25d shows the optical power distribution 2510 which can be propagated along a ring core fibre resulting in a ring-shaped high-intensity region 2501.

The first waveguiding structure 1401 can be a single mode waveguide, or can support several (up to $10^{th}$ order) higher-order modes.

It is preferred that the disposition and design of the amplifying region 1407 is arranged such that when in use, the intensity of the optical radiation 1404 guided by the first waveguiding structure 1401 and the optical pump power 1406 guided by the second waveguiding structure 1501 are within the amplifying region 1407 on average approximately equal to each other within about 10 dB. This averaging would be performed over the longitudinal and transverse extent of the gain region 1407, and be weighted by the concentration of amplifying centers (e.g., Ytterbium or other rare-earth ions) in different parts of the amplifying region 1407.

Alternatively it is preferred that the effective area ratio $r_{\mathit{effective}}$ is in the range 1 to 10.

It is preferred that at least 90% of the amplifying region 1407 is located outside the high intensity region 2501. Insofar as the concentration of the amplifying centers (e.g., Ytterbium or other rare-earth ions) can vary within the amplifying region 1407, the meaning is understood to be that at least 90% of the amplifying centers should lie outside the high-intensity region 2501.

Figure 26:
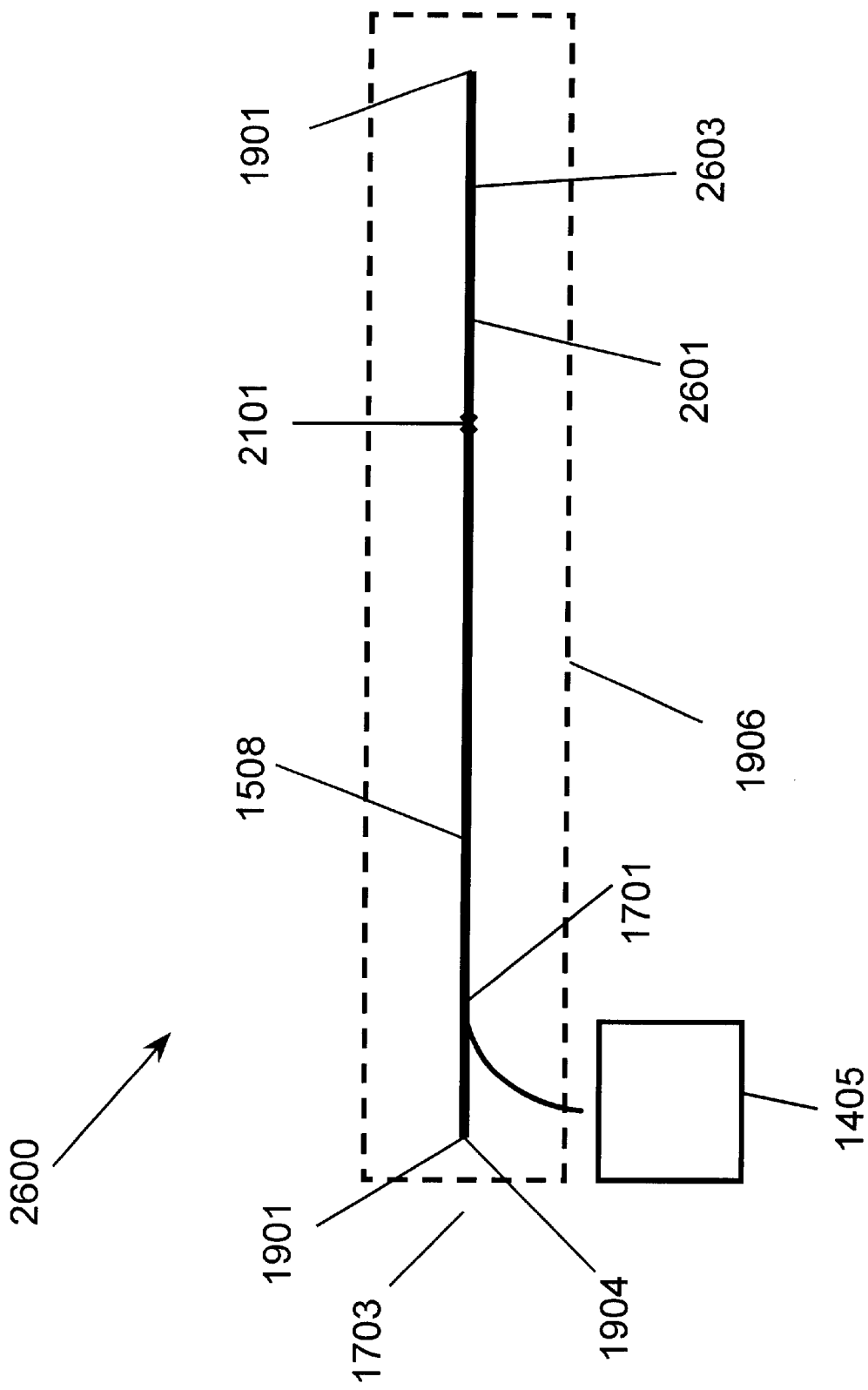
FIG. 26 shows a passive Q-switched laser.

FIG. 26 shows a passive Q-switched laser 2600 comprising a pump source 1405, a coupler 1701, a cladding-pumped amplifying optical waveguide structure 1508 which is joined to an optical waveguide structure 2601 doped with a saturable absorber 2603.

The design of the first waveguiding structure 1401 of the cladding-pumped amplifying optical waveguide structure 1508 can be the same or similar to the design of the optical waveguide structure 2601.

The amplifying region 1407 in the cladding-pumped amplifying optical waveguide structure 1508 can be doped with the same active dopant as the saturable absorber 2603 in the optical waveguide structure 2601. The operation of the passive Q-switched laser 2601 has been described previously in the text.

The saturable absorber 2603 is preferably placed in the core of the optical waveguide structure 2601.

The cladding-pumped amplifying optical waveguide structure 1508 is joined (physically or optically) to the optical waveguide structure 2601, so that the optical waveguide structure 2601 is optically coupled to the first waveguiding structure 1401 of the a cladding-pumped amplifying optical waveguide structure 1508.

The cladding-pumped amplifying optical waveguide structure 1508 and the optical waveguide structure 2601 can be optical fibers, and they can be joined together by a splice 2101.

A laser cavity 1906 is formed with the cladding-pumped amplifying optical waveguide structure 1508 and the optical waveguide structure 2601 and optical feedback device 1901.

The laser cavity 1906 can be of the linear type, as illustrated in FIG. 26, in which case an output port 1703 and an output coupler 1904 can for example be formed by the facet of the cladding-pumped amplifying optical waveguide structure 1508.

Alternatively, the optical fiber described with FIG. 11 can be used as a passively Q-switched fiber laser, in which case a saturable absorber in a first core 1402 and a amplifying medium 1407 doped in a cladding 1403 or in the edges of the first core 1402 co-exist along the fiber, rather than being disposed in separate sections of fiber. Either core-pumping or cladding-pumping can be use.

Figure 27:
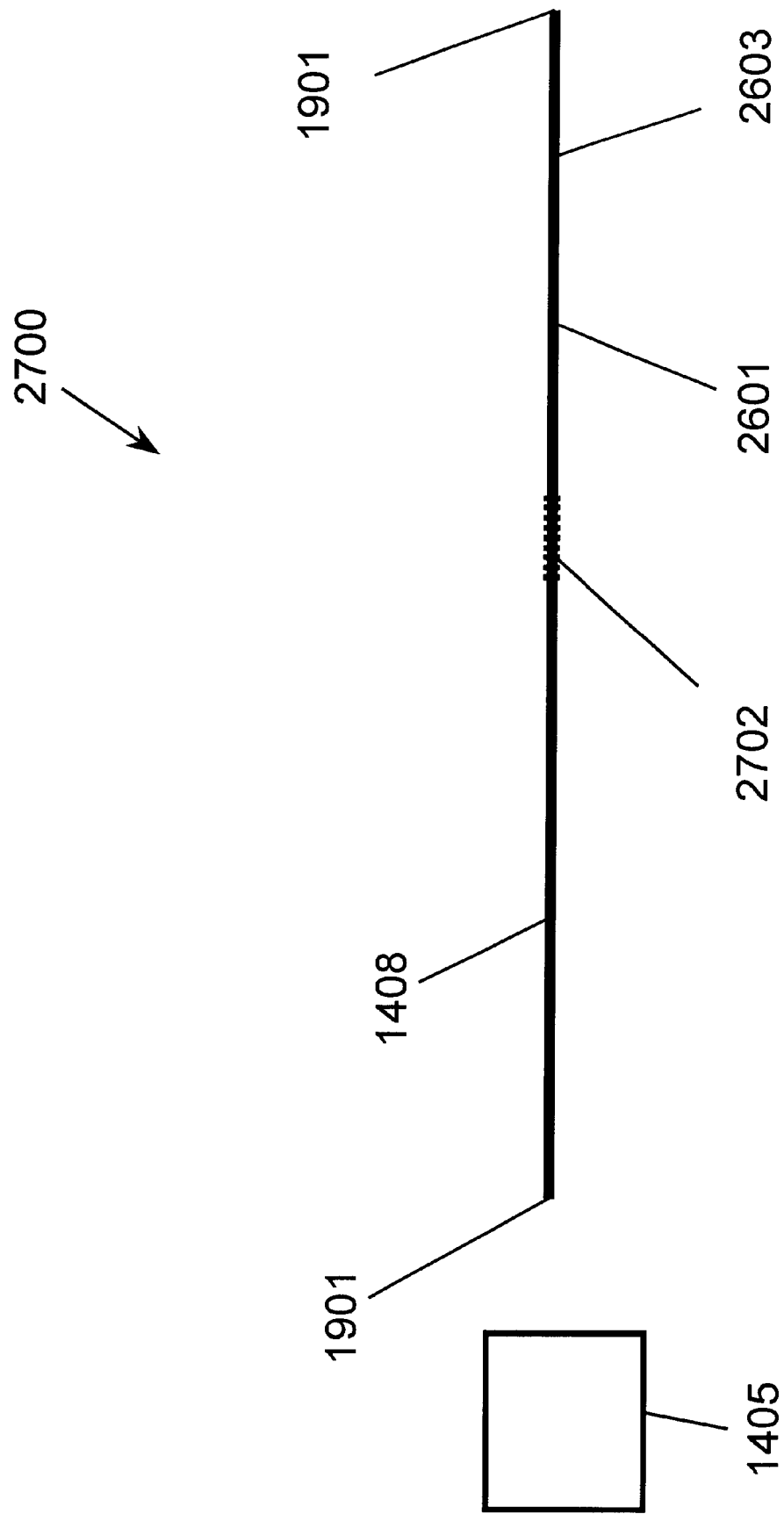
FIG. 27 shows a passive Q-switched laser which includes a pump reflector.

FIG. 27 shows a passive Q-switched laser 2700 comprising a pump source 1405 end-coupled into an amplifying optical waveguide structure 1408 which is joined via a pump-reflector 2702 to an optical waveguide structure 2601 doped with a saturable absorber 2603.

The amplifying region 1407 in the amplifying optical waveguide structure 1408 can be doped with the same active dopant as the saturable absorber 2603 in the optical waveguide structure 2601. The design of the first waveguiding structure 1401 of the amplifying optical waveguide structure 1508 can be the same or similar to the design of the optical waveguide structure 2601. The saturable absorber 2603 is preferably placed in the core of the optical waveguide structure 2601. The operation of the passive Q-switched laser 2601 has been described previously in the text.

The pump reflector 2702 can be an optical fiber Bragg grating or any other reflector which is transparent to the signal. Alternatively a pump absorber or a wavelength selective coupler can be used such as a fused-fiber wavelength division multiplexing coupler in order to selectively transmit the signal in preference to the pump between the first waveguiding structure 1401 of the amplifying optical waveguide structure 1408 and the optical waveguide structure 2601.

For pulsed laser emission, an optical feedback device 1901 and an output coupler 1904 must also be provided.

All of the features disclosed in this specification (including any accompanying claims, abstract, and drawings), and/or all of the steps of any method or process so disclosed, can be combined in any combination, except combinations where at least some of such features are mutually exclusive.

Each feature disclosed in this specification (including any accompanying claims, abstract, and drawings), can be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the steps of any method or process so disclosed.

In the embodiments described above a ring-shaped (generally cylindrical) doped region has been used. However, the doped region does not of course have to be rotationally symmetric, nor evenly distributed along the length of the fiber or waveguide.

While the above invention has been described with particularity to specific embodiments and examples thereof, it is understood that the invention comprises the general novel concepts disclosed by the disclosure provided herein, as well as those specific embodiments and examples, and should not be considered as limited by the specific embodiments and examples disclosed and described herein.

We claim:

1. An amplifying optical device comprising:
    a first waveguiding structure comprising a first core and cladding and configured to guide optical radiation, the first waveguiding structure defined by a cross section defining a central area of the first core;
    an amplifying region surrounding the central area of the first core;
    a second waveguiding structure comprising a second core and configured to guide optical pump power; and
    at least one pump source configured to supply optical pump power; and wherein:
        the second core is at least partly formed by at least part of the cladding;
        the second waveguiding structure comprises the amplifying region;
        the pump source is optically coupled to the second waveguiding structure; and
        in use at least a portion of the optical radiation guided in the first waveguiding structure overlaps the amplifying region.

2. The amplifying optical device of claim 1, and further wherein the amplifying region is located substantially in the cladding.

3. The amplifying optical device of claim 1, and further wherein the first waveguiding structure and the second waveguiding structure are fabricated in a single optical fiber, and further wherein the first core supports a single transverse optical mode at an operating signal wavelength.

4. The amplifying optical device of claim 3, and further wherein:
the second core is defined by a refractive index;
the second core is located adjacent to at least one region comprising at least one of a vacuum, a gas, a liquid, a polymer and a glass amplifying region, and wherein the region is defined by a refractive index which is lower than the refractive index of the second core;
the amplifying region is made from an oxide glass system selected from the group comprising silica, doped silica, silicate, and phosphate; and
the amplifying region comprises at least one rare earth dopant selected from the group comprising Ytterbium, Erbium, Neodymium, Praseodymium, Thulium, Samarium, Holmium, Europium, Terbium, and Dysprosium.

5. The amplifying optical device of claim 3, and further wherein:
the first waveguiding structure is defined by a normalized modal intensity, and the normalized modal intensity of the optical radiation guided in the first waveguiding structure is between 0.01 and 0.001 micrometers squared; and
the ratio of the normalized modal intensity of the optical radiation guided in the first waveguiding structure averaged over the amplifying region to the normalized modal intensity of the optical pump power when averaged over the amplifying region is between about 1.5 and about 10.

6. The amplifying optical device of claim 5, and further wherein:
the first waveguiding structure is fabricated from at least one glass system;
the amplifying region comprises a rare-earth dopant comprising Erbium; and
the amplifying region is characterized by a dopant concentration, a disposition and a length, and wherein the dopant concentration, the disposition and the length of the amplifying region are arranged such that the amplifying optical device amplifies in the wavelength range of about 1480 nm to about 1570 nm.

7. The amplifying optical device of claim 6, and wherein in operation at least some of the optical pump power propagates along the amplifying region at least two times.

8. The amplifying optical device of claim 6, and further wherein the first core is characterized by a diameter and wherein the amplifying region surrounding the first core is disposed in a ring defined by an inner diameter between one and one point five times the diameter of the first core.

9. The amplifying optical device of claim 6, and further wherein:
the amplifying region is ring-shaped and is centered on the first waveguiding structure; and
the amplifying region is made from an erbium-doped oxide glass system selected from the group comprising silica, doped silica, silicate, aluminosilicate and phosphate.

10. The amplifying optical device of claim 9, and further wherein the second core is defined by a refractive index, and second core is located adjacent to at least one region comprising at least one of a vacuum, a gas, a liquid, a polymer and a glass, and wherein the region is defined by a refractive index which is lower than the refractive index of the second core.

11. The amplifying optical device of claim 6, and further wherein the optical radiation comprises a signal mode and unwanted modes selected from the group comprising radiation modes and guided modes, the amplifying optical device further comprising an absorber configured to differentially attenuate the unwanted modes with respect to the signal mode.

12. The amplifying optical device of claim 6, and further wherein the first core is situated off-center to the cross section of the second waveguiding structure.

13. The amplifying optical device of claim 6, and further wherein the second core is defined by a shape other than a circular shape.

14. The amplifying optical device of claim 6, and further wherein the optical radiation is in the form of a pulse and the amplifying optical device is configured to reduce the distortion of the pulse.

15. The amplifying optical device of claim 5, and further wherein:
the first waveguiding structure is fabricated from at least one glass system;
the amplifying region is doped with Ytterbium;
the pump source has a wavelength in the band from about 870 nm to about 950 nm;
the amplifying region absorbs at least about 30% of the optical pump power launched into the second waveguiding structure; and
the amplifying region is characterized by a dopant concentration of Ytterbium, a disposition and a length, and wherein the dopant concentration, the disposition and the length of the amplifying region are arranged such that the amplifying optical device amplifies in a wavelength range selected from the group of about 970 nm to about 990 nm, and about 1010 nm to 1030 nm.

16. The amplifying optical device of claim 15, and further wherein:
the amplifying region is ring-shaped and is centered on the cross section of the first waveguiding structure; and
the amplifying region is made from an ytterbium-doped oxide glass system selected from the group consisting of silica, doped silica, silicate, aluminosilicate and phosphate.

17. The amplifying optical device of claim 16, and further wherein the second core is defined by a refractive index, and second core is located adjacent to at least one region comprising at least one of a vacuum, a gas, a liquid, a polymer and a glass, and wherein the region is defined by a refractive index which is lower than the refractive index of the second core.

18. The amplifying optical device of claim 15, and further wherein the optical radiation comprises a signal mode and unwanted modes selected from the group comprising radiation modes and guided modes, the amplifying optical device further comprising an absorber configured to differentially attenuate the unwanted modes with respect to the signal mode.

19. The amplifying optical device of claim 15, and further wherein the device is seeded by optical radiation having a wavelength selected from the group wavelength ranges of about 970 nm to about 990 nm, and about 1010 nm to 1030 nm.

20. The amplifying optical device of claim 15, and further wherein the device is configured such that at least some of the optical pump power propagates along the amplifying region at least two times.

21. The amplifying optical device of claim 15, and further comprising an optical feedback device comprising a first and a second reflector, and where the first reflector is selected from the group comprising a reflector, a mirror, a fiber Bragg grating and a cleaved facet and the second reflector is selected from the group comprising a reflector, a mirror, a fiber Bragg grating and a cleave d facet.

22. The amplifying optical device of claim 21, and further wherein at least one of the first and second reflectors is configured to suppress optical feedback outside the wavelength range.

23. The amplifying optical device of claim 5, and further wherein:
the first waveguiding structure is fabricated from at least one glass system;
the amplifying region contains Neodymium; and
the amplifying region is characterized by a dopant concentration, a disposition and a length, and wherein the dopant concentration, the disposition and the length of the amplifying region are arranged such that the amplifying optical device amplifies in the wavelength range of about 850 nm to about 950 nm.

24. The amplifying optical device of claim 23, and further wherein the device is configured such that at least some of the optical pump power propagates along the amplifying region at least two times.

25. The amplifying optical device of claim 23, and further comprising an optical feedback device comprising a first and a second reflector, and wherein the first reflector is selected from the group comprising a mirror, a reflector, a fiber Bragg grating and a cleaved facet and where the second reflector is selected from the group comprising a mirror, a reflector, a fiber Bragg grating and a cleaved facet.

26. The amplifying optical device of claim 23, and further wherein the device is seeded by optical radiation having a wavelength between 850 nm and 950 nm.

27. An amplifying optical device comprising:
a first waveguiding structure comprising a first core and cladding and configured to guide optical radiation, the first waveguiding structure defined by a cross section defining a central area of the first core;
at least one pump source configured to supply optical pump power; and
an amplifying region that surrounds the central area of the first core; and wherein
the pump source is optically coupled to the amplifying region;
the amplifying region substantially surrounds the first core in the cross-section of the first waveguiding structure; and
in use the optical radiation guided in the first waveguiding structure overlaps the amplifying region.

28. The amplifying optical device of claim 27, and further comprising an optical feedback device configured to ensure that a portion of the optical radiation guided by the first waveguiding structure is amplified more than once by any one section of the amplifying region.

29. The amplifying optical device of claim 28, and further comprising a second waveguiding structure comprising a second core configured to guide the optical pump power; and wherein
the second waveguiding structure comprises the amplifying region;
the second core is at least partly formed by at least part of the cladding; and the pump source is optically coupled to the second waveguiding structure.

30. The amplifying optical device of claim 28, and further wherein the first waveguiding structure is fabricated from at least one glass system, and wherein the amplifying region contains at least one rare-earth dopant selected from the group comprising Ytterbium, Erbium, Neodymium, Praseodymium, Thulium, Samarium, Holmium, Europium, Terbium, and Dysprosium.

31. The amplifying optical device of claim 28, and further wherein the optical radiation comprises a signal mode and unwanted modes selected from the group comprising radiation modes and guided modes, the amplifying optical device further comprising an absorber configured to differentially attenuate the unwanted modes with respect to the signal mode.

32. The amplifying optical device of claim 27, and further wherein the amplifying region comprises a silica glass doped with a rare-earth dopant and a dopant selected from the group comprising germanium, aluminum and phosphorus.

33. The amplifying optical device of claim 27, and further wherein the first core is defined by an outer diameter and wherein the amplifying region surrounding the first core is disposed in a ring with an inner diameter between one and one point five times the outer diameter of the first core.

34. The amplifying optical device of claim 28, and further wherein the feedback device comprises a first and a second reflector, and where the first reflector is selected from the group comprising a fiber Bragg grating and a cleaved facet and where the second reflector is selected from the group comprising a fiber Bragg grating and a cleaved facet.

35. The amplifying optical device of claim 27, and further comprising an optical switch configured to be switched between a blocking state and a non-blocking state, and wherein the amplifying optical device is configured to be operable such that energy is stored in the amplifying region when the optical switch is in the blocking state, and the energy is released in the form of at least one optical pulse when the optical switch is in the non-blocking state.

36. The amplifying optical device of claim 27, and further comprising at least one saturable absorber configured to absorb the optical radiation.

37. The amplifying optical device of claim 36, and wherein the first waveguiding structure defines a plurality of longitudinal sections, and further wherein the saturable absorber and the amplifying region are located in the same longitudinal section of the first waveguiding structure.

38. The amplifying optical device of claim 36, and wherein the wherein the first waveguiding structure defines a plurality of longitudinal sections in the direction of propagation of the signal beam, and further wherein the saturable absorber and the amplifying region are at least partially located in different longitudinal sections of the first waveguiding structure.

39. The amplifying optical device of claim 36, and wherein in use the saturable absorber is bleached in a time varying manner.

40. The amplifying optical device of claim 39, and further wherein the time varying manner is periodic.

41. The amplifying optical device of claim 36, and wherein the amplifying region comprises a $Yb^{3+}$-sensitized $Er^{3+}$-doped glass, and the saturable absorber comprises an $Er^{3+}$-doped glass.

42. The amplifying optical device of claim 41, and further and wherein:
the waveguiding structure is defined in a glass optical fiber;

the cross section of the waveguiding structure is defined by a center;

the amplifying region is made from an oxide glass system selected from the group comprising silica, doped silica, silicate, and phosphate; and the saturable absorber is located proximate the center of the first waveguiding structure.

43. The amplifying optical device of claim 42, and further wherein the optical pump power has a wavelength of 1020–1080 nm.

44. The amplifying optical device of claim 42, and further comprising a second waveguiding structure comprising a second core and configured to guide the optical pump power; and wherein:

the second core is at least partly formed by at least part of the cladding;

the pump source is optically coupled to the second waveguiding structure; and the pump source emits at a wavelength in the range 900–950 nm.

45. The amplifying optical device of claim 1, and further wherein the first waveguiding structure is fabricated from at least one glass system and wherein the amplifying region contains at least one rare-earth dopant selected from the group comprising Ytterbium, Erbium, Neodymium, Praseodymium, Thulium, Samarium, Holmium, Europium, Terbium, and Dysprosium.

46. The amplifying optical device of claim 1, and further comprising a master oscillator configured to generate an optical seed; and wherein:

the amplifying optical device is defined by an intrinsic lasing threshold and an intrinsic saturation energy;

the master oscillator is optically coupled to the first waveguiding structure;

the optical seed is an optical pulse seed;

the amplifying region is arranged around the first core such that the amplifying optical device has high energy storage at its intrinsic lasing threshold;

the amplifying region amplifies the optical pulse seed; and the amplifying optical device is configured to be operated such that the amplified optical pulse seed has an energy exceeding the intrinsic saturation energy of the amplifying optical device.

47. A method of pumping at least one optical fiber amplifier with a fiber laser, the fiber laser comprising:

a first waveguiding structure comprising a first core and cladding and configured to guide optical radiation, the first waveguiding structure defined by a cross section defining a central area of the first core;

an amplifying region;

a second waveguiding structure comprising a second core and configured to guide the optical pump power; and wherein the amplifying region surrounds the central area of the first core;

the second waveguiding structure contains the amplifying region; and the second core is at least partly formed by at least part of the cladding;

the method comprising:
configuring the fibre laser to provide optical feedback;
pumping the fibre laser with optical pump power to provide a lasing output; and
optically pumping the optical fibre amplifier with the lasing output.

48. A method of amplifying optical pulses to energies exceeding the intrinsic saturation energy of an amplifying optical device, comprising:

providing a first waveguiding structure comprising a first core and cladding;

providing a source of optical pump power;

providing a second waveguiding structure comprising a second core at least partly formed by at least part of the cladding, and an amplifying region around the first core;

guiding optical radiation using the first waveguiding structure; and guiding the optical pump power using the second waveguiding structure such that the amplifying region interacts with the optical radiation guided in the first waveguiding structure and the optical pump power guided in the second waveguiding structure.

49. A method of using a waveguiding saturating absorber comprising:

providing a waveguiding structure having a core and a cladding;

guiding optical radiation in the waveguiding structure; and providing an absorbing region situated within the cladding and disposed such that the absorbing region provides an absorption of the optical radiation guided in the core such that in use at least 10% of the absorption is bleached by the optical radiation guided by the core in at least a part of the waveguiding saturating absorber at least part of the time.

50. The method of claim 49 wherein the absorbing region is configured in a ring around the first core.

51. A method of amplifying optical signals with an optical fiber amplifier wherein the fiber amplifier comprises:

a first waveguiding structure comprising a first core and cladding and configured to guide optical radiation, the first waveguiding structure defined by a cross section defining a central area of the first core;

an amplifying region;

a second waveguiding structure comprising a second core and configured to guide the optical pump power; and wherein:

the amplifying region surrounds the central area of the first core;

the second waveguiding structure contains the amplifying region; and the second core is at least partly formed by at least part of the cladding;

the method comprising:
pumping the fiber amplifier with optical pump power to provide gain; and
coupling an optical signal to the first waveguiding structure of the fiber amplifier.

* * * * *